United States Patent
Nakayama et al.

(10) Patent No.: US 7,483,942 B2
(45) Date of Patent: Jan. 27, 2009

(54) INFORMATION PROCESSING DEVICE, METHOD, AND PROGRAM FOR DISTRIBUTING CONTENT BY QUERYING FOR A SELECTED DEVICE ID FROM AT LEAST TWO IDENTIFIED DEVICE IDS

(75) Inventors: Tsuyoshi Nakayama, Kanagawa (JP); Yoshimasa Tai, Kanagawa (JP); Kaori Ando, Kanagawa (JP); Megumi Tokita, Kanagawa (JP)

(73) Assignee: Sony Corporation, Tokyo (JP)

( * ) Notice: Subject to any disclaimer, the term of this patent is extended or adjusted under 35 U.S.C. 154(b) by 714 days.

(21) Appl. No.: 10/779,789

(22) Filed: Feb. 18, 2004

(65) Prior Publication Data

US 2005/0049934 A1 Mar. 3, 2005

(30) Foreign Application Priority Data

Mar. 4, 2003 (JP) ............................. 2003-057398

(51) Int. Cl.
  *G06F 15/16* (2006.01)
(52) U.S. Cl. ................... 709/203; 709/223; 709/226; 709/229; 709/245; 705/26
(58) Field of Classification Search ................ 709/203, 709/217, 219, 226, 229, 248, 245, 223; 705/26
  See application file for complete search history.

(56) References Cited

U.S. PATENT DOCUMENTS

| | | | | |
|---|---|---|---|---|
| 2001/0018713 A1* | 8/2001 | Kokado et al. | ............... | 709/235 |
| 2002/0029336 A1* | 3/2002 | Sekiyama et al. | ............ | 713/169 |
| 2002/0116082 A1* | 8/2002 | Gudorf | ....................... | 709/217 |
| 2003/0120611 A1* | 6/2003 | Yoshino et al. | ................ | 705/67 |
| 2005/0144219 A1* | 6/2005 | Terada | ......................... | 709/203 |

FOREIGN PATENT DOCUMENTS

| | | |
|---|---|---|
| JP | 10-240827 | 9/1998 |
| JP | 2000-277401 | 10/2000 |
| JP | 2001-54095 | 2/2001 |
| JP | 2001-283015 | 10/2001 |
| JP | 2002-9717 | 1/2002 |
| JP | 2002-112231 | 4/2002 |
| JP | 2002-185931 | 6/2002 |
| JP | 2002-185947 | 6/2002 |
| JP | 2002-261747 | 9/2002 |
| JP | 2002-290401 | 10/2002 |
| WO | WO 00/48364 | 8/2000 |

* cited by examiner

*Primary Examiner*—Oanh Duong
(74) *Attorney, Agent, or Firm*—Oblon, Spivak, McClelland, Maier & Neustadt, P.C.

(57) ABSTRACT

Upon receiving a request for distribution of content data, determination is made whether or not the transmission can be performed, based upon a transmission reservation table. If a user has specified the transmission point in time, a transmission device refers to the reservation state corresponding to the specified point in time, and if available, the transmission device makes a reservation for the specified transmission point in time. Otherwise, the transmission device makes a reservation for an available transmission point in time near the specified point in time, as appropriate. If the user has not specified the transmission point in time, the transmission device transmits the content data at an available point in time, as appropriate. If the transmission device cannot acquire predetermined information, and accordingly cannot determine the transmission point in time, the transmission device generates a schedule indicating that the transmission point in time has not been fixed.

10 Claims, 36 Drawing Sheets

FIG. 11

| DEVICE ID | USER ID | PASSWORD | MAIL ADDRESS |
|---|---|---|---|
| 000001 | a1b2c3 | pppp | mmm@z.co.jp |
| 000002 | | | |
| 000003 | | | |
| ⋮ | ⋮ | ⋮ | ⋮ |
| 999999 | | | |

| DEVICE ID | ALIAS ID | USER ID | PASSWORD | MAIL ADDRESS |
|---|---|---|---|---|
| 000001 | ABCDEF | a1b2c3 | pppp | mmm@z.co.jp |
| 000002 | ABCDEG | | | |
| 000003 | ABCDEH | | | |
| ------- | ------- | ------- | ------- | ------- |
| 999999 | | | | |

| USER ID | PASSWORD | MAIL ADDRESS | TERMINAL NAME (ALIAS ID) | DEVICE ID |
|---------|----------|--------------|--------------------------|-----------|
| a1b2c3 | pppp | mmm@z.co.jp | STB | 000001 |
| | | | PC | 010021 |
| d4e5f6 | ssss | mpm@x.co.jp | PC | 001234 |
| | | | STB | 001235 |
| | | | CELLULAR PHONE | 001236 |
| ---------- | ---------- | ---------- | ---------- | ---------- |

| CONTENT ID | SIZE | CHARGES | CONTENTS |
|---|---|---|---|
| 1 | △ | □ | ............... |
| 2 | △ | □ | ............... |
| ⋮ | ⋮ | ⋮ | ⋮ |

| LICENSE ID | CONTENT ID | CONDITIONS OF USE |
|---|---|---|
| 1 | 1 | .................. |
|  | 2 |  |
|  | ⋮ |  |
| 2 |  | .................. |
|  |  |  |
|  | ⋮ |  |
| ⋮ | ⋮ | ⋮ |

| TRANSACTION ID | CONTENT ID | LICENSE ID | DESTINATION DEVICE ID | BILLING USER ID | TRANSMISSION POINT-IN-TIME | TRANSMISSION STATUS |

FIG. 31

USER ID

PASSWORD

⦿ IS THIS A PRESENT?

USER "A" MAKES A PRESENT OF
CONTENTS FOR YOU.

DO YOU ACCEPT THE PRESENT?

◯ YES     ◯ NO
└─▶ SELECT DEVICE FOR DOWNLOAD

◯ PC

◯ STB

◯ CELLULAR PHONE

301

INFORMATION PROCESSING DEVICE, METHOD, AND PROGRAM FOR DISTRIBUTING CONTENT BY QUERYING FOR A SELECTED DEVICE ID FROM AT LEAST TWO IDENTIFIED DEVICE IDS

BACKGROUND OF THE INVENTION

1. Field of the Invention

The present invention relates to an information processing device, method, and program, and particularly to an information processing device, method, and program, suitable for applying to a device for providing contents to other devices so as to efficiently provide contents, as well as preventing excessive load on the device for providing contents to other devices.

2. Description of the Related Art

In recent years, purchase of various goods over networks (i.e., performing procedures for such purchase) is becoming commonplace due to wide use of networks such as the Internet and the like. Various goods can be purchased on the network, including non-material goods, not to mention material goods. The non-material goods include music data, image data, and the like, for example.

Services available for the non-material goods include rental thereof, not to mention to purchase. In either case, the user can purchase desired content data such as music data, image data, or the like, on a home computer or the like without going to a music shop which deals in compact disks and the like on which the content data has been recorded, or a music rental shop which provides compact disks or the like.

In the event that the user purchases desired content data via the network, first, the user accesses a site which deals in the content data via the network, following which the user performs procedures such as input of predetermined information following instructions from the site, for example, whereby the procedures are performed for purchase of the content data.

Upon such procedures for purchase of the content data being completed, the content data is downloaded from the site to the device on the user side through the network.

SUMMARY OF THE INVENTION

Such purchase of content data described above is becoming widespread due to the fact that the user can make a purchase while staying at home, and furthermore, the operation for the purchase is simple. On the other hand, the data amount of content data is increasing. This present situation leads to a problem that in the event that a great number of requests for download of content data are performed at the same time, normal download may not be available.

The present invention has been made in order to solve the above-described problems, and accordingly, it is an object thereof to provide an information processing device, method, and programs, for controlling a device so that a great number of data requests for download are not concentrated at the same time.

An information processing device according to a first aspect of the present invention comprises: first managing means for managing first IDs for identifying another device other than the information processing device itself; second managing means for managing second IDs for identifying contents; supplying means for supplying the second ID managed by the second managing means to the other device upon the other device making a request for distribution of the contents; identifying means for identifying the first ID managed by the first managing means based upon the information for identifying the first ID and the second ID received from the other device; generating means for generating a schedule for distributing the contents identified by the second ID to the other device corresponding to the identified first ID in the event that the first ID has been identified by the specifying means; and distributing means for distributing the contents according to the schedule generated by the generating means, wherein in the event that the user having the other device has specified the point-in-time for distributing the contents through the other device, the generating means determine whether or not transmission of the contents can be performed at the specified point-in-time, and in the event that determination has been made that the transmission can be performed, the generating means generate a schedule for transmission of the contents with the specified transmission point-in-time.

The generating means may determine whether or not the distributing means have sufficient transmission capability for distributing the contents at the specified point-in-time, by the distributing means referring the schedule corresponding to the specified point-in-time, which has been generated, so as to confirm the data size of the contents corresponding to the specified transmission point-in-time, which has been specified, and determining whether or not the distributing means have sufficient transmission capability for transmitting the contents with the data size which is the sum of the data size which has been confirmed and the data size of the content data regarding which a new schedule is to be generated.

In the event that the identifying means identify the two first IDs based upon the information received from the other device, the identifying means may identify one first ID as a billing user ID for identifying the user which is to be billed for the contents, and the other first ID as a destination ID for identifying the destination device for receiving the contents, with the generating means generating a schedule for billing the user identified by the billing user ID, and distributing the contents to the other device identified by the destination ID.

The information processing device may further comprise query means for making a query to a user having the other device identified by the destination ID, regarding whether or not the intended recipient will accept distribution of the contents in the event that the identifying means have identified the destination ID; wherein, in the event that the identifying means have identified the destination ID, the generating means generate an unfixed schedule, and upon the generating means receiving a response that the intended recipient has decided to accept distribution of the contents as a response to the query transmitted from the query means, the generating means change the unfixed schedule to a fixed schedule, and the distributing means distribute the contents according to the fixed schedule.

The information processing device may further comprise schedule-supplying means for supplying a schedule to the other device corresponding to the first ID in the event that the other device corresponding to the first ID has made a request for supplying the schedule, and the generating means have generated the schedule for the other device corresponding to the first ID.

The information processing device may further comprise: determining means for determining whether or not the other device corresponding to the first ID can receive and store the content data transmitted according to the schedule; and updating means for updating the schedule in the event that the determination means have determined that the other device corresponding to the first ID cannot receive and store the content data.

According to a second aspect of the present invention, an information processing method according to the present invention comprises: a first management step for managing first IDs for identifying another device; a second management step for managing second IDs for identifying contents; a supplying step for supplying the second ID managed in the processing in the second management step to the other device upon the other device making a request for distribution of the contents; an identifying step for identifying the first ID managed in the processing in the first management step based upon the information for identifying the first ID and the second ID received from the other device; a generating step for generating a schedule for distributing the contents identified by the second ID to the other device corresponding to the identified first ID in the event that the first ID has been identified in the processing in the specifying step; and a distributing control step for controlling distribution of the contents according to the schedule generated in the processing in the generating step; wherein, in the event that the user having the other device has specified the point-in-time for distributing the contents through the other device, determination is made whether or not transmission of the contents can be performed at the specified point-in-time in the processing in the generating step, and in the event that determination has been made that the transmission can be performed, a schedule for transmission of the contents at the specified transmission point-in-time is generated in the processing in the generating step.

According to a third aspect of the present invention, a recording medium stores a computer-readable program which comprises: code for a first management step for managing first IDs for identifying another device; code for a second management step for managing second IDs for identifying contents; code for a supplying step for supplying the second ID managed in the processing in the second management step to the other device upon the other device making a request for distribution of the contents; code for an identifying step for identifying the first ID managed in the processing in the first management step based upon the information for identifying the first ID and the second ID received from the other device; code for a generating step for generating a schedule for distributing the contents identified by the second ID to the other device corresponding to the identified first ID in the event that the first ID has been identified in the processing in the specifying step; and code for a distributing control step for controlling distribution of the contents according to the schedule generated in the processing in the generating step; wherein, in the event that the user having the other device has specified the point-in-time for distributing the contents through the other device, determination is made whether or not transmission of the contents can be performed at the specified point-in-time in the processing in the generating step, and in the event that determination has been made that the transmission can be performed, a schedule for transmission of the contents at the specified transmission point-in-time is generated in the processing in the generating step.

According to a fourth aspect of the present invention, a program causes a computer to execute: a first management step for managing first IDs for identifying another device; a second management step for managing second IDs for identifying contents; a supplying step for supplying the second ID managed in the processing in the second management step to the other device upon the other device making a request for distribution of the contents; an identifying step for identifying the first ID managed in the processing in the first management step based upon the information for identifying the first ID and the second ID received from the other device; a generating step for generating a schedule for distributing the contents identified by the second ID to the other device corresponding to the identified first ID in the event that the first ID has been identified in the processing in the specifying step; and a distributing control step for controlling distribution of the contents according to the schedule generated in the processing in the generating step; wherein, in the event that the user having the other device has specified the point-in-time for distributing the contents through the other device, determination is made whether or not transmission of the contents can be performed at the specified point-in-time in the processing in the generating step, and in the event that determination has been made that the transmission can be performed, a schedule for transmission of the contents at the specified transmission point-in-time is generated in the processing in the generating step.

With the present invention, the system manages both the IDs for identifying devices and the IDs for identifying contents. Upon the system receiving information from a device, the system identifies the device and the contents, and generates a schedule for distributing the identified contents to the identified device. The system performs distribution of the content data according to the generated schedule.

Thus, the system can perform transmission of the content data, either to a device which has made a request for the content data, or to another device other than the device which has made a request for the content data. Furthermore, the system can transmit the content data at the point-in-time specified by the user.

According to the present invention, the system has the advantage of reducing heavy traffic on the network due to data transmission.

BRIEF DESCRIPTION OF THE DRAWINGS

FIG. 11 is a diagram which shows a data configuration of a destination table;

FIG. 14 is a diagram which shows another configuration of the destination table;

FIG. 18 is a diagram which shows another configuration of the destination table;

FIG. 20 is a diagram for describing the data stored in a content database;

FIG. 21 is a diagram for describing the data stored in a license issuing unit;

FIG. 22 is a diagram for describing the data of a schedule;

FIG. 31 is a diagram which shows a screen example displayed on the display;

FIG. 33 is a diagram which shows another screen example displayed on the display;

DESCRIPTION OF THE PREFERRED EMBODIMENTS

Figure 1:
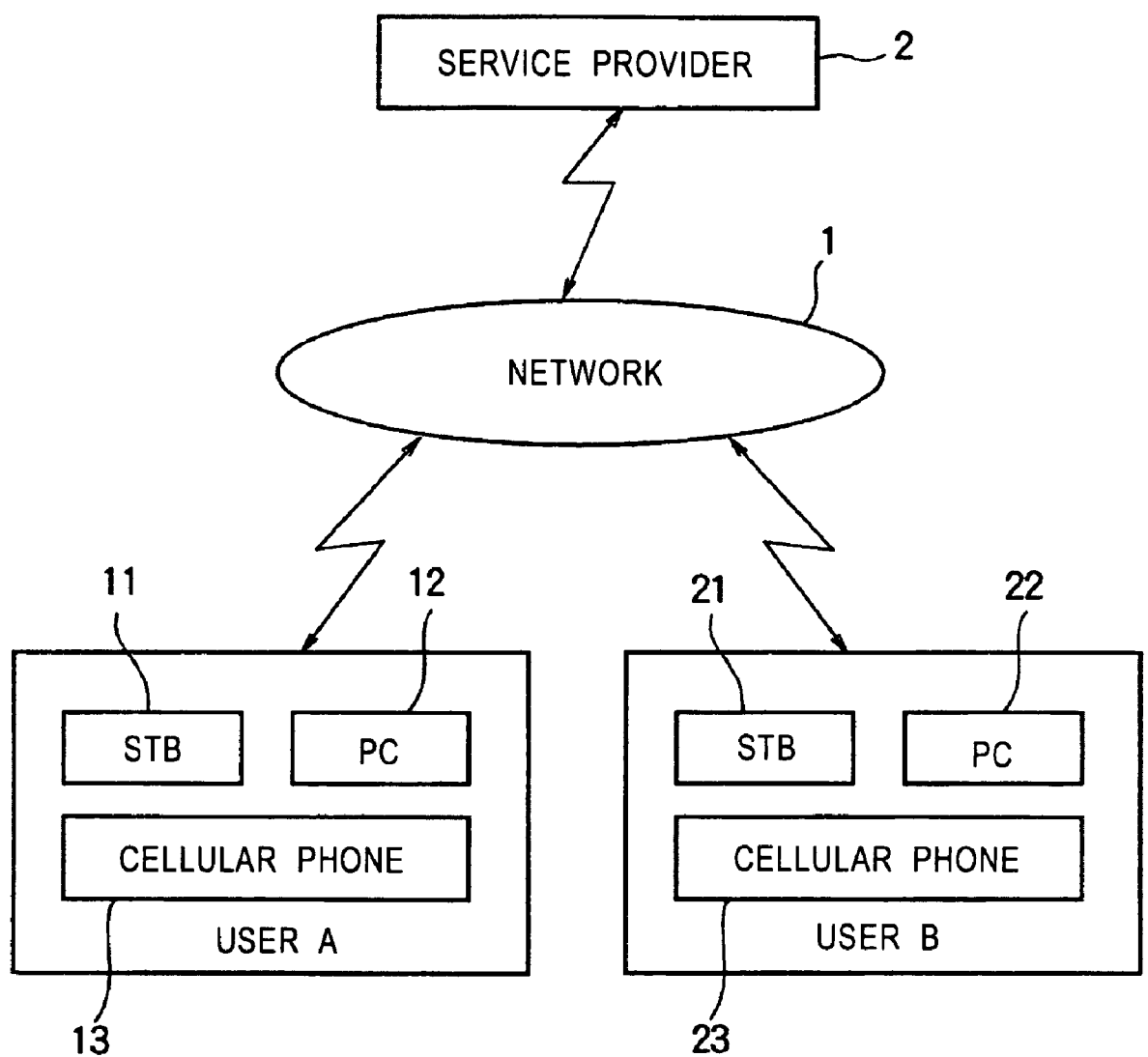
FIG. 1 is a diagram which shows a configuration of an information processing system according to an embodiment of the present invention.

Description will be made below regarding embodiments according to the present invention with reference to the drawings. FIG. 1 is a diagram which shows a configuration of an information processing system including an information processing device according to an embodiment of the present invention. A network 1 is formed of the Internet, LAN (Local Area Network), or the like. The network 1 is connected to a service provider 2. Here, the service provider 2 performs services for providing content data to a device on the user side.

The user A has an STB (Set Top Box) 11, PC (Personal Computer) 12, and a cellular phone 13, for connecting to the network 1. In the same way, the user B has a an STB (Set Top Box) 21, PC (Personal Computer) 22, and a cellular phone 23, for connecting to the network 1. The STBs 11 and 21, and the PCs 12 and 22, have a configuration wherein the devices are connected to the network 1 at the home of the user A and user B, respectively. On the other hand, the cellular phones 13 and 23 have a configuration wherein each device can be connected to the network 1, even at a place other than the home of the user A or the user B.

Let us say that the STB 11, PC 12, and cellular phone 13, of the user A, have the same basic configurations and functions as with the STB 21, the PC 22, and the cellular phone 23, of the user B, respectively. Accordingly, description will be made hereafter with reference to the STB 11, the PC 12, and the cellular phone 13, as examples of the aforementioned devices, unless particularly necessary, and description regarding the STB 21, the PC 22, and cellular phone 23, is redundant, and accordingly, description thereof will be omitted.

Figure 2:
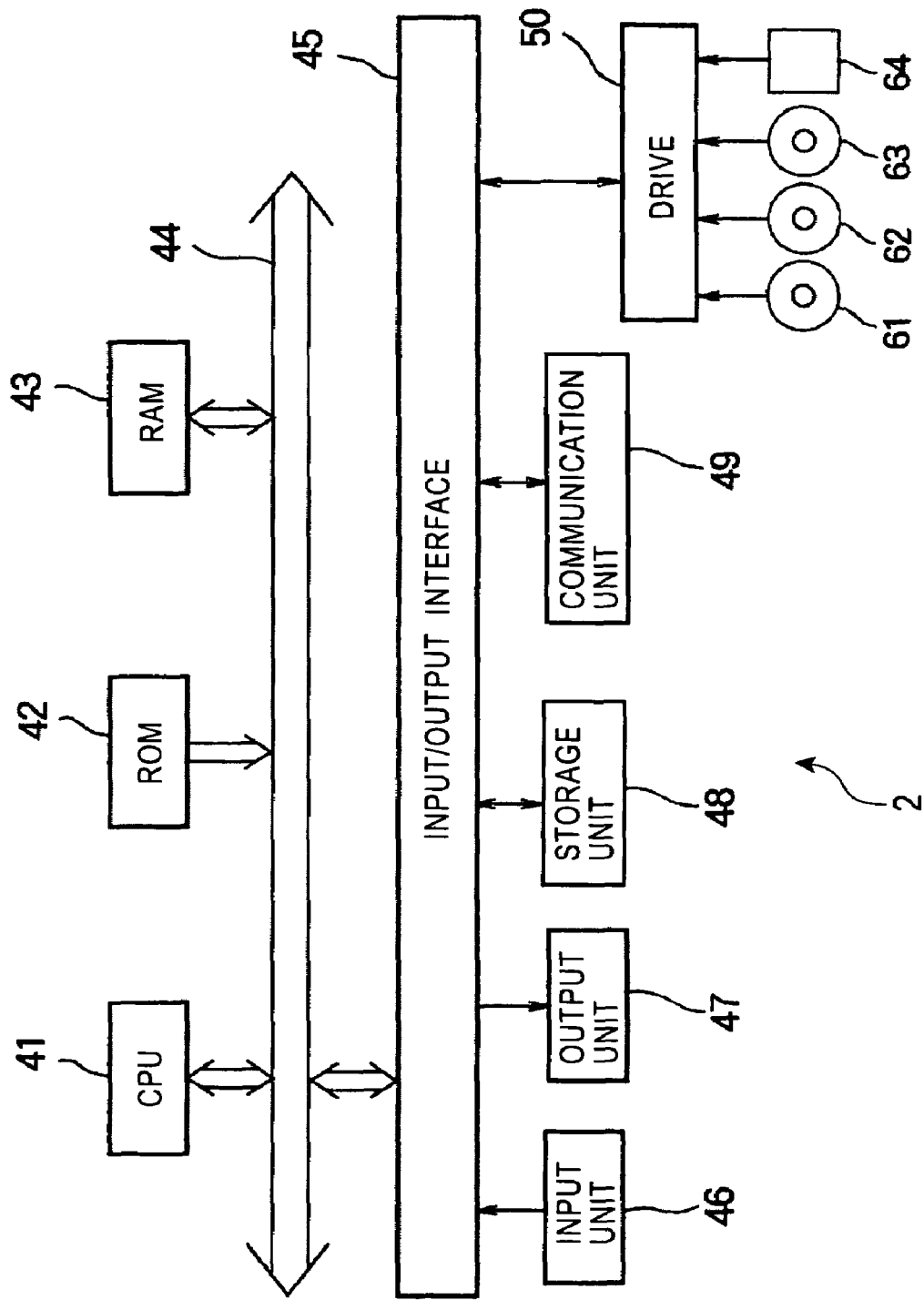
FIG. 2 is a block diagram which shows a configuration example of a service provider.

FIG. 2 is a block diagram which shows a configuration example of the service provider 2. The service provider 2 is formed of a computer and the like. A CPU (Central Processing Unit) 41 of the service provider 2 performs various kinds of processing according to programs stored in ROM (Read Only Memory) 42. RAM (Random Access Memory) 43 stores data and programs, required for the CPU 41 performing various kinds of processing, as necessary. An input/output interface 45 is connected to a input unit 46 formed of a keyboard, mouse, and the like, and outputs the signals input from the input unit 46 to the CPU 41. Furthermore, the input/output interface 45 is connected to an output unit 47 formed of a display, a speaker, and the like, as well.

Furthermore, the input/output interface 45 is connected to a storage unit 48 formed of a hard disk or the like, and a communication unit 49 for performing transmission/reception of data to/from other devices (e.g., STB 11) through the network 1 formed of the Internet or the like. The drive 50 reads/writes data from/to a storage medium such as a magnetic disk 61, an optical disk 62, a magneto-optical disk 63, semiconductor memory 64, or the like.

Figure 3:
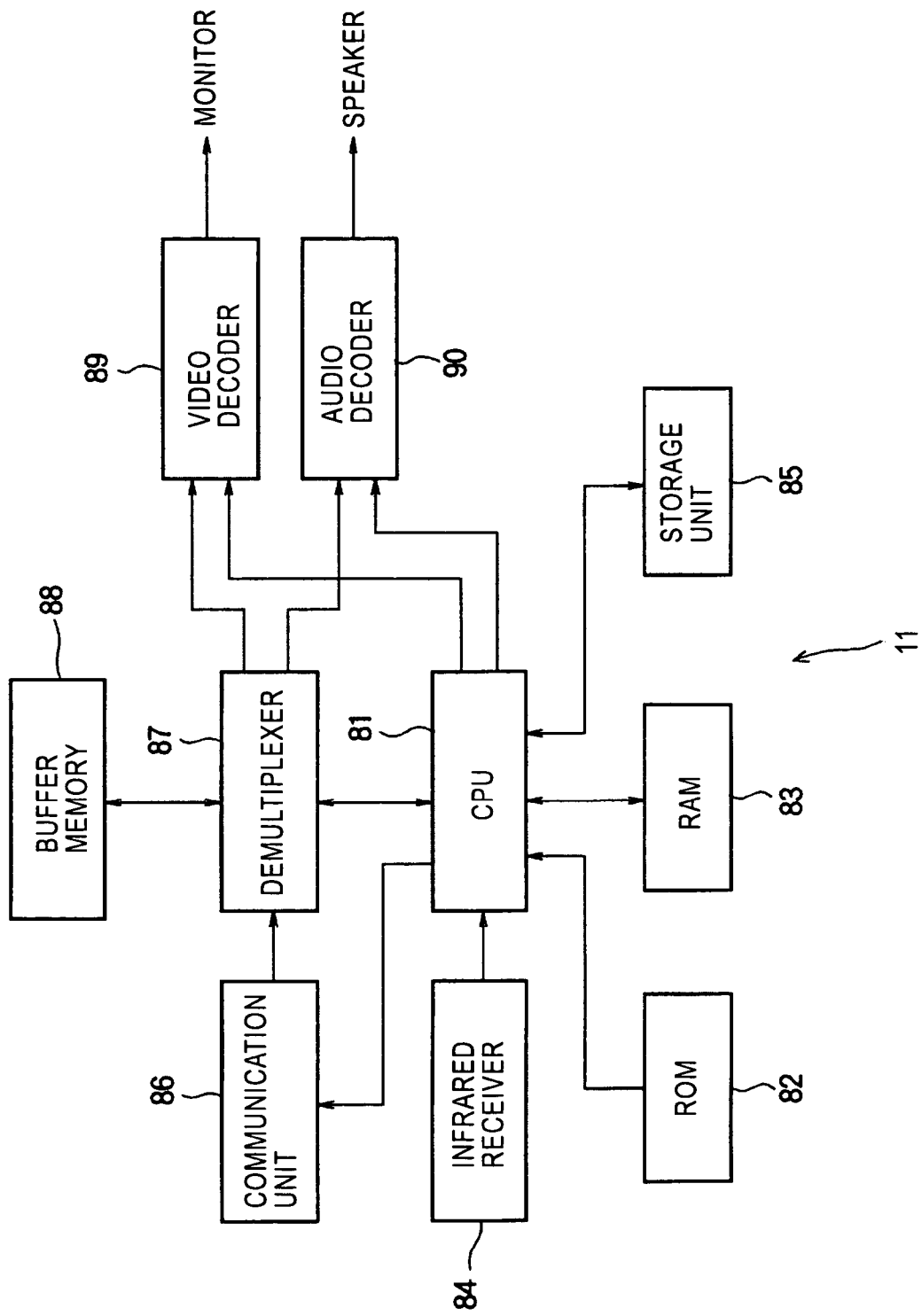
FIG. 3 is a block diagram which shows a configuration example of an STB.

FIG. 3 is a diagram which shows an internal configuration example of the STB 11. A CPU 81 loads control programs stored in ROM 82 into RAM 83, and controls all operations of the STB 11 according to instructions supplied by the user through an infrared receiving unit 84.

For example, upon the user making an instruction for displaying EPG (Electronic Program Guide) on an unshown monitor connected to the STB 11, the CPU 81 performs processing for displaying images on the monitor based upon EPG data supplied from a demultiplexer 87.

The infrared receiving unit 84 receives infrared rays cast from an unshown remote controller for the STB 11 so as to output commands corresponding to the instructions from the user, to the CPU 81.

A storage unit 85 stores information with regard to programs scheduled for recording or viewing, or information with regard to IDs supplied from other devices (in this case, the service provider 2). The communication unit 86 extracts signals from a predetermined channel according to instructions from the CPU 81, performs analog/digital conversion processing, QPSK (Quadrature Phase Shift Keying) decoding processing, error correction processing, or the like, for the extracted signals, and outputs obtained transport streams to the following demultiplexer 87. Furthermore, the communication unit 86 performs reception of data from the service provider 2 through the network 1, and performs processing for the received data.

The demultiplexer 87 temporarily stores supplied transport streams in buffer memory 88, unscrambles the data using a unscrambling key supplied from an unshown IC card, for example. Subsequently, the demultiplexer 87 extracts packets forming video data of the program instructed from the CPU 81 from the data subjected to unscrambling based upon the identifier thereof, and outputs the extracted packets to a video decoder 89. Furthermore, the demultiplexer 87 extracts packets storing audio data of the program, and outputs the data to an audio decoder 90.

The video decoder 89 reproduces the supplied packets based upon the MPEG (Moving Picture Experts Group) 2 method, for example, and supplies the reproduced video signals to the unshown monitor so as to display the video signals.

The audio decoder 90 reproduces the supplied packets in the same way, and supplies the reproduced audio signals to the unshown speaker so as to output the audio signals.

Figure 4:
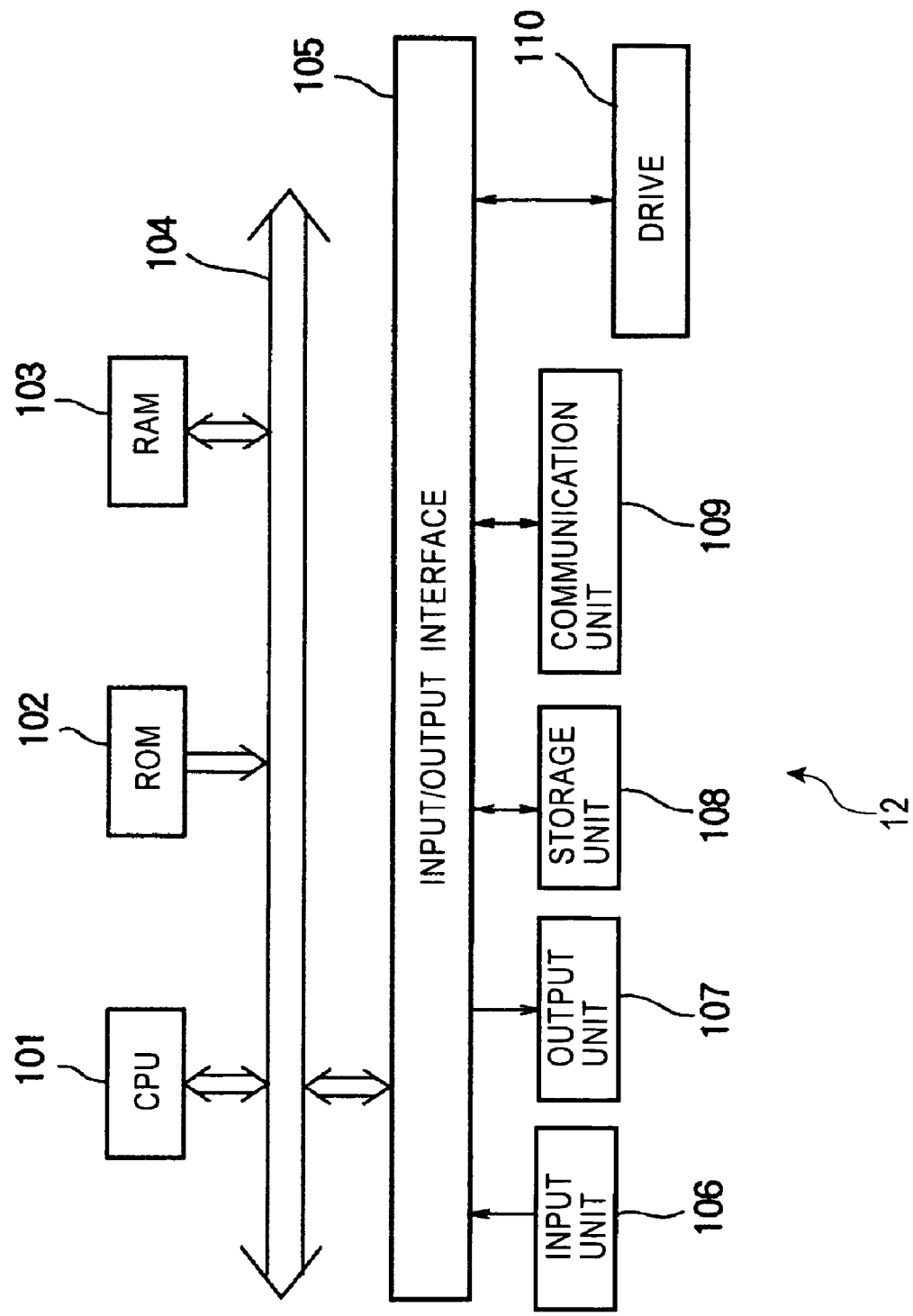
FIG. 4 is a block diagram which shows a configuration example of a PC.

FIG. 4 is a block diagram which shows an internal configuration example of the PC 12. A CPU 101 of the PC 12 executes various kinds of processing according to the programs stored in ROM 102. RAM 103 stores data, program, and the like, required for the CPU 101 executing various kinds of processing, as necessary. An input/output interface 105 is connected to an input unit 106 formed of a keyboard, a mouse, and the like, and outputs the signals input from the input unit 106 to the CPU 101. Furthermore, the input/output interface 105 is connected to an output unit 107 formed of a display, a speaker, and the like.

Furthermore, the input/output interface 105 is connected to a storage unit 108 formed of a hard disk or the like, and a communication unit 109 for performing transmission/reception of data to/from other devices (e.g., the service provider 2) through the network 1 formed of the Internet or the like, as well. A drive 120 reads/writes data from/to a storage medium such as a magnetic disk or the like.

Figure 5:
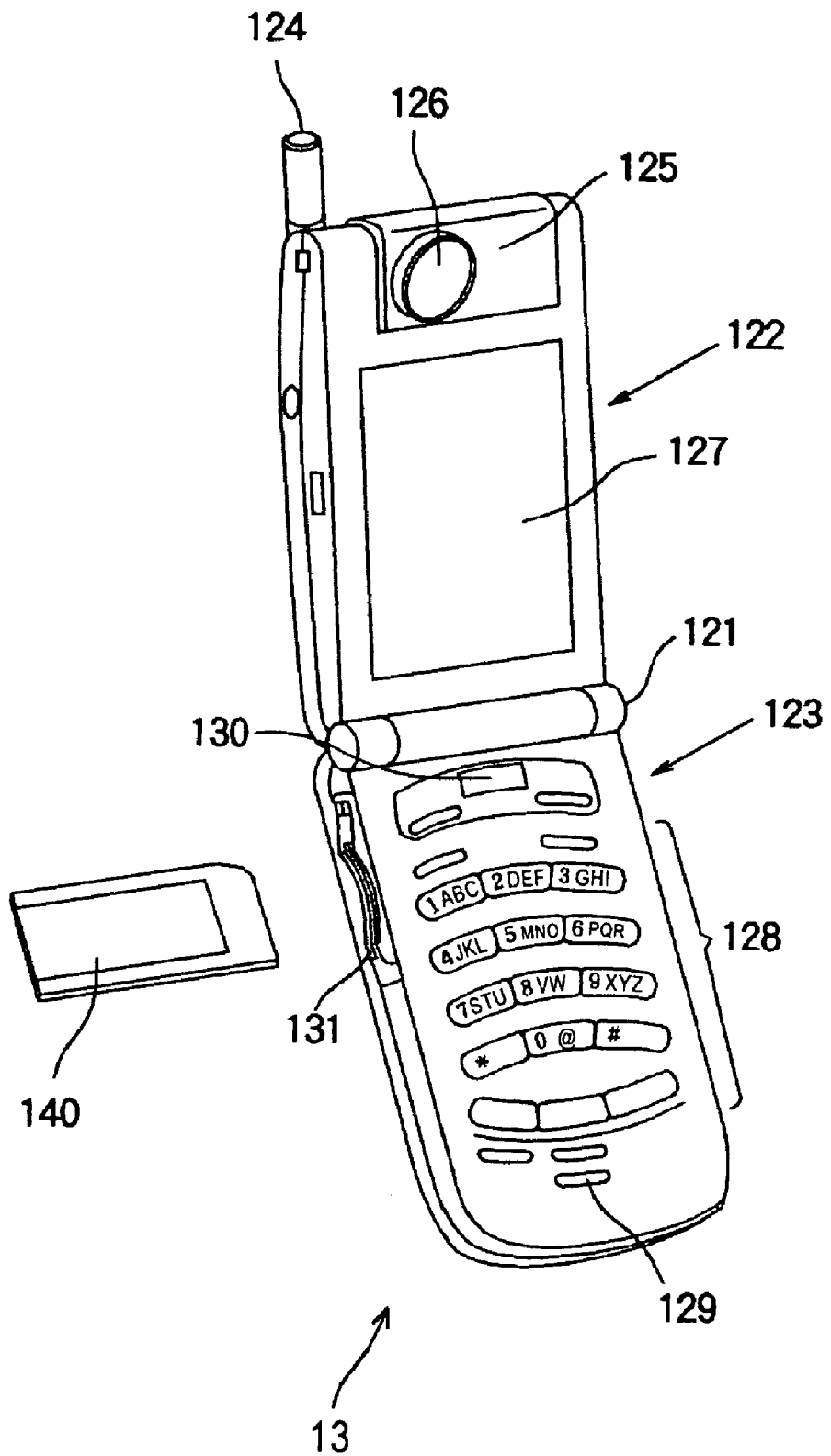
FIG. 5 is a diagram which shows an external configuration example of a cellular phone.

FIG. 5 is a diagram which illustrates an external-view configuration example of the cellular phone 13. As shown in FIG. 5, the cellular phone 13 is divided by a hinge portion 121 at the center thereof into a display unit 122 and a main unit 123, and has a configuration wherein the cellular phone 13 can be folded on the hinge portion 121.

The display unit 122 includes an antenna 124 for transmission/reception at the upper-left end thereof with a configuration wherein the antenna 124 can be extended and collapsed, for performing transmission/reception of radio waves to/from a base station through the antenna 124 for controlling connection to the network 1. Furthermore, the display unit 122 includes a camera unit 125 at the upper-middle portion thereof, which can be turned generally in the angle range of 180°, and has a configuration for taking images of a desired subject with a CCD camera 126 of the camera unit 125.

Furthermore, the cellular phone has a configuration wherein upon the user turning over the camera unit 125, a speaker (not shown) turns up instead of the CCD camera 126, and the user can hear audio from the speaker.

Furthermore, the display unit 122 includes a liquid crystal display 127 on the front thereof for displaying the body of an electronic mail, an easy homepage, an image taken with the CCD camera 126 of the camera unit 125, and the like, as well as the air-wave reception status, the remaining battery power, names and phone numbers registered in the phone book thereof, and the call history.

Furthermore, the main unit 123 includes operation keys 128 formed of ten keys for inputting "0" through "9", a call key, a redial key, an on-hook key, a power key, a clear key, an electronic-mail key, and the like, on the face thereof, enabling the user to input various kinds of instructions.

Furthermore, the main unit 123 includes a microphone 129 for collecting voice of the user during telephone conversation. Furthermore, the main unit 123 includes a jog dial 130 rotatably disposed on the upper portion of the operation keys 128 with the jog dial 130 protruding slightly from the face of the main unit 123, for performing various kinds of operations such as scroll operations of a phone-book list or an electronic mail displayed on the liquid crystal display 127, turning of pages of an easy homepage, browsing through images, and the like, according to turning operations of the jog dial 130 from the user.

Furthermore, the main unit 123 includes a memory-stick slot 131 on the upper-left portion thereof for detachably mounting a memory stick (trademark of Sony Corporation) 140 for storing electronic mails, easy homepages, and images taken with the CCD camera 126, according to the user operation.

As described above, the cellular phone 13 has a configuration for mounting the memory stick 140, thereby enabling data sharing with other electronic devices through the memory stick 140.

Figure 6:
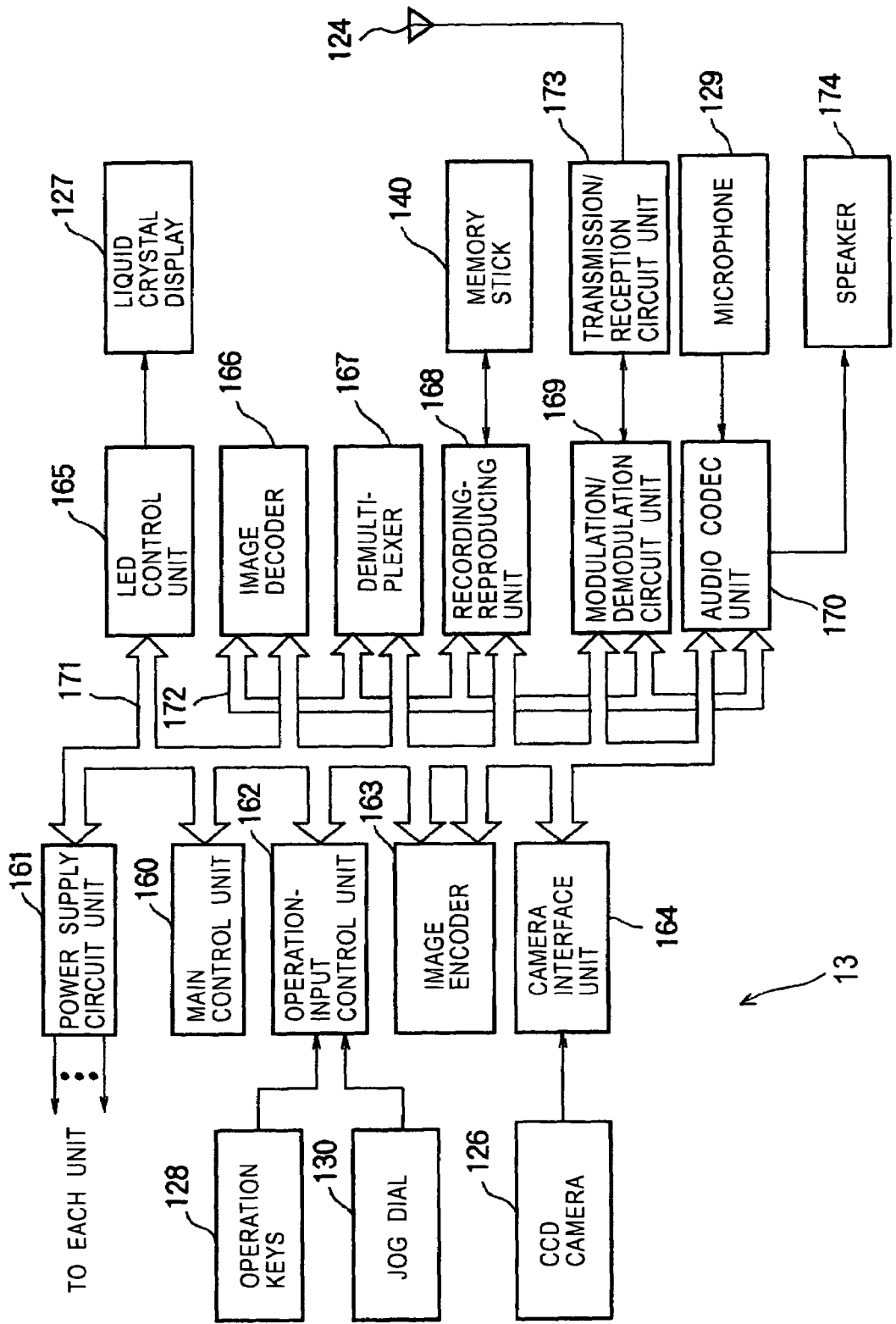
FIG. 6 is an internal configuration example of the cellular phone.

As shown in FIG. 6, the cellular phone 13 comprises a main control unit 160 for centrally controlling each portion of the display unit 122 and the main unit 123, a power supply circuit unit 161, an operation-input control unit 162, an image encoder 163, a camera interface unit 164, an LCD (Liquid Crystal Display) control unit 165, an image decoder 166, a demultiplexer 167, a recording reproducing unit 168, a modulation/demodulation circuit unit 169, and an audio CODEC 170, connected one to another through a main bus 171, as well as the image encoder 163, the image decoder 166, the modulation/demodulation circuit unit 169, and the audio CODEC 170, connected one to another through a synchronization bus 172.

Upon user turning on the termination key or the power key, the power supply circuit 161 supplies electric power to each portion from a battery pack, whereby the cellular phone 13 is turned on, and is in the standby mode.

The cellular phone 13 collects audio signals with the microphone 129 when in the audio conversation mode, and converts the collected audio signals into digital audio data with the audio CODEC 170 under the control of the main control unit 160 formed of a CPU, ROM, RAM, and the like, following which the digital audio data is subjected to spectrum diffusion processing in the modulation/demodulation circuit unit 169, and is subjected to digital/analog conversion processing and frequency conversion processing in a transmission/reception circuit unit 173, whereby the digital audio data is transmitted through the antenna 124.

Furthermore, with the cellular phone 13, when in the audio conversation mode, the signals received through the antenna 124 are amplified, and are subjected to frequency conversion processing and analog/digital conversion processing, following which the converted digital signals are subjected to inverse spectrum diffusion processing in the modulation/demodulation circuit unit 169, and are converted to analog audio signals in the audio CODEC 170, whereby the analog audio signals are output with the speaker 174.

In the event that the cellular phone 13 receives data of a moving image file linked to an easy homepage or the like, for example, when in the data communication mode, the signals received from a base station through the antenna 124 are subjected to inverse spectrum diffusion processing in the modulation/demodulation circuit unit 169, and the obtained multiplexed data is transmitted to the demultiplexer 167.

The demultiplexer 167 splits the multiplexed data into coded image data and audio data, following which the coded image data is supplied to the image decoder 166 through the synchronization bus 172, as well as the audio data being supplied to the audio CODEC 170.

The image decoder 166 decodes the coded image data with the decoding method corresponding to a predetermined coding method such as MPEG (Moving Picture Experts Group) 2, MPEG4, or the like, so as to generate reproduced image data, and the generated image data is supplied to the liquid crystal display 127 through the LCD control unit 165, whereby moving image data included in the moving image file linked to the easy homepage is displayed, for example.

At the same time, the audio CODEC 170 converts the audio data into analog audio signals, and supplies the analog audio signals to the speaker 174, whereby the audio data included in the moving image file linked to the easy homepage is reproduced, for example.

With the cellular phone 13, the received data linked to the easy homepage or the like can be recorded on the memory stick 140 through the recording/reproducing unit 168 according to the user operation.

Figure 7:
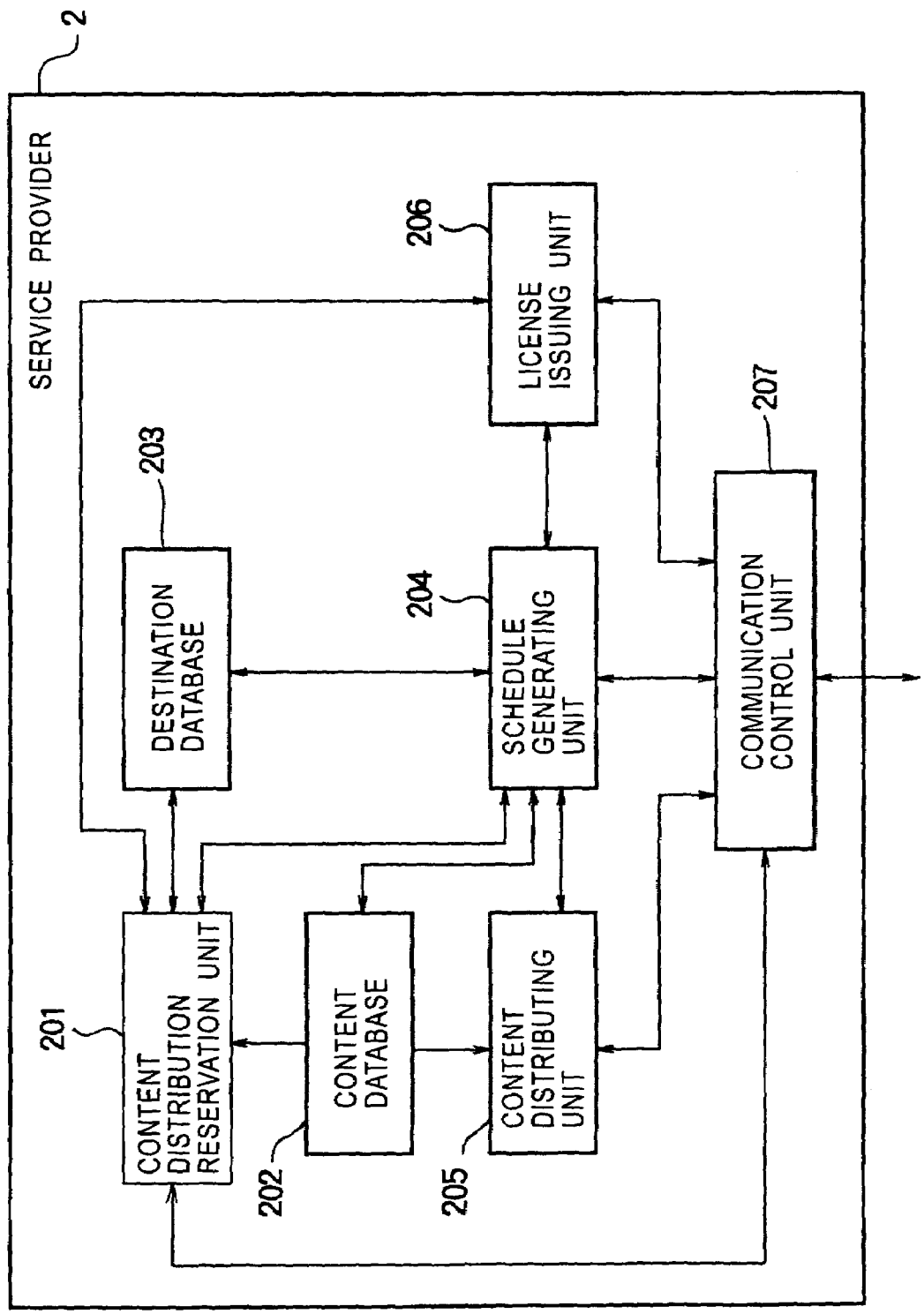
FIG. 7 is a block diagram which shows functions of the service provider.

Description will be made below regarding functions of each device having the above-described configuration for realizing the present embodiment. FIG. 7 is a functional block diagram of the service provider 2 for describing the functions thereof required for the service provider 2 performing processing described later.

A content distribution reservation unit 201 of the service provider 2 receives requests for reservation for transmission of contents or purchase thereof from the user. The content data base 202 stores the body of the contents (which will be referred to as "content data" hereafter, as appropriate), and information data (which will be referred to as "appended data of contents" hereafter, as appropriate) with regard to the properties of the content data such as the size of the content data, expiration date, and the like, correlated one to another.

A destination database 203 stores information with regard to the users who have made a contract for purchase of content data or the like beforehand (which will be referred to as "user information" hereafter, as appropriate). Upon the content distribution reservation unit 201 receiving a request of reservation for transmission of contents or purchase thereof from the user, the content distribution reservation unit 201 refers to the appended data of contents stored in the content database 202 and the user information stored in the destination database 203 so as to make a determination whether or not the request should be permitted. As a result, in the event that determination is made that the request should be permitted, the destination database 203 outputs predetermined information to a schedule generating unit 204.

The content distribution reservation unit 201 manages the data with regard to the sites (homepages which the user can browse on the network 1) which accept a request for reservation for transmission of predetermined contents or purchase thereof from the user A (FIG. 1), as well, and provides such data to the user, thereby enabling the user to make a request for reservation or purchase thereof by referring to the screen based upon the data.

The schedule generating unit 204 generates a transmission schedule which determines the timing for providing to the user side the content data corresponding to the contents requested by the user. A content distribution unit 205 reads out the content data from the content database 202 based upon the generated schedule, and transmits the data to the device on the user side.

A license issuing unit 206 issues license data for appending the content data which is to be provided to the user. Note that the license data is appended so as to enable the content data to be normally reproduced on the user side while preventing unauthorized reproducing. A communication control unit 207 controls transmission/reception of data within the service provider 2 through the network 1.

Description will be made regarding the relation between the service provider 2 shown in FIG. 2 and the service provider 2 shown in FIG. 7. The content database 202 and the destination database 203 are databases included within the storage unit 48. Furthermore, an arrangement may be made wherein a unit for storing the data with regard to the sites where the content distribution reservation unit 201 manages is included in the storage unit 48.

Programs stored in the ROM 42 or the storage unit 48 are initiated, and the CPU 41 executes processing according to the running programs, whereby the content distribution reservation unit 201, the schedule generating unit 204, the content distribution unit 205, and the license issuing unit 206, exhibit functions thereof. Accordingly, the programs, data, and the like, are loaded into the RAM 43, and stored therein, as necessary.

The communication control unit 207 has functions for controlling transmission/reception of data performed by the communication unit 49.

Figure 8:
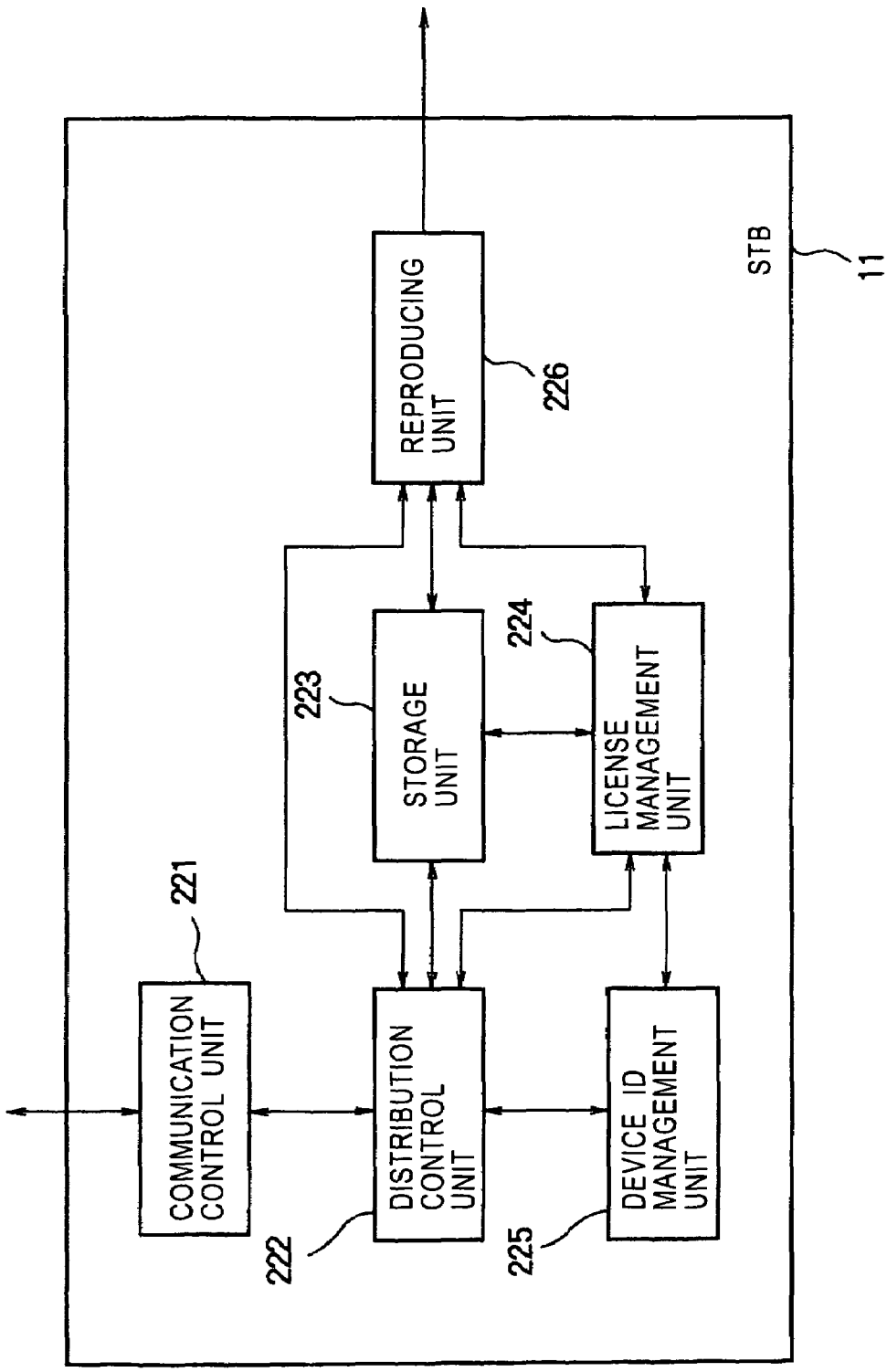
FIG. 8 is block diagram which shows functions of the STB.

Description will be made regarding the functions of the STB 11 which performs transmission/reception of data to/from the service provider 2 having such functions. FIG. 8 is a functional block diagram which shows functions required for performing transmission/reception of data to/from the service provider 2, and processing described later, included in the functions of the STB 11. A communication control unit 221 controls transmission/reception of data to/from the service provider 2 through the network 1. The data controlled by the communication control unit 221 is supplied to the distribution control unit 222.

The distribution control unit 222 controls transmission/reception of content data and the data with regard to the transmission schedule to/from the service provider 2. A storage unit 223 stores the content data supplied from the distribution control unit 222. A license management unit 224 stores the license data supplied from the distribution control unit 222, and controls the storage unit 223 for storing the content data, or a reproducing unit 226 for reproducing content data, based upon the stored license data. A device ID management unit 225 manages the device IDs serving as information for identifying the STB 11, which is supplied from the service provider 2.

Now, description will be made regarding the relation between the STB 11 shown in FIG. 3 and the STB 11 shown in FIG. 8. The communication control unit 221 exhibits functions for controlling communication performed in the communication unit 86. Furthermore, a storage unit 223 for storing the license data which is managed by the license management unit 224, and a storage unit for storing the device IDs which are managed by the device ID management unit 225, are included in the storage unit 85.

Programs stored in the ROM 82 or the storage unit 85 are initiated, and the CPU 81 executes processing according to the running programs, whereby the distribution control unit 222, the license management unit 224, and the device ID management unit 225, exhibit functions thereof. Accordingly, the programs, data, and the like, are loaded into the RAM 83, and stored therein, as necessary.

The reproducing unit 226 has functions performed by the demultiplexer 87, the video decoder 89, and the audio decoder 90, and the like, for performing reproducing.

Next, description will be made regarding transmission/reception of data between the service provider 2 and the STB 11. In order to download content data from the service provider 2 to the STB 11, the STB 11 (the user A) needs to make a contract with the service provider 2 (company which manages the service provider 2). Here, description will be made under the assumption that upon the user making a contract with the service provider 2, the service provider 2 provides a device ID for identifying the STB 11, and as a result, the STB 11 is registered with the service provider 2.

Description will be made regarding processing for registering the STB 11 with the service provider 2 with reference to the flowchart shown in FIG. 9. In Step S11, the STB 11 accesses the service provider 2. Specifically, upon the user A performing a predetermined operation for the STB 11, the STB accesses the service provider 2 through the network 1.

In Step S21, upon the service provider 2 receiving a request for access from the STB 11, in Step S22, the service provider 2 transmits data with regard to a registration form. Note that an arrangement may be made wherein the service provider 2 performs processing for confirming whether or not the STB 11 which has made a request for access has been already registered, or the like, prior to transmitting data with regard to the registration form, in order to avoid transmission of data for the registration form to the STB 11 which has been already registered. Here, description will be made regarding processing for registration under an assumption that data for the registration form is transmitted.

The processing in Step S22 is performed in the content distribution reservation unit 201 (FIG. 7). That is to say, a request for access from the STB 11, i.e., a request for registration, in this case, as a result, is supplied to the content distribution reservation unit 201 under control of the communication control unit 207 of the service provider 2. The content distribution reservation unit 201 manages data for an initial screen which is to be provided upon receiving a request for access, or a dedicated initial screen for registration, and transmits the managed data as data for a registration form.

In Step S12, the data for the initial screen transmitted from the service provider 2 is received by the STB 11. The data for the initial screen received under control of the communication control unit 221 of the STB 11 is supplied to the distribution control unit 222. Upon determination being made that the data with regard to the initial screen is supplied (transmitted), the distribution control unit 222 supplies the data to the reproducing unit 226.

Figure 10:
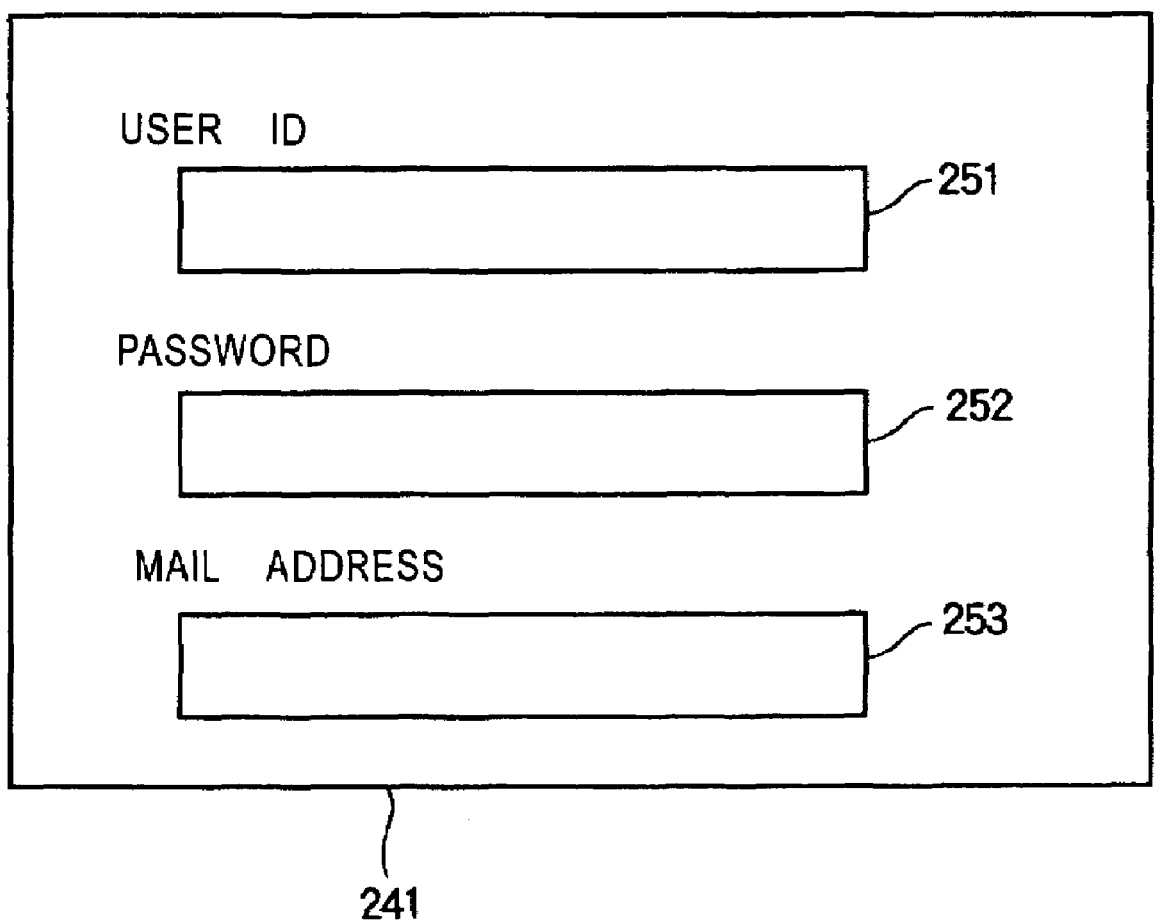
FIG. 10 is a diagram which shows a screen example displayed on a TV receiver.

The reproducing unit 226 reproduces the supplied data. As a result, a screen such as shown in FIG. 10 is displayed on the screen of a TV receiver connected to the STB 11, for example. FIG. 10 shows an initial screen for registration including a user ID input field 251 for inputting the user ID, a password input field 252 for inputting a password, and a mail-address input field 253 for inputting a mail address.

The user ID is a string formed of a predetermined number of characters including alphanumeric and kana symbols, and the like, which can be freely decided by the user. The password is a string formed of a predetermined number of characters which can be freely decided by the user, as well. The mail address is required for the STB 11 performing transmission/reception of a mail which is referred to as "electronic mail" or the like. In the event that the STB 11 has an assigned address, an arrangement may be made wherein the assigned address is employed as the mail address.

However, in order to perform processing described later, the mail address input to the mail-address input field 253 is preferably a mail address assigned to a device other than the STB 11, e.g., the PC 12 or the cellular phone 13. Accordingly, an arrangement may be made wherein the mail address input field 253 is indicated by a specific label of "mail address of PC or cellular phone" or the like, rather than a label of "mail address" as shown in FIG. 10.

While description has been made regarding an arrangement wherein the user ID, the password, and the mail address, are input, an arrangement may be made wherein other information is input, in addition to the aforementioned information. The STB 11 should be identified using the information input on the screen. In this case, the STB 11 of the user A is discriminated from other STBs (e.g., STB 21 (FIG. 1)) with the user ID.

With the present embodiment, the STB 11 is identified using the user ID, and accordingly, an arrangement may be made wherein the mail address is employed as the user ID. That is to say, an arrangement may be made wherein the STB 11 is identified using the mail address. In the event that the user ID is employed as the mail address, the screen on the TV receiver 241 shown in FIG. 10 needs not include both the user ID input field 251 and the mail-address input field 253; one or the other is sufficient.

Furthermore, while description has been made regarding an arrangement wherein the screen as shown in FIG. 10 is displayed on the TV receiver 241 on the user side, an arrangement may be made wherein an item of "registration" is further included as a new selection item in the initial screens provided by the service provider 2, wherein upon the user selecting the item of "registration", the screen as shown in FIG. 10 is displayed on the TV receiver 241. In this case, transmission/reception of data with regard to screens is performed between the STB 11 and the service provider 2 generally in the same way as described above.

Now, description will be made regarding an arrangement wherein the screen as shown in FIG. 10 is displayed on the TV receiver 241 on the user side for the user inputting the user ID, the password, and the mail address.

Figure 9:
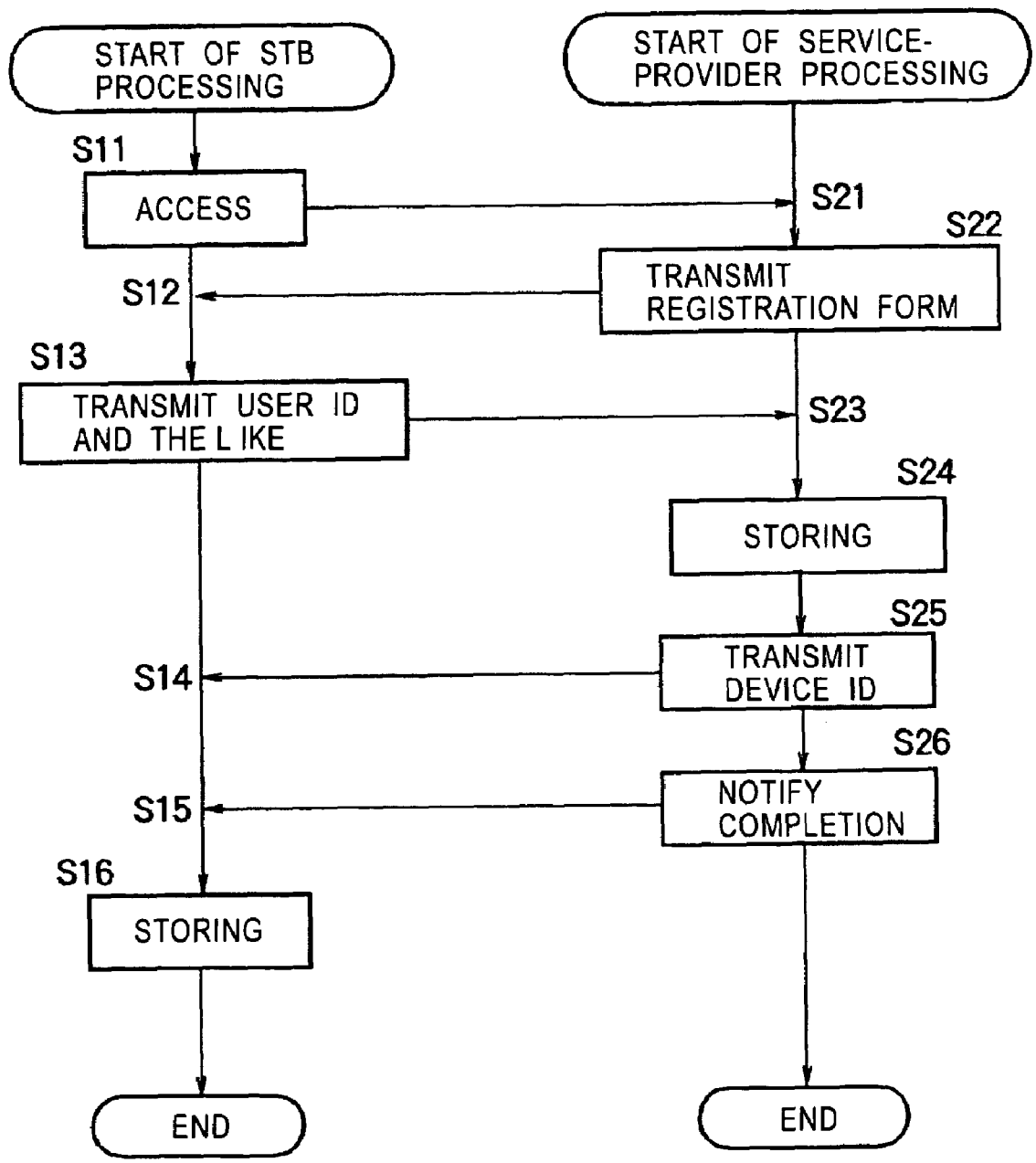
FIG. 9 is a flowchart for describing the processing for making registration of a device.

Returning to the description of the flowchart shown in FIG. 9, upon the user inputting a desired string on the screen as shown in FIG. 10 in Step S13, the data is transmitted to the service provider 2. Upon the service provider 2 receiving the data regarding the user ID and the like in Step S23, the service provider 2 stores the user ID, the password, and the mail address, from the received data in Step S24.

Now, description will be made regarding processing for storage performed in Step S24. The data with regard to the user ID and the like from the STB 11 is received by the communication control unit 207 of the service provider 2, and is supplied to the content distribution reservation unit 201. As described above, the processing performed by the content distribution reservation unit 201 includes processing for registration.

Upon determination being made that the data supplied from the communication control unit 207 has been transmitted from the STB 11 (the user) which has made a request for new registration, the content distribution reservation unit 201 writes the data to the destination database 203 (controls the destination database 203 to store the data). FIG. 11 is a diagram which shows a configuration example of the data stored in the destination database 203. As shown in FIG. 11, the destination database 203 manages the device ID, the user ID, the password, and the mail address, correlated one to another. Here, the data as shown in FIG. 11 stored in the destination database 203 will be referred to as "destination table", as appropriate.

The destination table includes the device IDs beforehand. With the destination table shown in FIG. 11, the destination table includes (prepares) the device IDs in the range between 000001 and 999999. Note that description has been made regarding an arrangement wherein the destination table includes the device IDs beforehand, an arrangement may be made wherein a device ID is generated for each registration.

The user ID, the password, and the mail address, received in Step S23, are written to the corresponding portions of such a destination table, respectively. FIG. 11 shows an example wherein the user ID of "a1b2c3", the password of "pppp", and the mail address of "mmm@z.co.jp" received in Step S23 are written to the fields corresponding to the device ID "000001".

Such writing (storage) of information to the destination database 203 is performed in Step S24. Upon completion of the writing processing, the device ID is transmitted in Step S25. The device ID corresponding to the fields where information has been written is transmitted from the service provider 2 in Step S25. That is to say, in this case, the device ID of "000001" is read out, and this device ID is transmitted to the STB 11.

Completion of transmission of the device ID on the side of the service provider 2 means completion of processing for registration of the STB 11, and notification of completion of registration is given in order to notify the user having the STB 11 of the completion in Step S26.

With regard to the notification of completion of registration, an arrangement may be made wherein a simple message of "registration has been completed" is displayed on the screen of the TV receiver 241 connected to the STB 11, or an arrangement may be made wherein other messages or images are displayed thereon.

Furthermore, an arrangement may be made wherein in the event that the user ID, regarding which has been made a request for registration, is already stored in the destination database 203, a message for notifying the user that the user ID should be changed is transmitted as well as the message for notifying the user that the registration has been completed, following the user ID being changed.

Here, the reason all the user IDs in the destination table are set to IDs different one from another is that the STB 11 is identified using the user ID as described above. That is to say, if the same user ID is set for both the STB 11 and another device, the service provider 2 cannot discriminate the STB 11 from the other device, and accordingly, a different user ID needs to be set for each device.

On the other hand, the STB 11 receives the device ID from the service provider 2 in Step S14, and receives notification of completion in Step S15. The device ID received in Step S14 is stored in the device ID management unit 225 (FIG. 8) of the STB 11 in Step S16. In Step S15, processing for registration is completed, and processing for changing the user ID, or the like is performed, according to the notification of completion received in Step S15. In a case of performing processing for changing the user ID, only in the event that the change of the user ID is permitted by the service provider 2, the user ID is stored in Step S16.

On the other hand, at the time of the user inputting a string to each field provided on the screen as shown in FIG. 10, the processing for inputting the string is performed with a remote controller (not shown) for inputting instructions to the STB 11. However, in general, the remote controller does not have a configuration suitable for inputting characters. Furthermore, the STB 11 may not have functions for inputting a string.

Accordingly, as described above, processing for registering the STB 11 with the service provider 2 is preferably performed with a device which has a configuration suitable for inputting a string, rather than the STB 11, in order to facilitate the user making a registration. Accordingly, description will be made regarding processing for registering the STB 11 with the service provider 2 with reference to the flowchart shown in FIG. 12, taking a case wherein the PC 12 is used for inputting a string as an example, since the PC 12 has a configuration suitable for inputting a string.

In Step S41, the STB 11 accesses the service provider 2. The service provider 2 receives a request for access from the STB 11 in Step S61. The processing for connecting the STB 11 and the service provider 2 is performed in the same way as in Steps S11 and S21 shown in FIG. 9.

In Step S62, the service provider 2 transmits the device ID and an alias ID to the STB 11. The device ID is not available for the user, i.e., the user cannot recognize the device ID. On the other hand, the alias ID is available for the user, i.e., the user can recognize the user ID.

Here, description will be made regarding an arrangement example wherein both the device ID and the alias ID are provided from the service provider 2. The service provider 2 stores the device ID and the alias ID beforehand, correlated one to another. Accordingly, the service provider 2 can identify the device ID using the alias ID.

In Step S62, upon the service provider 2 transmitting the device ID and the alias ID to the STB 11, the STB 11 receives the device ID and the alias ID in Step S42. The reception is performed under control of the communication control unit 221, and the received device ID and alias ID are supplied to the distribution control unit 222. In Step S43, the distribution control unit 222 supplies the device ID and the alias ID to the device ID management unit 225 for storing (managing) the device IDs and the alias IDs.

Upon the device ID management unit 225 storing the device ID and the alias ID as described above, the alias ID stored in the device ID management unit 225 is transmitted (provided) to the PC 12 in Step S44. The alias ID may be directly or indirectly provided to the PC 12.

First, description will be made regarding a case wherein the alias ID is directly provided from the STB 11 to the PC 12. For example, in a case of the STB 11 and the PC 12 being connected through a home network, transmission/reception of the alias ID is performed through the home network. The transmission/reception of the alias ID may be performed upon the alias ID being stored in the STB 11, or upon the PC 12 being turned on. Furthermore, an arrangement may be made wherein upon the PC 12 accessing the service provider 2 (upon the PC 12 being connected to the service provider 2), the PC 12 acquires the alias ID stored in the STB 11 through the home network, as described later. Moreover, an arrangement may be made wherein the STB 11 transmits the alias ID to the PC 12 through an electronic mail. In either case, the alias ID is directly transmitted from the STB 11 to the PC 12.

Next, description will be made regarding a case wherein the alias ID is indirectly provided from the STB 11 to the PC 12. For example, with this arrangement example, upon the STB 11 storing the alias ID, a message for notifying the user that the alias ID has been stored, and the stored alias ID, are displayed on the screen of the TV receiver 241 connected to the STB 11. The user writes the alias ID displayed on the screen of the TV receiver 241 on a paper medium or the like.

Subsequently, the user performs an operation such that the alias ID recorded on the paper medium is stored in the PC 12 (i.e., the user inputs the alias ID in a predetermined field, as described later). An arrangement may be made wherein, upon the PC 12 accessing the service provider 2 (the PC 12 being connected to the service provider 2), the user performs the above-described operation, for example.

Figure 12:
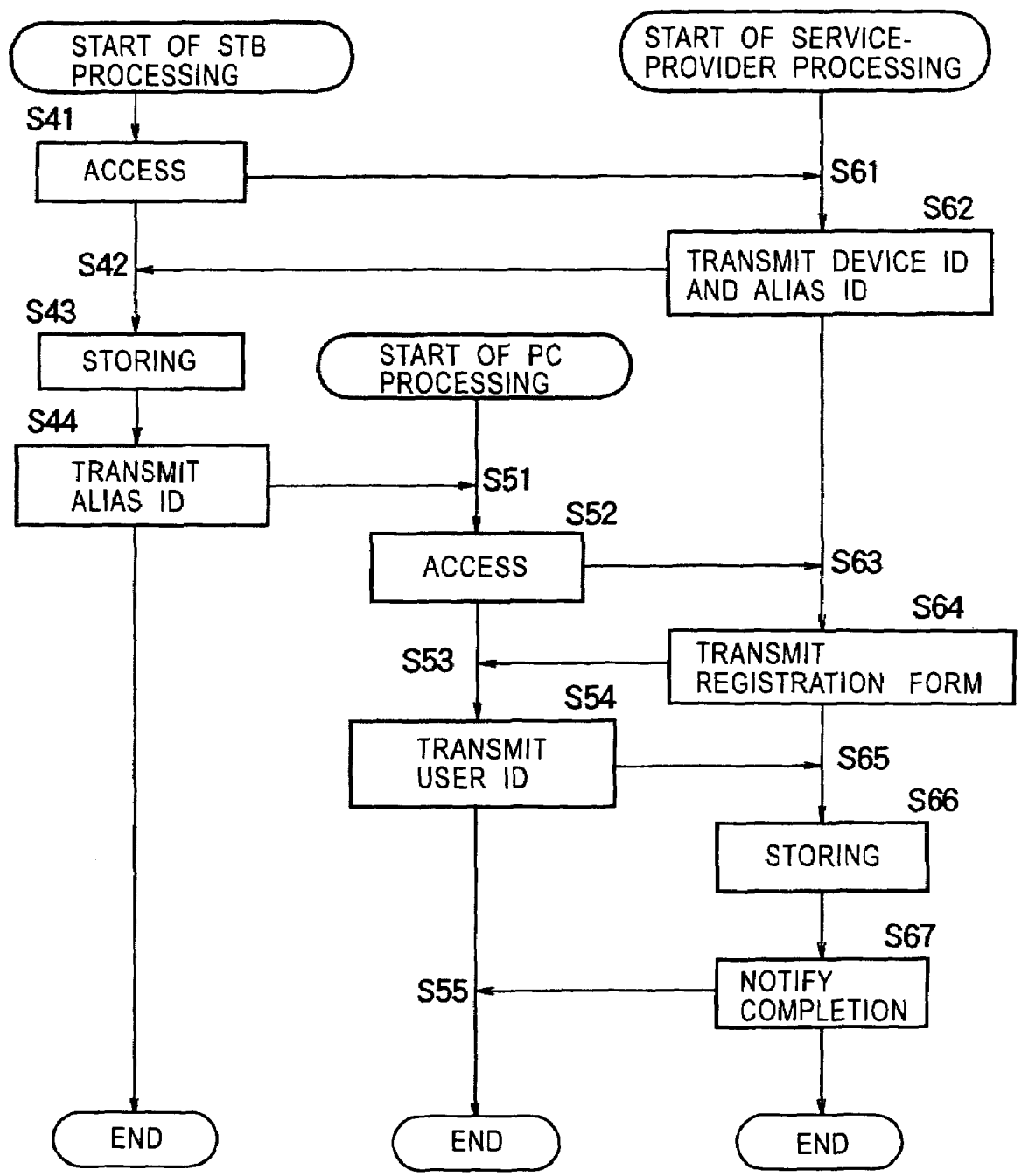
FIG. 12 is a flowchart for describing other processing for making a registration of a device.

As described above, various types of arrangements may be made for providing the alias ID from the STB 11 to the PC 12, the PC 12 may receive the alias ID from the PC 12 prior to the processing performed in Step S52 shown in FIG. 12, or following completion of the processing. The timing of transmission/reception of the alias ID may be decided based upon the method for providing the alias ID, as appropriate.

While description has been made regarding an arrangement example wherein the processing for registration is performed by the PC 12, an arrangement may be made wherein the processing for registration is performed by the cellular phone 13. That is to say, an image of the alias ID displayed on the TV receiver 241 is taken with the CCD camera 126 (FIG.

5) of the cellular phone 13, and the alias ID is obtained from the image by processing performed within the cellular phone 13, and is stored therein.

Furthermore, in a case of employing a device including an image-taking device such as the CCD camera 126, an arrangement may be made wherein the alias ID is provided to the device on the user side, using a code which is referred to as a "two-dimensional barcode" or the like, for example.

Following completion of storage of the alias ID in the STB 11, the PC 12 (or the cellular phone 13) starts to access to the service provider 2 in Step S52, regardless of the timing for the STB 11 providing the alias ID to the PC 12 (or the cellular phone 13). The service provider 2 manages the sites which the user can browse on the network 1 as described above. The user operates the PC 12 so that the PC 12 is in a standby state for browsing the sites.

Upon the PC 12 being in standby for browsing the sites which the service provider 2 manages as described above, the service provider 2 transmits data for the registration form to the PC 12 in Step S64. The transmitted data for the registration form is received by the PC 12 in Step S53. Subsequently, the output unit 107 (FIG. 4) of the PC 12 displays a screen for registration based upon the received data.

Figure 13:
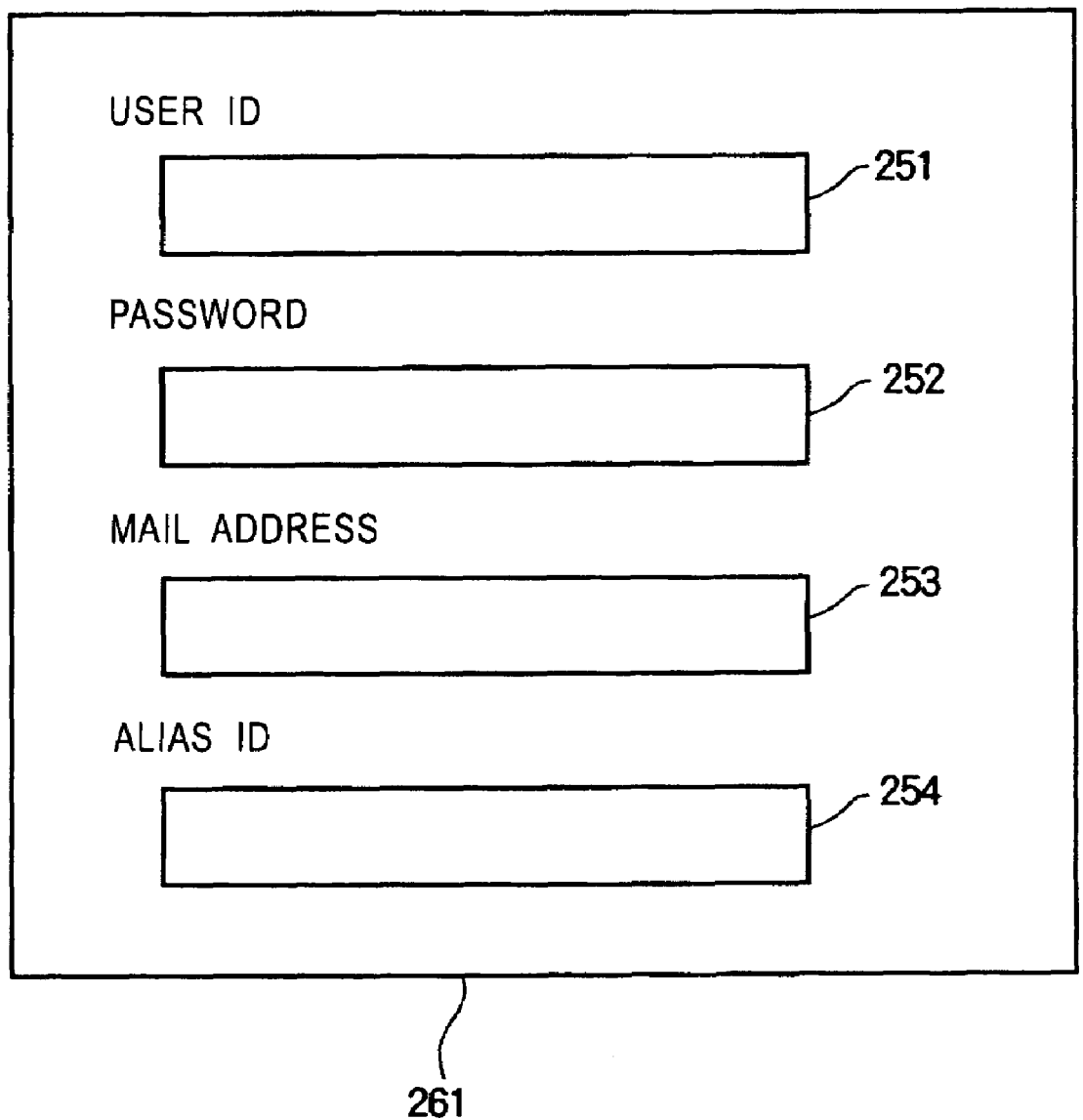
FIG. 13 is a diagram which shows a screen example displayed on a display.

FIG. 13 is a diagram which shows an example of a registration form displayed on the display 261 of the PC 12. The registration form displayed on the display 261 shown in FIG. 13 has a configuration wherein an alias ID input field 254 is added to the configuration of the registration form displayed on the TV receiver 241 shown in FIG. 10 described above for inputting the alias ID.

With the present arrangement example, the user operates a keyboard (not shown) serving as the input unit 106 of the PC 12 so as to input information (string) to each field on the registration form shown in FIG. 13. Furthermore, an arrangement may be made wherein in the event that the alias ID of the STB 11 has been already acquired, the alias ID is displayed on the alias ID input field 254 by default.

In general, the PC 12 includes a keyboard serving as the input unit 106, suitable for inputting a string, and accordingly, the PC 12 is suitably employed for inputting a string required for the registration form as compared with the STB 11. That is to say, the PC 12 has the advantage of ease of use for the user making a registration as compared with the STB 11.

Upon the user inputting required information to each predetermined field on the registration screen as shown in FIG. 13, the information is transmitted from the PC 12 to the service provider 2 in Step S54. Upon the service provider 2 receiving the information from the PC 12 in Step S65, the service provider 2 stores the received information in Step S66. Following completion of storage of the information, the service provider 2 transmits notification of completion of registration to the PC 12 in Step S67.

Upon the PC 12 receiving the notification of completion of registration from the service provider 2 in Step S55, the PC 12 performs processing, e.g., processing for displaying a message on the display 261 for notifying the user that the processing corresponding to the notification, e.g., the processing of registration has been completed.

While description has been made regarding an arrangement example wherein the processing is performed once between the STB 11, the PC 12, and the service provider 2, as shown in FIG. 12, an arrangement may be made wherein the processing is repeated multiple times. An arrangement may be made wherein the processing is repeated multiple times such that a different user ID and password is registered for each person in a family. That is to say, in this case, multiple users can make a registration for the single STB 11.

As described above, the processing shown in FIG. 12 performed between the STB 11, the PC 12, and the service provider 2, is repeated multiple times, thereby enabling the multiple users to make a registration for a single device following the STB 11 storing the device ID in Step S43. In this case, the processing may be consecutively performed multiple times, or may be intermittently performed multiple times. Note that with an arrangement example wherein the user can delete (change) the alias ID as described later, the registration processing needs to be completed prior to changing the alias ID. Note that with an arrangement example wherein the user cannot delete (change) the alias ID, or with an arrangement example wherein the user can make a registration using information other than the alias ID, there is no need to apply such a restriction.

Returning to description of the flowchart shown in FIG. 12, the service provider 2 performs processing for storage in Step S66, and processing for notifying completion of registration in Step S67, generally in the same way as with the processing in Steps S24 and S26 shown in FIG. 9. Furthermore, the processing performed by the PC 12 corresponding to the processing in Step S67 is generally the same as with the processing performed by the STB 11 corresponding to the processing in Step S26 shown in FIG. 9. Accordingly, detailed description thereof will be omitted.

Note that the processing for storage performed by the service provider 2 in Step S66 includes processing different from the processing of storage performed in Step S24 shown in FIG. 9, and accordingly, additional description will be made regarding the different processing. First, FIG. 14 shows a destination table stored in the destination database 203 (FIG. 7) of the service provider 2 in a case wherein processing is performed according to the flowchart shown in FIG. 12.

The destination table stored in the destination database 203 shown in FIG. 14 has a configuration wherein a field for writing the alias ID is added to the configuration of the destination table shown in FIG. 11. As described above, the alias ID is correlated to the device ID, and is used for identifying the device ID. Furthermore, the alias ID is provided to the user as information which the user can recognize. Accordingly, the alias ID is written on the destination table, correlated to the device ID beforehand.

While the service provider 2 manages the destination table as shown in FIG. 14, the service provider 2 transmits the device ID and the alias ID corresponding to the device ID stored in the destination table thereof, to the STB 11 in the processing shown in Step S62 (FIG. 12). That is to say, the STB 11 receives a pair of the device ID and the alias ID in the stage prior to the PC 12 accessing the service provider 2.

The service provider 2 receives information with regard to the user ID, the password, the mail address, and the alias ID in this state, from the PC 12, and more specifically, the content distribution reservation unit 201 of the service provider 2 receives the information under control of the communication control unit 207 thereof.

The content distribution reservation unit 201 reads out the alias ID from the supplied information. Subsequently, the content distribution reservation unit 201 refers to the destination table managed by the destination database 203, and determines the fields in the destination table corresponding to the read-out alias ID.

The content distribution reservation unit 201 writes the supplied user ID, password, and mail address, to the corresponding fields on the destination table. Thus, the service provider 2 writes the information with regard to each user who has made a request for reservation, to the corresponding fields of the destination table as shown in FIG. 14.

As described above, with the present embodiment, the alias ID is employed, and accordingly, the user can make a registration of a device (in this case, the STB 11) by the user operating another device (in this case, the PC 12) without disclosing the device ID which is preferably kept secret from the user.

Now, in general, the service provider 2 prepares a finite number of device IDs. However, as can be understood from the flowchart shown in FIG. 12, there is a possibility that the user may not register the STB 11 with the service provider 2 using a device such as the PC 12 or the like, following the device ID being stored in the STB 11 in step S43. That is to say, the user information may not be written to the field on the destination table corresponding to the device ID assigned to the STB 11, for a long time.

This leads to a problem in that the finite number of device IDs may include useless device IDs. Accordingly, an arrangement may be made wherein the service provider 2 has a function wherein in the event that the user does not perform processing for registration within a predetermined period in time following the STB 11 storing the device ID, the device ID can be assigned to other devices, thereby assigning a device ID to each device without generating useless device IDs.

In this case, first, the service provider 2 detects a device ID regarding which determination has been made that a predetermined period in time has elapsed without the user performing processing for registration (i.e., the device ID wherein that the service provider 2 provides the pair of device ID and alias ID, but the user does not input information with regard to the user ID and the like to the corresponding fields for the predetermined period of time). As a result of the determination, the service provider 2 changes the alias ID corresponding to the device ID which determination has been that the predetermined period in time has elapsed.

With the present arrangement, the alias ID is changed under the above-described conditions, and accordingly, the service provider 2 can perform processing wherein in the event that the user performs processing for registration of the STB 11 which stores the alias ID following the service provider 2 changing the corresponding alias ID stored in the service provider 2, the registration is not permitted. Furthermore, with the present arrangement, the alias ID is changed under the above-described conditions as described above, and accordingly, the service provider 2 can provide the changed alias ID to other devices, thereby assigning a device ID to each device without generating useless device IDs.

On the other hand, as can be understood from the flowchart shown in FIG. 12, following the STB 11 being registered with the service provider 2, the service provider 2 has two information sets, i.e., the alias ID (which will be referred to as "information 1" hereafter) and the user ID (which will be referred to as "information 2" hereafter) for identifying the device ID assigned to the STB 11. Accordingly, following the STB 11 being registered with the service provider 2, an arrangement may be made wherein the device ID is identified using either of the information 1 or the information 2.

Taking the above-described fact into consideration, in a case of identifying the device ID using the user ID, i.e., the information 2, the alias ID, i.e., the information 1, needs not be stored (managed) in the destination table (FIG. 14). Accordingly, an arrangement may be made wherein following completion of registration, the alias ID having the corresponding user ID written to a field of the destination table is deleted. In this case, furthermore, an arrangement may be made wherein the deleted alias ID is used as an alias ID correlated to a device ID for a device which has been newly registered, i.e., reused.

In general, the service provider 2 must prepare a great number of device IDs in order to make a contract with a great number of users (devices). Note that the great number of the device IDs need to be different one from another, and accordingly, a string with a great number of characters is employed as a device ID. In the event that the device IDs are correlated to the alias IDs in a one-to-one manner, the same number of the alias IDs are required as with the device IDs, and accordingly, the alias ID must employ a string with generally the same number of characters as with the device ID.

However, the alias ID is an ID available for the user, and furthermore, the user must input a string serving as the alias ID as necessary. Giving consideration to the fact that the user may input the alias ID manually, a string with a small number of characters is preferably employed as the alias ID.

Accordingly, with the present arrangement as described above, the alias ID is reused, and accordingly, the service provider requires a smaller number of the alias IDs than with the device IDs (i.e., the alias IDs need not be prepared in a one-to-one manner with the device IDs), thereby enabling the number of the alias IDs to be reduced. As a result, alias IDs employing a string with a small number of characters can be assigned to the device IDs. Note that it is needless to say that the alias IDs assigned to the device IDs are different one from another.

Further description will be made regarding the alias ID. For example, as shown in FIG. 1, let us say that the user A has multiple devices for receiving the content data, of the STB 11, the PC 12, and the cellular phone 13. That is to say, a single user has multiple devices for receiving content data. In this case, the single user performs the above-described processing for registration for each device which is to be registered.

As a result, the information with regard to the alias ID, the user ID, the password, and the mail address, needs to be registered for each device. Note that in a case of identifying the device ID using the user ID, the same user ID cannot be registered, even if the same user attempts registration. Accordingly, in the event of making registrations of multiple devices, the user must register multiple devices using multiple user IDs, and must remember the multiple user IDs. On the other hand, even in a case of identifying the device ID using the alias ID, the user must use and remember multiple alias IDs in the same way.

This leads to a problem of poor ease-of-use for the user. Accordingly, the present arrangement further includes processing described next, in order to improve ease-of-use thereof. It is needless to say that in the event that a restriction is imposed that a single user can register only a single device to the service provider 2, this processing needs not be included.

As described above, following a device being registered with the service provider 2, the service provider 2 needs not manage the alias ID assigned to the device. Accordingly, the present arrangement includes means for the user to change the alias ID, thereby improving ease-of-use for the user.

Here, let us say that the STB 11 has already stored the device ID and the alias ID, and the PC 12 has stored (acquired) the alias ID assigned to the STB 11. The processing for storage (acquisition) is performed in the same way as with the processing performed between the STB 11 and the service provider 2 shown in the flowchart in FIG. 12, for example, and accordingly, description thereof will be omitted.

Description will be made regarding processing for registering the STB 11 with the service provider 2 through the PC 12 with reference to the flowchart shown in FIG. 15. The processing performed by the PC 12 shown in Steps S81 through S83 is the same as the processing shown in Steps S52 through S54 in FIG. 12. Furthermore, the processing performed by the service provider 2 shown in Steps S91 through S93 is the same as the processing shown in Steps 63 through S65 in FIG. 12. Accordingly, description thereof will be omitted.

Upon the service provider 2 receiving information with regard to the user ID, the password, the mail address, and the alias ID assigned to the STB 11 from the PC 12 in Step S93, the service provider 2 performs processing for user authentication (confirmation of the password) in Step S94. Here, the user who has already made a registration accesses the service provider 2 in order to change the alias ID to the name of the terminal, and accordingly, such user authentication is performed.

In Step S94, in the event that determination is made that the information with regard to the user ID and the password received from the PC 12 matches the information stored in the destination table, i.e., the user passes the user authentication, the flow proceeds to Step S95, and the service provider 2 reads out the data of the modification form. Here, the modification form serves as a form for the user changing the alias ID to the name of the device, wherein the user freely decides the name of the device (in this case, the STB 11) registered with the service provider 2.

On the other hand, in Step S94, in the event that determination is made that the destination table does not have the user ID which matches the received user ID, or the received password does not match that stored in the destination table, i.e., the user does not pass the user authentication, the flow proceeds to Step S96, and the service provider 2 reads out the data of a re-input form. In this case, the service provider 2 determines that the user has not pass the user authentication due to error of the input user ID or password, and transmits the re-input form to the user so as to request the user to input the user ID and the password, again.

Figure 16:
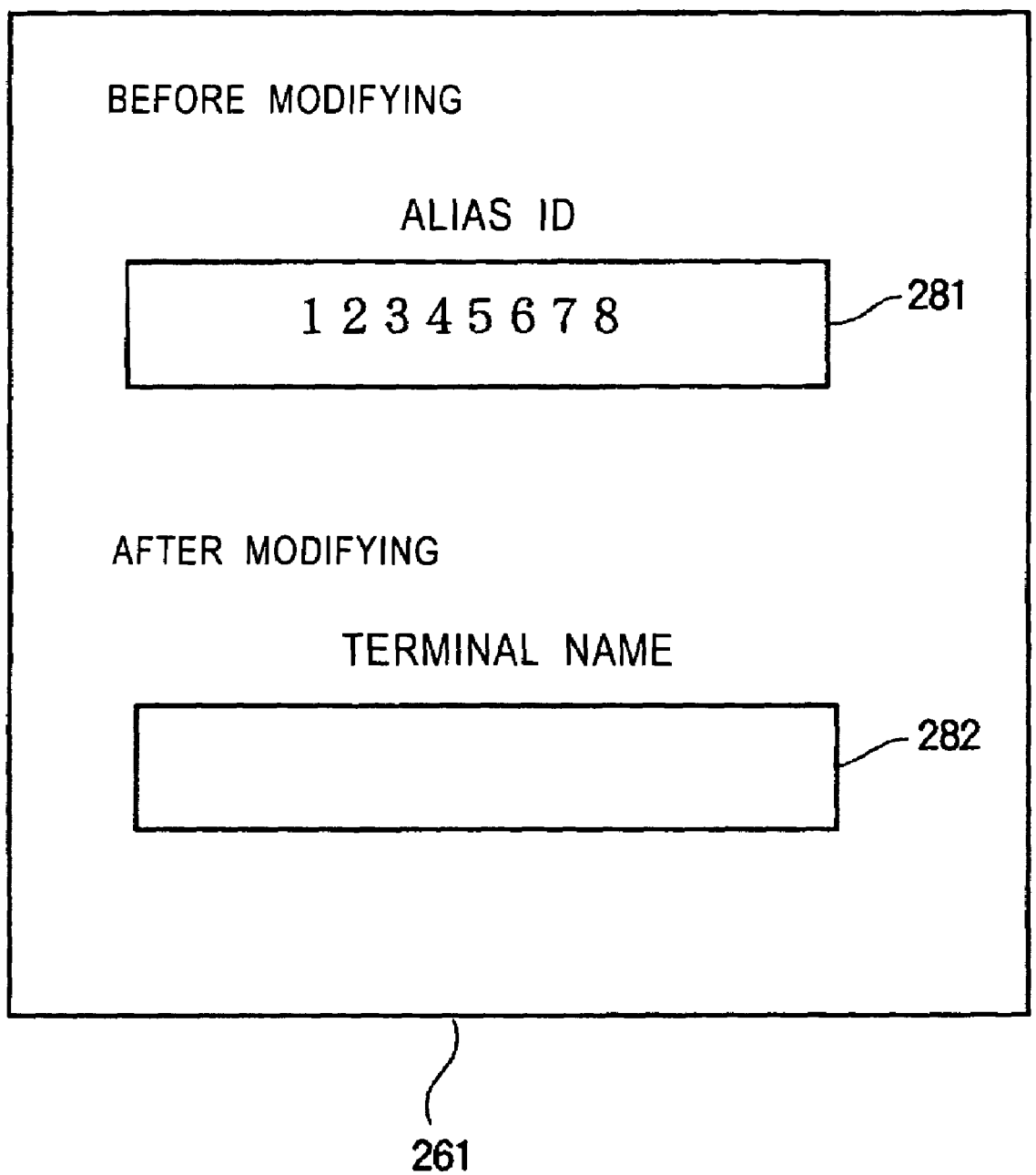
FIG. 16 is a diagram which shows a screen example displayed on the display.
Figure 17:
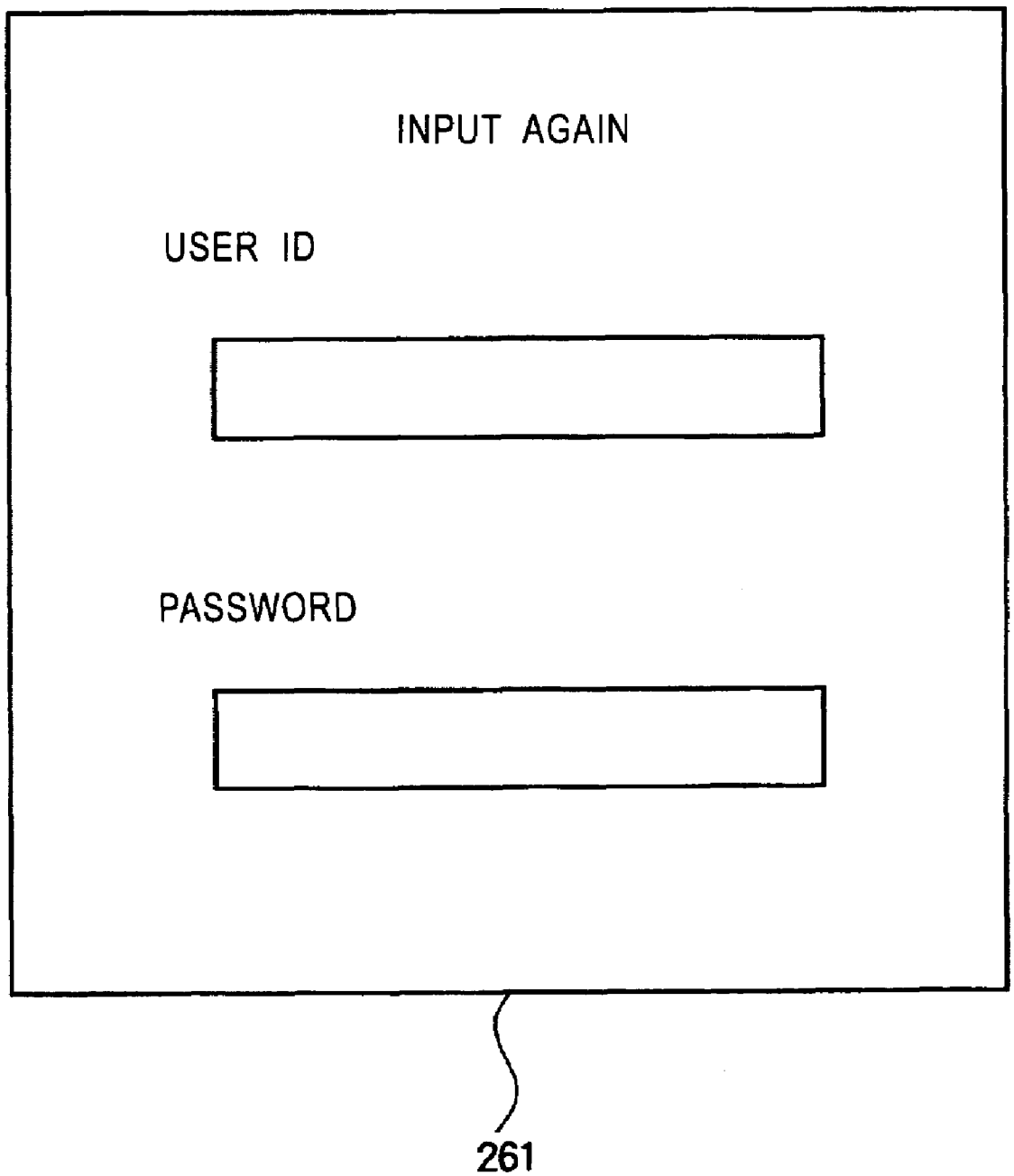
FIG. 17 is a diagram which shows another screen example displayed on the display.

In Step S97, the read-out modification form data or re-input form data is transmitted to the PC 12. The data is received by the PC 12 in Step S84. The PC 12 displays a screen as shown in FIG. 16 or FIG. 17, on the display 261 based upon the received data. Note that FIG. 16 shows a screen for modification based upon the modification form data, and FIG. 17 shows a screen for re-input based upon the re-input form data.

The modification screen shown in FIG. 16 includes a field 281 for displaying the alias ID before modification, and a field 282 for inputting a new terminal name. On the other hand, the re-input screen shown in FIG. 17 includes fields for inputting the user ID and the password.

With regard to the alias ID displayed on the field 282 on the screen shown in FIG. 16, the service provider 2 receives the alias ID in Step S93, and the stored alias ID is transmitted, appended to the modification form data which is transmitted from the service provider 2 to the PC 12 in Step S97, for example. Thus, the alias ID at the current point in time is displayed on the screen on the display 261 of the PC 12 on the user side.

Subsequently, the user inputs a desired name to the field 282 on the screen as shown in FIG. 16. For example, the user may input a name of "STB" to the field 282, which is associated with STB 11, which is to be registered with the service provider 2. Note that the field 28 for inputting the terminal name may have a configuration wherein the user can decide (input) a desired name, or may have a configuration which includes a pull-down menu for the user selecting a desired name.

In either case, upon the user inputting (selecting) a desired terminal name on the screen as shown in FIG. 16, and further inputting other information as necessary, the information is transmitted from the PC 12 to the service provider 2 in Step S84. The service provider 2 receives the data with regard to modification from the PC 12 in Step S98. Note that upon the user inputting the user ID and the password on the re-input screen as shown in FIG. 17, the service provider 2 repeats the processing from Step S94, again.

The service provider 2 performs modification processing in Step S99, and stores the modified data in Step S100. In modification/storage processing, the service provider 2 detects the field corresponding to the alias ID received before modification processing, and overwrites a new terminal name to the detected field.

While description has been made regarding an arrangement example wherein the alias ID is overwritten with the terminal name, an arrangement may be made wherein the service provider 2 stores the terminal name, as well, while keeping the alias ID without change. In this case wherein the service provider 2 stores the alias ID without change, an arrangement may be made wherein the processing described later is performed using the alias ID.

Upon completion of storage of the information after modification performed by the service provider 2 as described above, the service provider 2 gives a notification of completion to the PC 12 in Step S101. The processing performed in Step S101 and the corresponding processing performed by the PC 12 in Step S85 are the same as the processing performed in Step S67 and the corresponding processing performed by the PC 12 in Step S55 shown in FIG. 12, respectively, and accordingly description thereof will be omitted.

Figure 15:
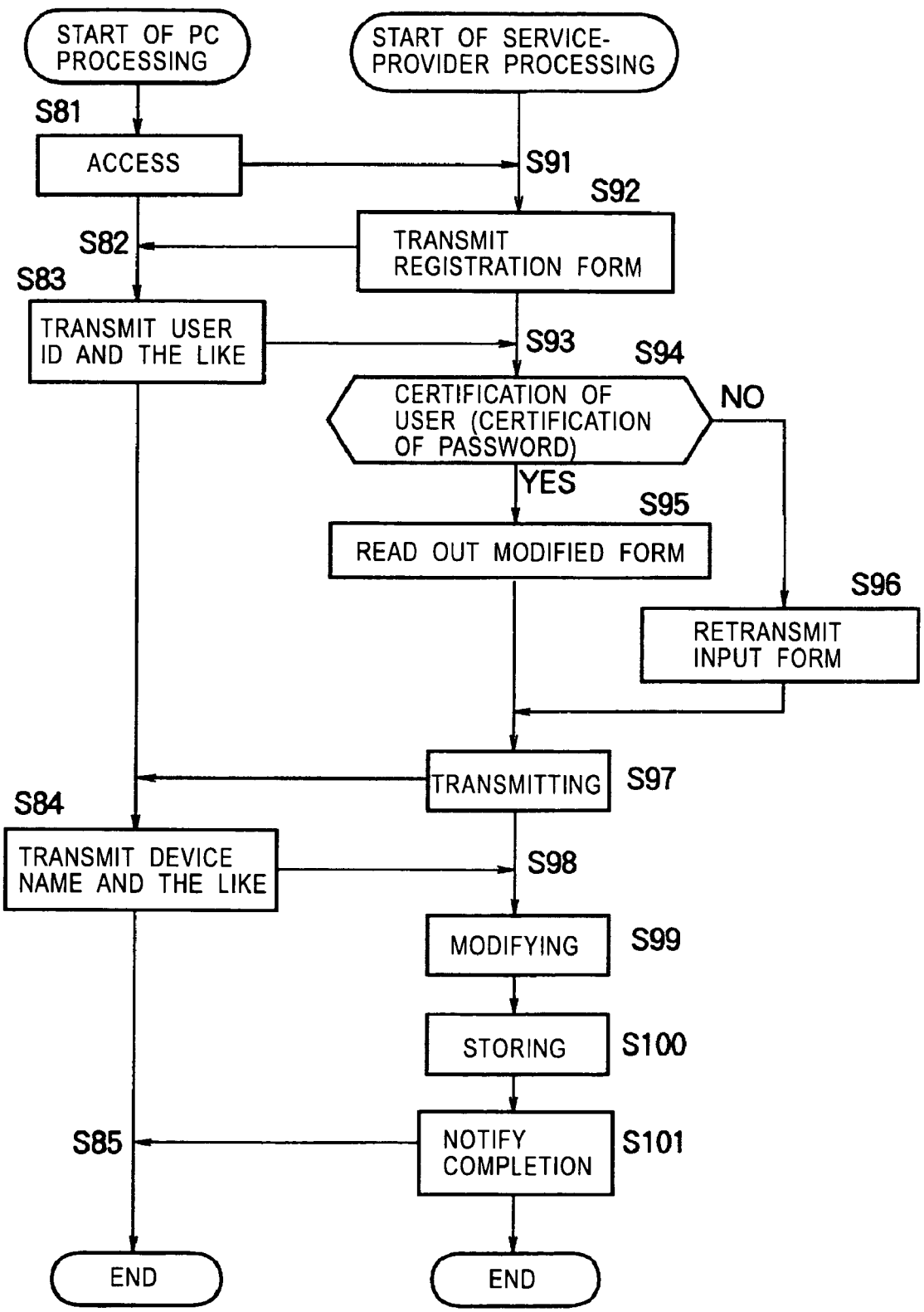
FIG. 15 is a flowchart for describing the processing for changing the registered information.

FIG. 18 is a schematic diagram which shows the destination table stored in the destination database 203 of the service provider 2 in a case wherein processing is performed according to the flowchart shown in FIG. 15. In the example of the destination table shown in FIG. 18, a user has registered the user ID of "a1b2c3", the password of "pppp", and the mail address of "mmm@z.co.jp", serving as user information, and the two terminal names of "STB", and "PC" corresponding to the registered devices. Note that the device ID of "000001" is assigned to the device corresponding to the terminal name of "STB", and the device ID of "010021" is assigned to the device corresponding to the terminal name of "PC".

Furthermore, another user has registered the user ID of "d4e5f6", the password of "ssss", and the mail address of "mpm@z.co.jp", serving as user information, and the three terminal names of "STB", "PC", and "CELLULAR PHONE" corresponding to the registered devices. Note that the device ID of "001234" is assigned to the device corresponding to the terminal name of "PC", the device ID of "001235" is assigned to the device corresponding to the terminal name of "STB", and the device ID of "001236" is assigned to the device corresponding to the terminal name of "CELLULAR PHONE".

As described above, multiple devices (terminal names) are correlated to a single user ID, and a different device ID is assigned to each device. With the present arrangement example, such a destination table is employed, and accordingly, a user can receive (purchase) content data through any of the multiple devices which have been registered by the user, using the same user ID. Description will be made regarding processing for purchase of content data, taking a case of employing the destination table as shown in FIG. 18 as an example.

First, description will be made regarding a case wherein the user purchases content data from the service provider 2 through a device which stores the device ID thereof, with reference to the flowchart shown in FIG. 19. Here, taking the device which stores the device ID thereof as the STB 11, description will be made regarding a case wherein the user purchases content data from the service provider 2 through the STB 11.

In Step S121, the STB 11 starts access to the service provider 2. Note that the access is started according to the instruction from the user. In Step S131, the service provider 2 receives a request for access from the STB 11.

Figure 20:
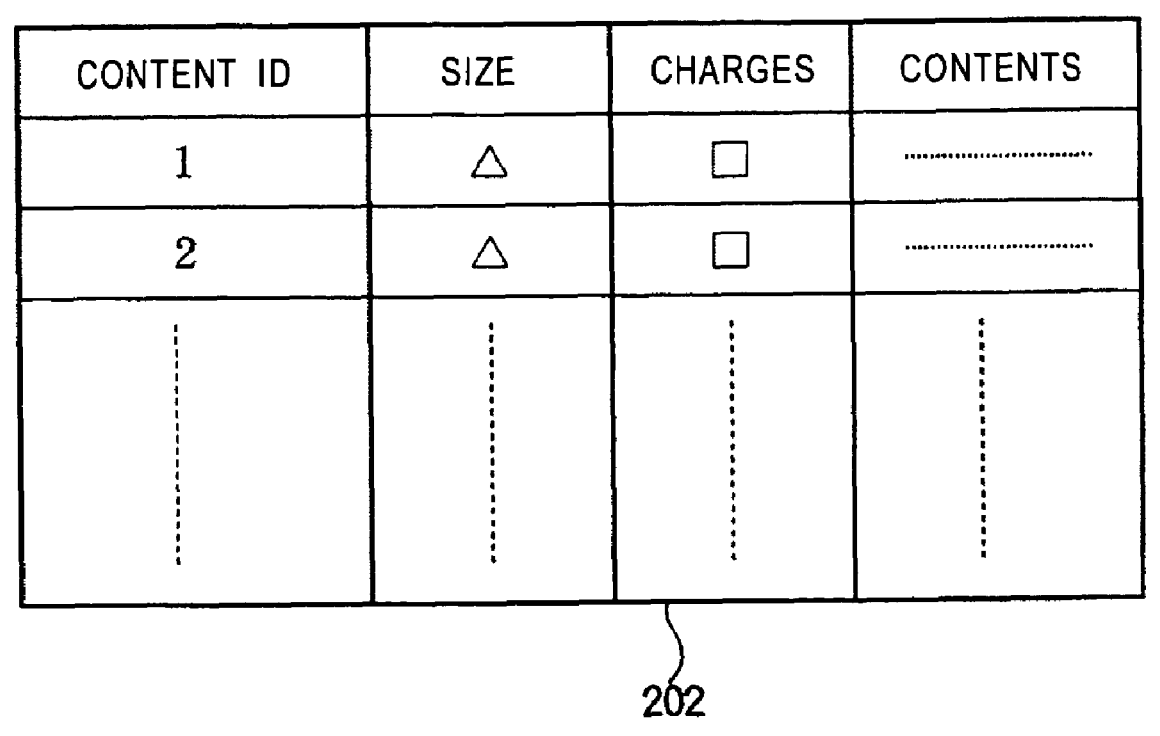

In the event that the service provider 2 determines that the request for access from the STB 11 is transmitted for requesting purchase of content data, the service provider 2 transmits information with regard to the content data to the STB 11 which has requested for access, in Step S132. In this stage, the service provider 2 transmits appended data of the content data stored in the content database 202. FIG. 20 shows a configuration example of the appended data of the content data stored in the content database 202.

The appended data of the content data is information with regard to the content ID assigned to each content data for identifying the content data, the size of the content data, the charges for purchase of the content data, introduction of the contents of the content data, and the like.

In Step S122, upon the STB 11 receiving the data from the service provider 2, the STB 11 displays a screen on the TV receiver 241 connected to the STB 11 based upon the received data. The user refers to the screen displayed on the TV receiver 241, and decides on desired content data.

Upon the user deciding the desired content data, the content ID assigned to the decided content data is transmitted to the service provider 2 along with the device ID. Note that the STB 11 reads out the device ID stored in the device ID management unit 225 thereof, and transmits the device ID to the service provider 2 at the same time as with the content ID.

In Step S133, the service provider 2 receives the data from the STB 11. Subsequently, the service provider 2 extracts the device ID from the received data in Step S134. Subsequently, the service provider 2 determines whether or not the device corresponding to the device ID is valid for purchase of the content data, which has been requested for purchase, based upon the extracted device ID by referring to the data stored in the destination database 203 or the appended data of the content data stored in the content database 202.

Figure 19:
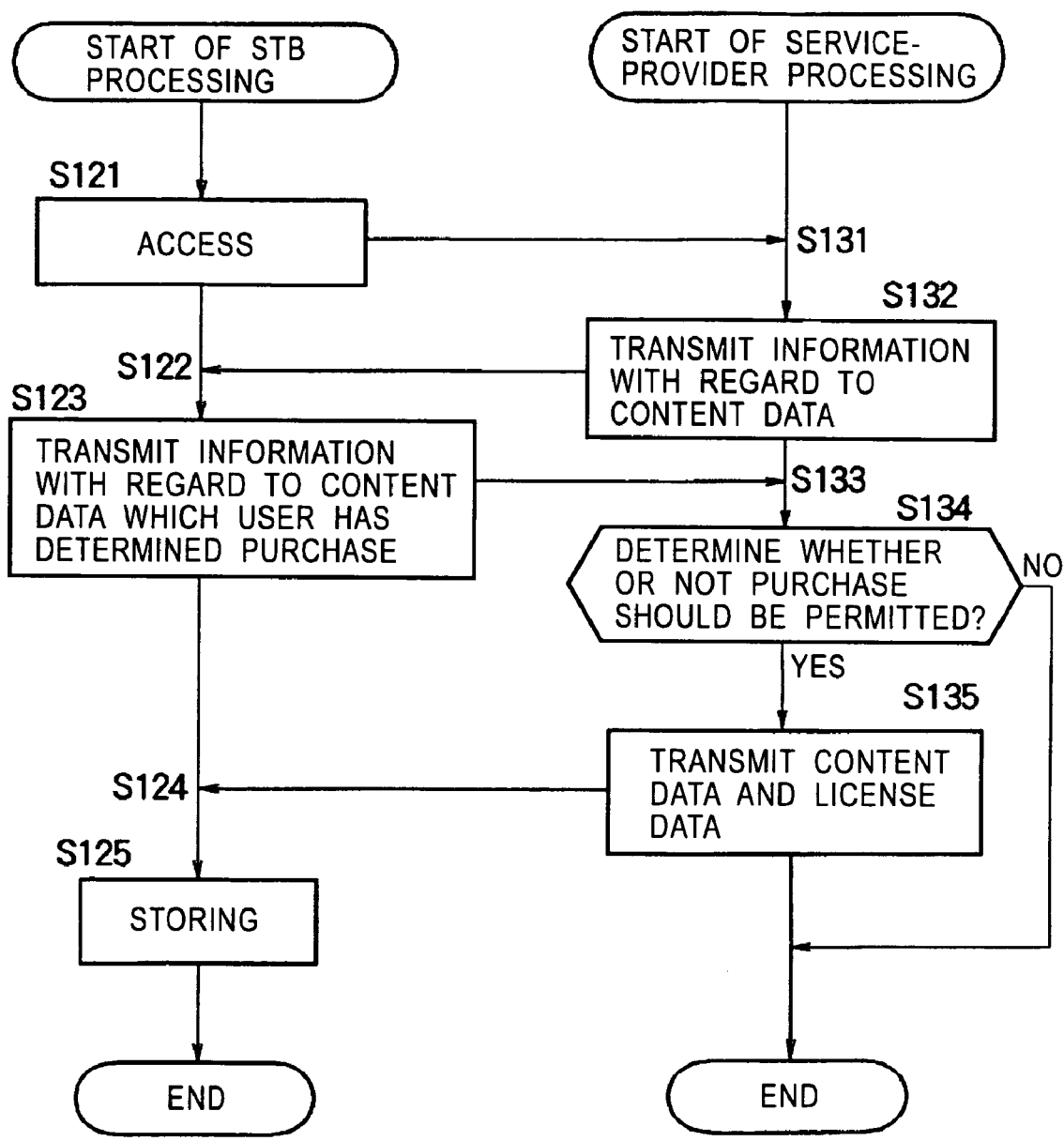
FIG. 19 is a flowchart for describing the processing for making a purchase.

In Step S134, in the event that determination is made that the purchase of content data is permitted, the flow proceeds to Step S135, and on the other hand, in the event that determination is made that the purchase of content data is not permitted, the processing for purchase of the content data shown in FIG. 19 ends. Note that the service provider 2 preferably transmits a message for notifying the user that the purchase is not permitted.

In Step S135, the service provider 2 transmits the content data and the license data to the STB 11. This transmission is performed according to a schedule generated by the schedule generating unit 204. While detailed description will be made later, in brief, the schedule generating unit 204 determines the timing for providing the content data to the user side, generates the schedule based upon the determination, and the service provider 2 controls transmission of the content data according to the schedule.

Furthermore, the schedule generating unit 204 instructs the license issuing unit 206 to issue license data at the time of transmission of the content data. The license data serves as data for determining the services available for the user, which includes data for preventing unauthorized copy and reproducing, and is transmitted to the user side along with the content data.

The license issuing unit 206 stores the table including the data as shown in FIG. 21. That is to say, the table includes the license ID, the services available for the user which is determined by the license ID, and the content ID corresponding to the services available for the user. The services available for the user include purchase, rental thereof, one-time copy (single copy), and the like.

While a license ID is assigned to a single service available for the user, a single license ID may be correlated to multiple content ID. The reason is that the same service may be performed for multiple contents. An arrangement may be made wherein a single license ID is correlated to the multiple services available for the user. That is to say, a license data is formed of a combination of multiple services available for the user, and the one license data is correlated to a single license ID.

The license data issuing unit 206 issues license data using such data. Note that the appended data of the content data shown in FIG. 20 and the license data shown in FIG. 21 are nothing but examples, rather an arrangement may be made wherein other data is further stored in addition to the appended data of the content data or the license data, and furthermore, an arrangement may be made wherein the processing described later is performed using the additionally-stored data.

The schedule generating unit 204 generates a schedule based upon the appended data of the content data stored in the content database 202 and the data stored in the license issuing unit 206. FIG. 22 shows an example of the schedule generated by the schedule generating unit 204.

While the service provider 2 generates a corresponding schedule for each request for transmission of the content data, each schedule includes a transaction ID at the head thereof for discrimination one from another.

The content ID for identifying the contents requested by the user is read out from the content database 202 (FIG. 20), and is correlated to the transaction ID. The license ID corresponding to the services available for the user, which are to be applied to the contents requested by the user, is read out from the license issuing unit 206, and is correlated to the transaction ID. The destination device ID is the device ID assigned to the device which has been specified as a destination device for the content data by the user, and is read out from the destination database 203 as necessary.

A billing user ID is the user ID assigned to the user who is to be billed for purchase of the content data. With regard to the transmission point-in-time, in the event that the user specifies the transmission point-in-time, the specified time is set to the transmission point-in-time in a normal situation. In the event that the user has not specified the time, or in the event that transmission cannot be performed at the time specified by the user, the service provider 2 determines the transmission point-in-time, and writes the transmission point-in-time to the schedule. The service provider 2 further writes the information with regard to the transmission status such as "transmission has not been performed", "during transmission", "completion of transmission", or the like, to the field corresponding to the transmission point-in-time on the schedule.

The service provider 2 performs transmission of content data according to such a schedule. Note that in the event that transmission of the content data is not requested (necessary) to be delayed according to the request from the STB 11, the service provider 2 may immediately perform transmission. Accordingly, in this case, an arrangement may be made wherein the transmission point-in-time in the schedule is determined to the time when the schedule has been generated.

The communication control unit 207 transmits the content data and the license data (information with regard to the services available for the user) to the STB 11 based upon the schedule generated by the schedule generating unit 204.

In Step S124, the STB 11 receives data from the service provider 2. The STB 11 stores the received data in Step S125. More specifically, the data received under control of the communication control unit 221 is supplied to the distribution control unit 222. The distribution control unit 222 separates the supplied data into the content data and the license data, supplies the content data to the storage unit 223, and supplies the license data to the license management unit 224.

As described above, the storage unit 223 and the license management unit 224 store the corresponding data supplied from the STB 11, respectively. Thus, the user can purchase the content data through the STB 11. Note that while description has not been made regarding charging processing, the service provider 2 performs charging processing, as well as purchase processing. Note that while description will be omitted hereafter regarding the charging processing, the service provider 2 performs charging processing, as well as purchase processing.

Next, description will be made regarding processing wherein the user purchases content data through the PC 12 and specifies the STB 11 as a destination device for storing the purchased content data. That is to say, in this case, the user purchases content data through a device, and specifies another device as a destination device. Description will be made regarding such a case with reference to the flowchart shown in FIG. 23. Note that first, description will be made regarding a schematic configuration of the overall processing, and subsequently, detailed description will be made regarding processing performed by each device, with reference to the flowchart shown in FIG. 23.

The processing performed by the PC 12 shown in Steps S151 through S153 is generally the same as the processing performed by the STB 11 shown in Steps 121 through 123 in FIG. 19. Furthermore, the corresponding processing performed by the service provider 2 shown in Steps S161 through S163 is generally the same as the processing performed by the service provider 2 shown in Steps S131 through S132 in FIG. 19. Accordingly, description thereof will be omitted.

Note that in Step S153, the PC 12 transmits only the content ID for identifying the content data which the user has decided to purchase, but does not transmit the device ID. The reason is that the device ID is assigned to the STB 11, and is managed by the STB 11, and accordingly, the PC 12 cannot transmit the device ID of the STB 11.

The service provider 2 receives the data from the PC 12 in Step S163, and transmits the data of the purchase form to the PC 12 in Step S164. The service provider 2 determines that the user has made a request for purchase of the content data through a device having no device ID, based upon the fact that the received data includes no device ID, and transmits data of the purchase form in order to obtain information with regard to the destination device for storing the purchased content data, and in order to confirm whether or not the contract which has been made with the service provider 2 by the user is valid.

The PC 12, which has received the data of the purchase form in Step 5154, displays a screen for purchase on the display 261 based upon the received data. The user refers to the screen, and inputs required items, e.g., the user ID and password. The input user ID and password are transmitted from the PC 12 to the service provider 2 in Step S155.

The service provider 2 receives the data from the PC 12 in Step S165, and subsequently, generates a schedule based upon the received data, as well as storing the received data, in Step S166. While detailed description will be made later, in brief, the service provider 2 performs processing for authentication using the password, processing for determining the destination device for storing the content data, and the like, at the same time of the service provider 2 performing processing for generating a schedule as shown in FIG. 22, and the like. Upon completion of all the processing in Step S166, the service provider 2 performs processing in Step S167 as follows.

In Step S167, the service provider 2 notifies the user that the processing for purchase of the contents, i.e., purchase transaction has been completed. Upon the PC 12 on the user side receiving the notification in Step S156, the PC 12 performs the processing corresponding to the notification, e.g., processing for displaying a message of "purchase transaction for the contents has been completed" or the like, on the display 261.

On the other hand, the STB 11 makes a query to the service provider 2 for the schedule in Step S181. More specifically, the STB 11 makes a query whether or not the service provider 2 generates any schedule for the STB 11 (schedule which specifies the STB 11 as a destination device for storing the content data). The STB 11 makes such a query to the service provider 2 each hour, for example. Here, description will be made regarding a case wherein the processing as described above is performed, and a schedule which specifies the STB 11 as a destination device is generated, following which the STB 11 makes a query to the service provider 2, and the query is received by the service provider 2 in Step S168, as an example.

The service provider 2 performs search processing according to the query from the STB 11, and in the event that determination is made that the service provider 2 has any schedules which specify the STB 11 as a destination device, the service provider 2 transmits the schedule which specifies the STB 11 as a destination device to the STB 11 in Step S169. The determination is made as follows, for example. That is to say, at the time of the STB 11 making a query, the STB 11 transmits the device ID thereof to the service provider 2, and the service provider 2 determines whether or not any schedules corresponding to the device ID have been generated (stored) in the schedule generating unit 204.

The schedule, which has been transmitted from the service provider 2 in Step S169, is received by the STB 11 in Step S182. The received schedule includes information with regard to the predetermined time for transmission. Upon the predetermined time being specified in the information, the STB 11 makes a request to the service provider 2 for transmission of the content data. The request is received by the service provider 2 in Step S170, and the service provider 2 starts transmission of the content data according to the request in Step S171.

Upon starting transmission of the content data as described above, the service provider 2 notifies the PC 12 that the service provider 2 starts transmission of the purchased content data to the STB 11, in Step S172. Furthermore, Upon completion of the transmission of the content data to the STB 11 (Step S173), the service provider 2 notifies the PC 12 that the transmission has been completed. The service provider 2 makes such a notification through an electronic mail, for example. On the other hand, the STB 11 stores the transmitted content data in Step S185.

As described above, the user performs processing for purchase of the contents through the PC 12, and the STB 11 stores the purchased content data.

Next, detailed description will be made regarding processing shown in the flowchart in FIG. 23 for each device. First, while description will be made regarding processing performed by the PC 12, the processing performed by the PC 12 is generally a repetition of display of a screen based upon the data from the service provider 2, and transmission of information which has been input by the user through the screen, and accordingly, description will be omitted. However, for particular cases, description thereof will be made along with the processing performed by the service provider 2, as necessary.

Description will be made below regarding processing for purchase of the contents of the processing performed by the service provider 2 (processing for transaction with the PC 12 of the processing described above) with reference to the flowchart shown in FIG. 24. The service provider 2 determines whether or not any other devices have accessed the service provider 2 in Step S201. The processing in Step S201 is repeated, and the service provider 2 is maintained in the standby mode until determination is made that at least one device of other devices has accessed the service provider 2.

On the other hand, in the event that determination is made that any other device has accessed the service provider 2 in Step S201, the flow proceeds to Step S202, the appended data of the content data is read out from the content database 202, and the appended data of the content data is transmitted to the device which has accessed the service provider 2. Following the appended data of the content data being transmitted as described above, the service provider 2 is maintained in the standby mode until the service provider 2 receives the content ID corresponding to the contents which the user has decided to purchase.

The appended data of the content data transmitted from the service provider 2 to any other device (e.g., PC 12) includes the content ID. Subsequently, upon the user deciding purchase of the content data, at least the content ID corresponding to the content data is transmitted to the service provider 2, and the service provider 2 receives the content ID as a request for purchase from the user. The service provider 2 determines whether or not the service provider 2 has received a request for purchase of the content data from the user in Step S203.

In Step S203, the service provider 2 is maintained in the standby mode until determination is made that the service provider 2 has received a request for purchase of contents. Upon determination being made that the service provider 2 has received a request, the flow proceeds to Step S204. In Step S204, the service provider 2 determines whether or not the received request for purchase of contents includes the device ID.

As described above, in the event that the user makes a request for purchase through a device which serves as a device for receiving the content data (device which has acquired a device ID and stores the acquired device ID) such as the STB 11 or the like, the STB 11 transmits the device ID as well as content ID. On the other hand, in the event the user makes a request through a device which does not serves as a device for receiving the content data (device which has not acquired device ID) such as PC 12, the cellular phone 13, or the like, only the content ID is transmitted.

Accordingly, the user provider 2 determines whether or not the received request (data) includes data with regard to the device ID in Step S204. From this, the service provider 2 can determine whether or not the device which has made a request for purchase of the contents has been registered with the service provider 2, and serves as a device for receiving the content data.

Note that an arrangement may be made wherein the processing in Step S204 is omitted, and the purchase form is always transmitted. In the event that a situation may occur wherein the PC 12 has acquired the device ID assigned to itself, stores the assigned device ID, the user has made a request for purchase of the content data through the PC 12, and a desired destination device for storing the purchased content data is the STB 11, for example, the aforementioned arrangement is employed. Furthermore, the above-described processing performed by the service provider 2 may include other processing for the user to specify the destination device for the purchased content data.

In Step S204, in the event that the service provider 2 determines that the received data does not include the device ID, the flow proceeds to Step S205, and the service provider 2 transmits the data of the purchase form. The data of the purchase form is used for displaying the screen as shown in FIG. 25 on the device on the user side, e.g., the display 261 of the PC 12.

Figure 25:
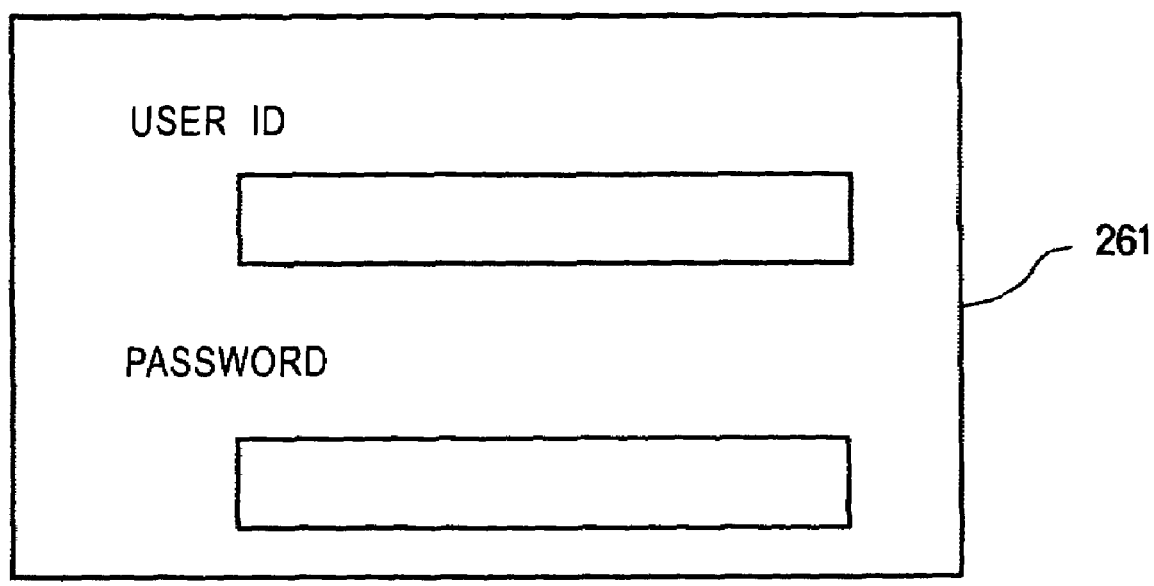
FIG. 25 is a diagram which shows a screen example displayed on the display.

As shown in FIG. 25, the screen displayed based upon the data of the purchase form includes a field for inputting the user ID and a field for inputting the password. The input user ID is used for identifying the device ID, and the input password is used for user authentication. Note that in a case wherein the service provider 2 maintains the alias ID stored in the destination table thereof, an arrangement may be made wherein the service provider 2 performs transmission/reception of the alias ID to/from the device on the user side.

Upon the user inputting the device ID and the password through a device on the user side while referring the screen as shown in FIG. 25, the information is transmitted to the service provider 2, and the service provider 2 receives the transmitted information with regard to the user ID and the password in Step S206. The service provider 2 identifies the device ID from the received user ID in Step S207.

As described above, the destination database 203 of the service provider 2 stores the destination table as shown in FIG. 18, and the service provider 2 identifies the device ID by referring the destination table. More specifically, in the event that the received user ID is "a1b2c3", and the password is "pppp", for example, the service provider 2 refers to the destination table as shown in FIG. 18, and identifies the two device IDs of "000001" and "010021".

In Step S208, the service provider 2 determines whether or not multiple device IDs have been identified. In such a situation described above, the two device IDs are identified, and accordingly, in Step S208, determination is made that multiple device IDs have been identified, and the flow proceeds to processing in Step S209. In Step S209, the service provider 2 transmits the data of the transmission destination determining form. The data of the transmission destination determining form is used for displaying a screen on the device on the user side for the user making a decision (selection) which device the content data is to be received to and stored in.

Figure 26:
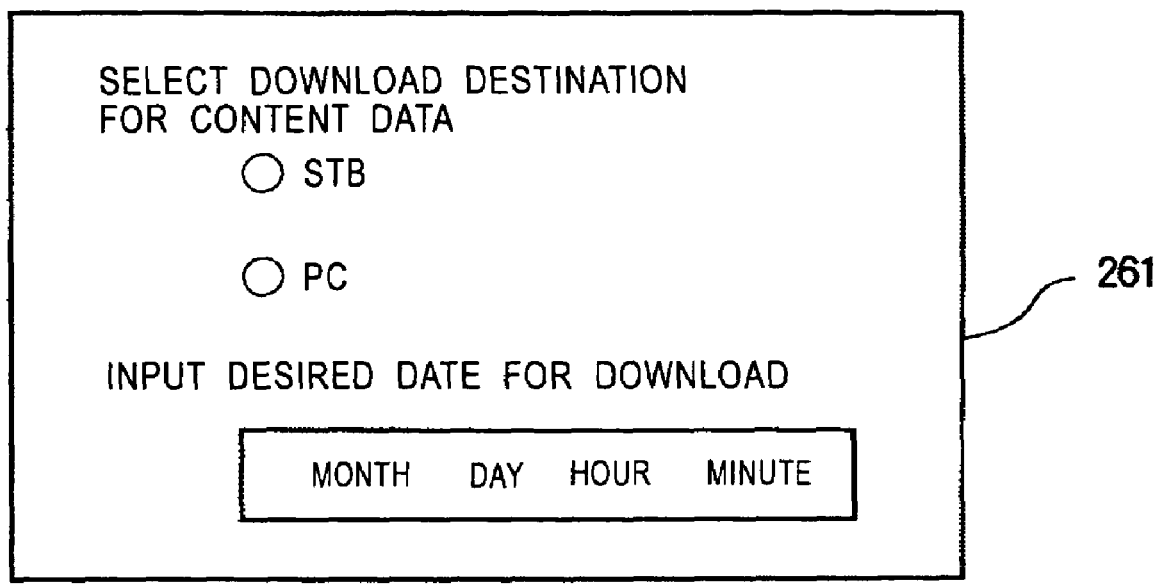
FIG. 26 is a diagram which shows another screen example displayed on the display.

The data serving as the data of the transmission destination form, which is transmitted from the service provider 2, includes at least the terminal names (FIG. 18) corresponding to the device IDs identified in Step S207. FIG. 26 shows an example of the screen displayed on a device through which the user is performing processing for purchase of the content data, e.g., the screen displayed on the display 261 of the PC 12. Let us say that the screen shown in FIG. 26 is displayed based upon the transmission destination table shown in FIG. 18. As shown in FIG. 26, the device IDs of "000001" and "010021", and the corresponding terminal names of "STB" and "PC", are displayed on the screen. Furthermore, the screen includes radio buttons on the left side of the terminal names, respectively, for selecting the desired destination device.

In a case wherein the user who has made a request for purchase of the contents has registered multiple devices as the destination devices for the content data, the device on the user side displays a screen for the user selecting a desired destination device for storing the purchased content data (device where the purchased content data is to be downloaded) using the terminal name decided by the user. The information with regard to the terminal name selected by the user referring to the screen as shown in FIG. 26 is transmitted to the service provider 2.

Note that the screen may have a configuration wherein the user can select only one device as a destination device for download, or may have a configuration wherein the user can select multiple devices as destination devices for download. Furthermore, an arrangement may be made wherein the service provider 2 switches the configuration of the screen between the aforementioned two configurations corresponding to charging processing.

In Step S210, the service provider 2 receives the information with regard to the terminal name selected as the destination device for download. The service provider 2 identifies the device ID corresponding to the destination device for the purchased content data based upon the received information with regard to the terminal name.

In Step S211, the service provider 2 stores the received data, and generates a schedule based upon the data. More specifically, the schedule generating unit 204 of the service provider 2 generates the data with regard to the contents which have been requested for purchase, having a configuration as shown in FIG. 22.

In the event that determination is made that the received request (data) includes at least one device ID in Step S204, or in the event that determination is made that a single device ID is identified in Step S208, the flow proceeds to the processing in Step S211 for generating a schedule. In either case, in the event that a single device ID is identified as the destination device for the content data as a result, the processing for generating a schedule is performed.

The service provider 2 needs to acquire the information with regard to the transmission point-in-time for the content data at the time of performing processing for generating a schedule. Accordingly, for example, as shown in FIG. 26, the device on the user side may display a message of "input the desired date for download" on the screen displayed on the display 261 thereof, and provide a field for the user inputting a desired date below the message. In the event that the user inputs the desired date to the field, the date is used as the date for transmitting the contents.

On the other hand, in the event that the user has not specified the transmission point-in-time, the service provider 2 determines the transmission point-in-time, and stores the determined transmission point-in-time. An arrangement may be made wherein the user cannot decide the desired transmission point-in-time, and only the service provider 2 decides the transmission point-in-time.

At the time of the service provider 2 performing processing for generating a schedule, the service provider 2 makes a determination whether or not the user who has made a request for purchase of the content data is a authorized user who has been registered for receiving the services provided by the service provider 2. Only in the event that determination is made that the user is a authorized user who has been registered with the service provider 2, the service provider 2 performs processing for generating a schedule. The service provider 2 determines whether or not the user who has made a request is a authorized user who has been registered therewith, by determining whether or not the received password has been registered with the destination table with the password being correlated to the user ID.

Upon ending of the processing for generating a schedule, in Step S212, the service provider 2 notifies the device on the user side that the purchase transaction has been completed. As described above, the service provider 2 performs processing for purchase.

Next, description will be made regarding processing for distribution of the content data (the processing described above in brief performed between the service provider 2 and the STB 11) performed by the service provider 2 with reference to the flowchart shown in FIG. 27. The service provider 2 determines whether or not any other device has made a query for the schedule or a request for distribution of the content data in Step S231.

In Step S231, the service provider 2 is maintained in the standby mode until determination is made that any other device made a query or a request. Upon the service provider 2 receiving a query or a request from any other device, the flow proceeds to the processing in Step S232. In Step S232, the service provider 2 determines whether or not the query or the request from the aforementioned device has been made for the schedule. In Step S233, in the event that determination is made that the query or the request has been made for the schedule, the flow proceeds to the processing in Step S233.

In Step S233, the service provider 2 determines whether or not the schedule corresponding to the device ID of the device regarding which has made a query for the schedule has been generated by the schedule generating unit 204, and is stored therein. The device on the user side (e.g., the STB 11) makes a query for the schedule to the service provider 2 at predetermined intervals, and at the time of making a query, the device on the user side transmits the device ID thereof.

Accordingly, the service provider 2 determines whether or not the schedule generating unit 204 stores the schedule corresponding to the device ID received from the device on the user side. Specifically, while the schedule generating unit 204 stores the multiple schedules having a data configuration as shown in FIG. 22, the service provider 2 refers to the field of "destination device ID" within the data of the schedule, and determines whether or not any destination device ID stored in the schedules matches the device ID received from the device on the user side.

In Step S233, in the event that determination is made that the service provider 2 has no schedule for the device ID (which represents the corresponding device) received from the device on the user side, the flow returns to Step S231, and the subsequent processing is repeated. On the other hand, in the event that the determination is made that the service provider 2 has a schedule for the device ID received from the device on the user side in Step S233, the flow proceeds to the processing in Step S234, and the detected schedule is read out from the schedule generating unit 204 so as to be transmitted to the device which has made a query for the schedule.

Note that in Step S234, the service provider 2 reads out only the schedule wherein "transmission status" (see FIG. 22), which is a part of information included in the schedule, indicates that the corresponding content data has not been transmitted. Furthermore, an arrangement may be made wherein even in a case that the "transmission status" indicates that the service provider 2 has not transmitted the corresponding content data, in the event that the service provider 2 has already transmitted the schedule to the device on the user side, the service provider 2 need not to transmit the schedule again, and accordingly, the service provider 2 does not read out such a schedule.

In order to prevent the service provider 2 from transmitting the same schedule multiple times, an arrangement may be made wherein a flag is prepared as data included in the schedule shown in FIG. 22 for indicating whether or not the schedule has been transmitted, or an arrangement may be made wherein the aforementioned "transmission status" further includes such information.

Upon ending of transmission of the schedule in Step S234, the flow returns to Step S231, and the subsequent processing is repeated. On the other hand, in the event that determination is made that the query or the request from the device on the user side does not correspond to the query for the schedule in Step S232, i.e., determination is made that the device on the user side has made a request for distribution of the content data, the flow proceeds to the processing in Step S235. In Step S235, the service provider 2 starts transmission of the content data regarding which has been made a request for distribution.

The device (e.g., the STB 11) which transmits a request for distribution of the content data transmits at least information with regard to the transaction ID at the time of making a request thereof. The service provider 2 receives the transaction ID from the device on the user side, and accordingly, the service provider 2 can identify the running schedule of the schedules stored in the schedule generating unit 204.

As described above, the service provider 2 identifies the running schedule, and accordingly, the service provider 2 can identify the content ID corresponding to the contents which are to be distributed. The content data correlated to the identified content ID is read out from the content database 202 (FIG. 7), and is transmitted to the device on the user side.

Upon starting transmission of the content data in Step S235, the service provider 2 notifies the corresponding device on the user side that the transmission of the content data has been started in Step S236. In this case, the "corresponding device" indicates a device to which the mail address (FIG. 18) registered with the destination table stored in the service provider 2 is assigned.

In Step S237, the service provider 2 determines whether or not transmission of the content data has been completed, i.e., transmission processing has been completed. The processing in Step S237 is repeated until determination is made that transmission of the content data has been completed. Upon making a determination that the transmission of the content data has been completed, the flow proceeds to the processing in Step S238.

The service provider 2 transmits the license data at the time of transmitting the content data. The content data has a configuration for preventing reproduction of the content data without the license data. For example, the content data is subjected to encoding processing prior to transmission to the device on the user side, and the license data includes data for decoding the encoded data. Accordingly, the device (STB 11) on the user side needs to receive both the content data and the license data. Note that there is no need to transmit both the data at the same time. That is to say, an arrangement may be made wherein the content data and the license data are transmitted to the device on the user side at the same time, or an arrangement may be made wherein the two data sets at different points-in-time (separately).

For example, an arrangement may be made wherein the content data with a relatively large size is transmitted at the time of light traffic on the network, e.g., at night, and on the other hand, the license data with a relatively small size is transmitted before or after transmission of the content data such that the user can view the contents at the specified time.

In Step S238, the service provider 2 overwrites the field of "transmission status" within the data included in the schedule shown in FIG. 18 with the information which indicates that transmission of the content data has been completed. Note that an arrangement may be made wherein the corresponding schedule is deleted, instead of overwriting the information. The information with regard to the "transmission state" which has been overwritten with the information which indicates that the transmission of the content data has been completed is used for charging processing. Accordingly, an arrangement may be made wherein the overwriting processing is performed after the point-in-time that the charging processing has been completed.

Subsequently, in Step S239, the service provider 2 notifies the device on the user side that transmission of the content data has been completed. The notifying processing is performed in the same way as the notifying processing performed in Step S236.

Thus, the service provider 2 controls processing for distribution of the content data. Note that the notifying processing in Step S236, and the notifying processing in Step S239, are not necessary processing, and rather, an arrangement may be made wherein neither notification is given, or an arrangement may be made wherein the service provider 2 gives one of the aforementioned notifications.

Next, description will be made regarding processing performed by the device on the user side for receiving the content data, which is performed corresponding to such transmission processing performed by the service provider 2, with reference to the flowchart shown in FIG. 28. Here, description will be made with reference to the processing performed by the STB 11 as an example.

In Step S251, the STB 11 determines whether or not the current point-in-time is the point-in-time for making a query to the service provider 2 for the schedule. The STB 11 is set for making a query at predetermined intervals, e.g., each hour.

Upon elapsing of the predetermined interval, the device on the user side (STB 11) determines that it is the point-in-time for making a query. In Step S251, upon the STB 11 determining that it is the point-in-time for making a query, the STB 11 reads out the device ID from the device ID management unit 225 thereof (FIG. 8), and transmits the device ID to the service provider 2, in Step S252. Upon the STB 11 transmitting the device ID, the service provider 2 performs the above-described processing. Subsequently, upon the service provider 2 transmitting the schedule as a result, the STB 11 receives the schedule in Step S253.

The received schedule is stored in the distribution control unit 222 (FIG. 8) of the STB 11, for example. The stored (received) schedule includes at least the transaction ID and the information for the transmission point-in-time. The distribution control unit 222 refers to the "transmission point-in-time" included in the stored schedule in Step S254, and determines whether or not it is the point-in-time for transmission based thereupon. The determination regarding whether or not it is the point-in-time for transmission is the same as the determination whether or not it is the point-in-time for the STB 11 to make a request for distribution of the content data.

In Step S254, the STB 11 repeats the processing in Step S254 until determination is made that it is the point-in-time for making a request for distribution of the content data. Upon the STB 11 determining that it is the point-in-time for making a request, the flow proceeds to the processing in Step S255. In Step S255, the STB 11 reads out the transaction ID, and transmits the transaction ID to the service provider 2.

Upon the STB 11 transmitting the transaction ID, as a result from the corresponding processing performed by the service provider 2, the service provider 2 transmits the content data. The content data transmitted from the service provider 2 is received by the STB 11 in Step S256, and stored in the STB 11.

Thus, the STB 11 stores the content data regarding which processing for purchase has been performed by the device on the user side other than the STB 11.

The reason that the system according to the present embodiment has a configuration wherein the device for receiving the content data (in this case, the STB 11) makes a query for the schedule, and a request for transmission of the content data, to the service provider 2, is that the STB 11 is not always in the state for receiving the schedule or the content data.

That is to say, the STB 11 is not always turned on, and in some cases, the STB may be off. At the time of the STB being off, the STB 11 cannot receive and store the schedule and the content data transmitted from the service provider 2. Taking such a case into consideration, the system has a configuration wherein the STB 11 makes a query for the schedule and a request for distribution of the content data.

With the STB 11 having a function for receiving the content data or the like even in the event of being off, an arrangement may be made wherein the service provider 2 transmits the schedule to the STB 11 immediately following the service provider 2 generating the schedule. In this case, furthermore, an arrangement may be made wherein the service provider 2 transmits the content data to the STB 11 at the point-in-time for transmission, even without receiving a request for distribution of the content data from the STB 11.

While description has been made regarding an example wherein the user performs processing for purchase through the PC 12, and the purchased content data is downloaded to the STB 11, in the above-described embodiment, the user may perform processing for purchase through the cellular phone 13. The processing for purchase performed through the cellular phone 13 is performed in the same way as the processing performed through the PC 12.

As described above, with the present embodiment, the user can perform processing for purchase of the content data through a device, and the purchased content data can be downloaded to another device. Accordingly, for example, the user can perform processing for purchase when away from the home such that the desired content data is downloaded to the device at the home of the user, thereby facilitating the user obtaining the desired content data.

In the above-described embodiment, description has been made regarding a general case wherein the user who has made a purchase of the content data uses the purchased content data. That is to say, description has been made regarding a case wherein the user who pays the charges for the content data (user to be billed) obtains the purchased content data. Furthermore, that is to say, description has been made regarding a case wherein a single user has both the device through which processing for purchase of the content data has been performed, and the device for receiving and storing the purchased content data.

Next, description will be made regarding a case wherein the user A (FIG. 1) performs processing for purchase of the content data, and the user B receives and uses the purchased content data through the device of the user B. That is to say, description will be made regarding a case wherein the user A makes a present of the content data (license data) to the user B.

In addition, as described above, the content data has a configuration wherein the user cannot reproduce the content data without the license data. For example, the content data needs not to be provided through the network 1, rather, an arrangement may be made wherein the user A makes a present of the a storage medium such as a CD (Compact Disc), a DVD (Digital Versatile Disc), or the like, which stores the content data, to the user B, and the license data is provided to a device for reproducing the content data stored in the storage medium through the network 1. Note that processing as follows may be applied to such a case, as well.

Furthermore, from the point of the license data, in a case wherein the content data is distributed free, the license data is not always necessary, rather, an arrangement may be made wherein the user can reproduce the content data without license data.

Taking such cases into consideration, in some cases wherein a user (user A) makes a present of the content data to another user (user B), the user A preferably makes a present of the license data corresponding to the content data to the user B. While description will be made below regarding examples wherein the user. A makes a present of the content data to the user B, these examples include a case wherein the user A makes a present of the content data and the license data, and a case wherein the user A makes a present of only the license data.

Description will be made below regarding such processing for making a present of the content data. Now, description will be made with reference to an example wherein the user A performs processing for purchase of (making a present of) the content data through the PC 12, and the user B obtains (receives and stores) the content data which is a present from the user A through the STB 21 (FIG. 1). That is to say, the service provider 2 performs processing for charging the user A, and processing for transmission of the content data to the user B.

Figure 23:
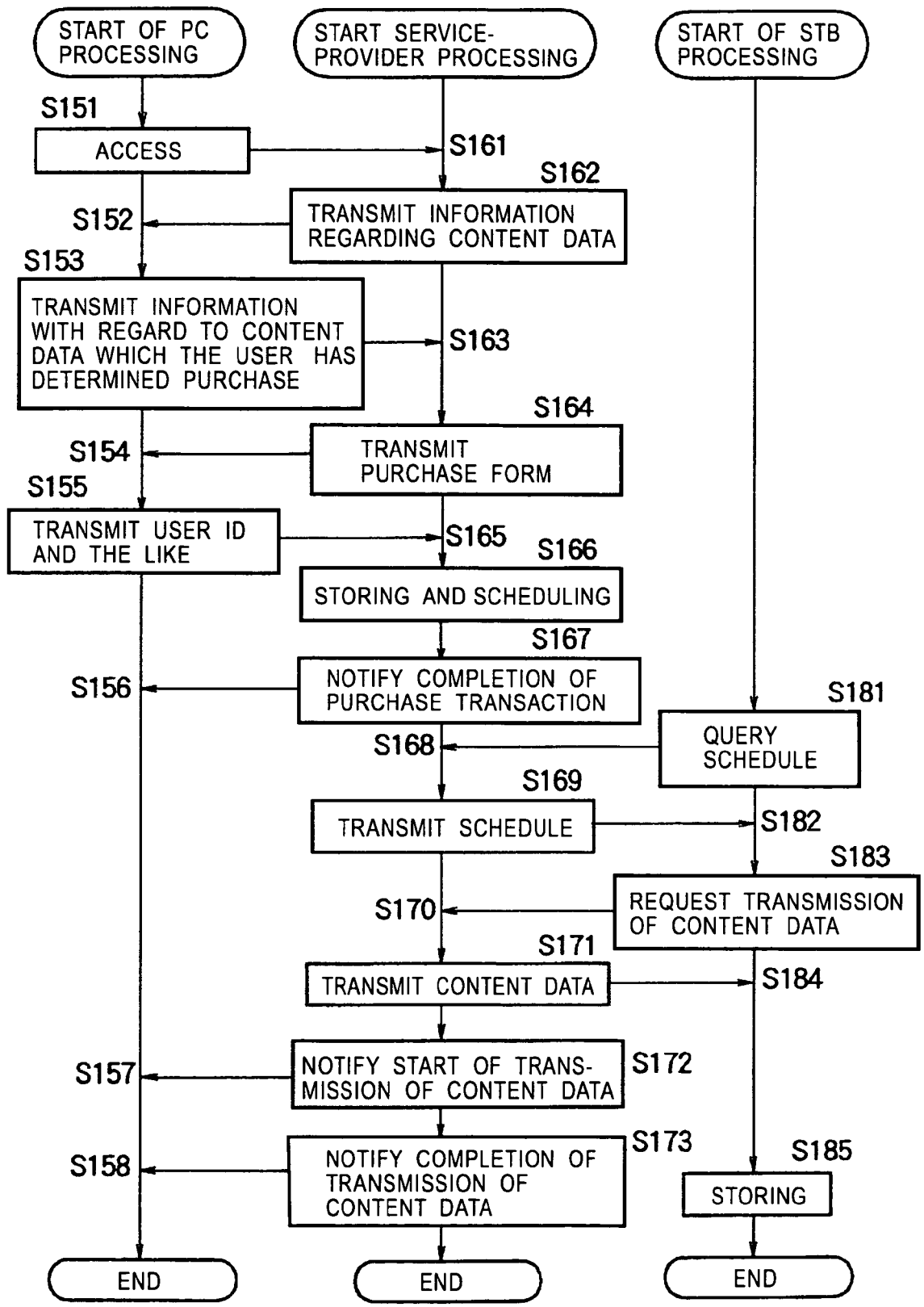
FIG. 23 is a flowchart for describing other processing for making a purchase.

First, the overall processing flow thereof (processing flow between the PC 12, the service provider 2, and the STB 21) is generally the same as the processing shown in the flowchart in FIG. 23 described above. With the present arrangement, the processing performed by the PC shown in the flowchart in FIG. 23 is performed by the PC 12 of the user A, and the processing performed by the STB shown in the flowchart is performed by the STB 21 of the user B.

Note that with an arrangement wherein the user can make a present of the content data, the service provider 2 needs to perform processing for making a present. Accordingly, description will be made regarding processing performed by the service provider 2. First, description will be made regarding processing for purchase of the content data performed by the service provider 2, including processing for making a present, with reference to the flowcharts in FIGS. 29 and 30.

Figure 24:
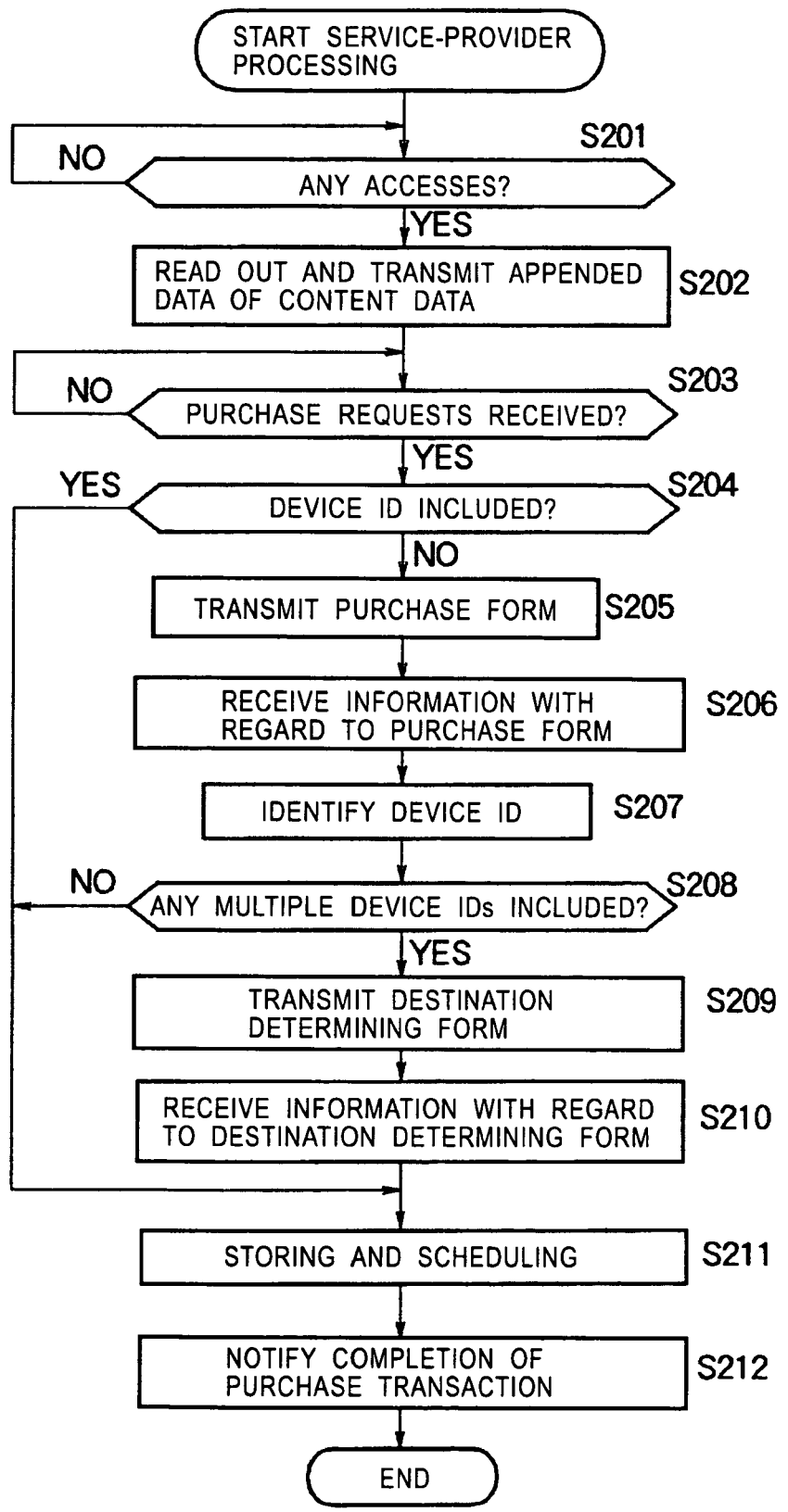
FIG. 24 is a flowchart for describing the processing performed by the service provider.
Figure 29:
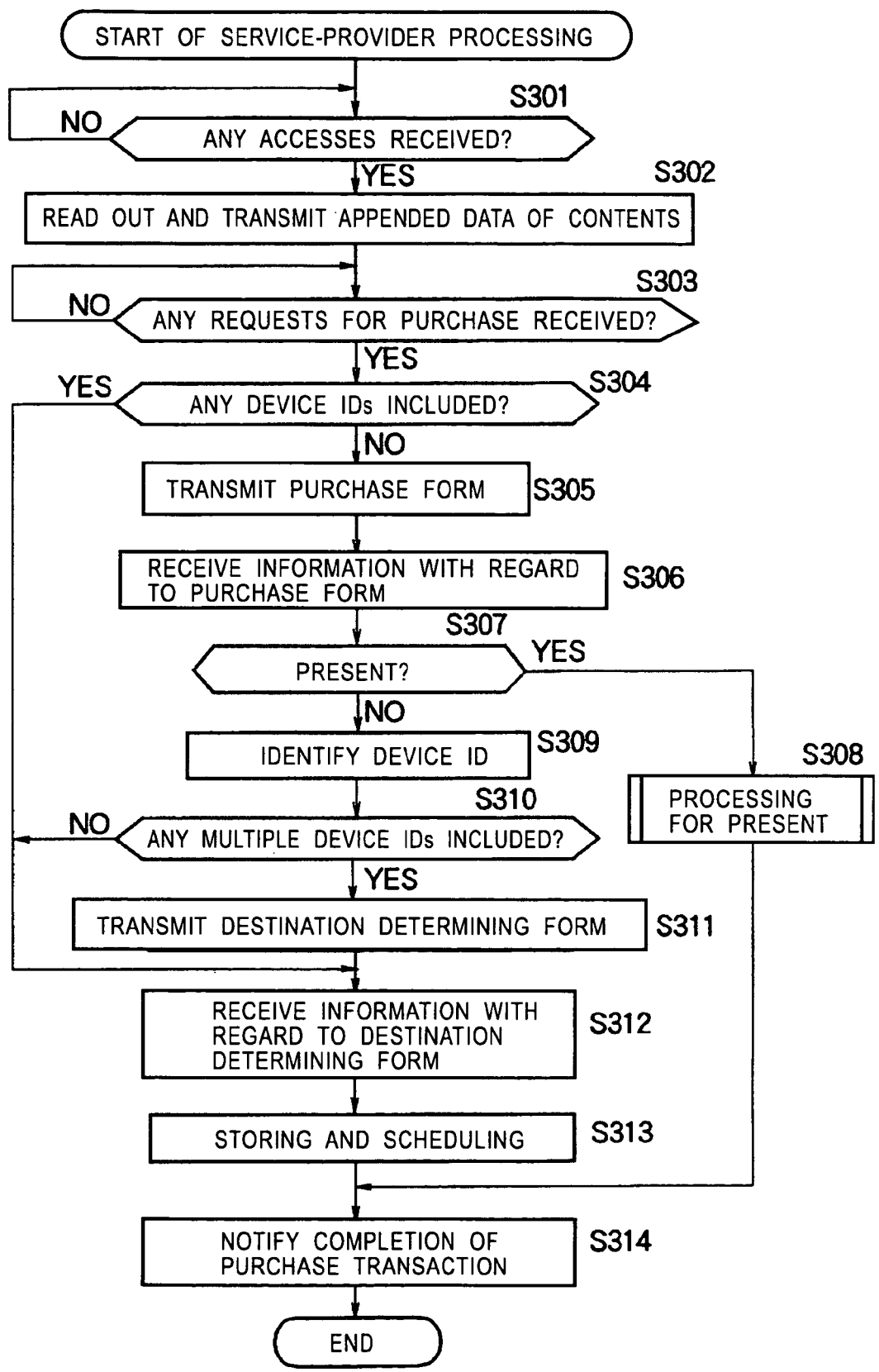
FIG. 29 is a flowchart for describing the processing performed by the service provider.

The flowchart shown in FIG. 29 has a configuration wherein the processing shown in Steps S307 and Step S308 is added to the flowchart shown in FIG. 24. That is to say, the processing shown in Step S301 through Step S306 in FIG. 29 is generally the same as the processing shown in Step S201 through Step S206 in FIG. 24. Furthermore, the processing shown in Step S309 through Step S314 in FIG. 29 is generally the same as the processing shown in Step S207 through Step S212 in FIG. 24.

Now, while description will be omitted regarding processing performed by the service provider 2 which has been already described with reference to the flowchart in FIG. 24, as appropriate, description will be made regarding processing required for performing processing for making a present. In a case of the service provider 2 performing processing for making a present, the purchase form data transmitted in Step S305 is different from that in the above-described embodiment.

Figure 31:
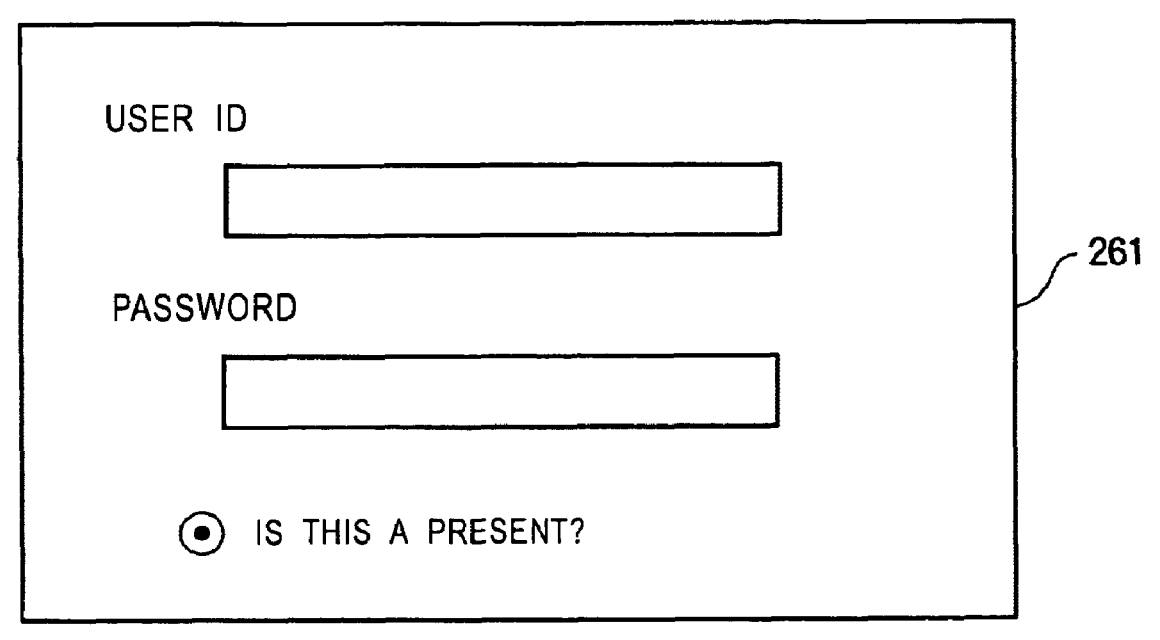

While description has been made regarding a screen displayed based upon the purchase form data in the above-described embodiment with reference to the screen shown in FIG. 25, with a case wherein the user makes a present of the content data, the service provider 2 transmits the purchase form data to the device on the user side (in this case, the display 261 of the PC 12 of the user A) for displaying a screen as shown in FIG. 31 in Step S305.

The screen shown in FIG. 31 includes a field for inputting the user ID, a field for inputting the password, and a radio button for checking in the event that the user agrees to the message of "Is this a present?". In the event that the user (user A) makes a present of the content data to another user (user B), the user A checks the radio button which agrees the message of "Is this a present?". FIG. 31 shown a screen example wherein the user has checked the radio button.

Upon the service provider 2 transmitting the purchase form data for displaying such a screen on the display 261 on the user side, the service provider 2 enters the state for waiting for the information which the user has input while referring to the purchase form. Subsequently, upon receiving the information with regard to the purchase form in Step S306, the flow proceeds to the processing in Step S307.

The received information includes at least information with regard to the user ID and the password. In addition, the received information includes information which indicates that the purchase has been made for a present, as necessary. The service provider 2 performs processing for purchase of the content data in Step 307 based upon the information which indicates whether or not the purchase has been made for a present.

In Step S307, in the event that determination is made that the purchase of the content data has been made for a present (in the event that the received information includes the information which indicates that the purchased content data is for a present), the flow proceeds to Step S308. On the other hand, in the event that determination is made that the purchased content data is not for a present (in the event that the received information does not include such information), the flow proceeds to Step S309.

In the event that the flow proceeds to Step S309, i.e., in the event that the purchased content data is not for a present, the subsequent processing is performed in the same way as described above with reference to the flowchart shown in FIG. 24.

On the other hand, in the event that the flow proceeds to Step S308, the service provider 2 performs processing for making a present of the content data. Prior to description with regard to the processing in Step S308, description will be made regarding processing for the user ID and the password included in the information received in Step S306.

In the event that the flow proceeds to the processing in Step S309, the service provider 2 performs identification of the destination device for receiving the purchased content data, and user authentication, based upon the information with regard to the user ID and the password, described above with reference to the flowchart shown in FIG. 24. In the event that the flow proceeds to the processing in Step S308, the service provider 2 identifies the user to be billed based upon the information with regard to the user ID and the password, as described later.

Figure 32:
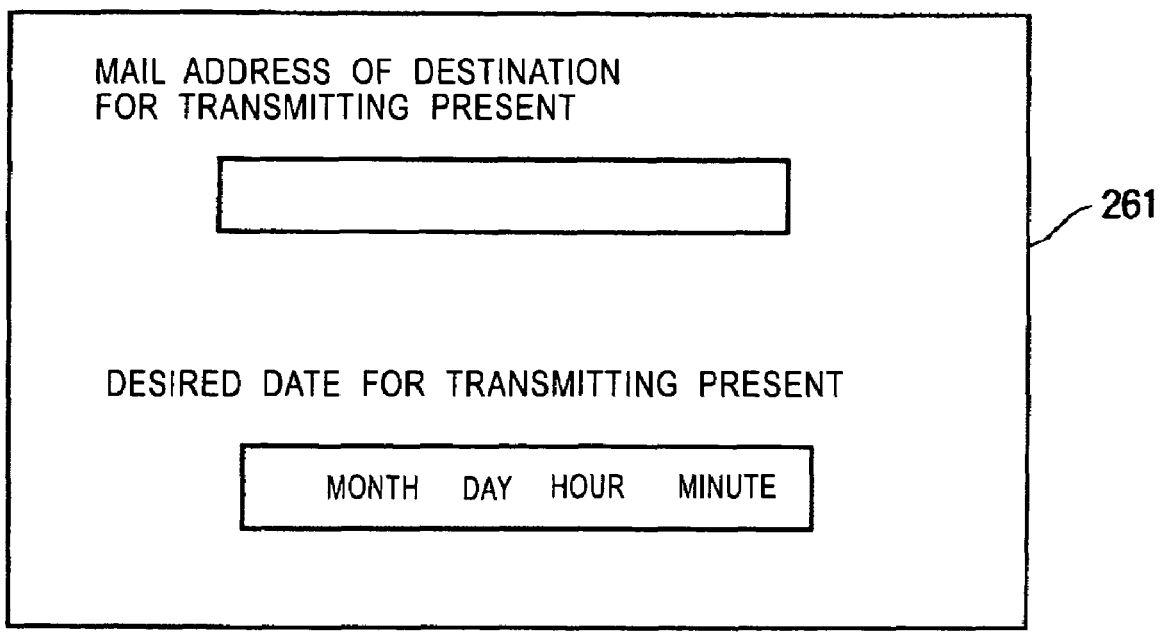
FIG. 32 is a diagram which shows another screen example displayed on the display.

Description will be made regarding processing for making a present performed in Step S308, with reference to the flowchart shown in FIG. 30. In Step S321, the service provider 2 transmits the data in form for making a present to the device on the user side. FIG. 32 shows an example of the screen displayed on the device on the user side, in this case, the display 261 of the PC 12 of the user A, based upon the data in form for making a present.

The screen shown in FIG. 32 includes a field for inputting "the mail address of the destination user for the present", and a field for inputting "desired date for transmitting the present". The service provider 2 identifies the destination user (device) for transmitting the content data which is a present, based upon the information with regard to the "mail address of the destination user for the present".

On the other hand, the service provider 2 can provide the purchased content data to the user B, which is a present from the user A to the user B, at the date which has been specified by the user A, such as the birthday of the user B, based upon the aforementioned information with regard to the "desired date for transmitting the present". The information with regard to the "desired date for transmitting the present" is not always necessary. Note that the service provider 2 performs subsequent processing, even in the event that the user has not input the information.

Note that while description has been made regarding an arrangement wherein the service provider 2 identifies the user for receiving content data which is a present based upon the mail address, an arrangement may be made wherein the service provider 2 identifies the user for receiving the content data based upon other information. Here, description has been made under an assumption that the destination table has the information as shown in FIG. 18, and it is considered that the mail address included therein is the optimal information for identifying the user for receiving the content data which is a present, and accordingly, description will be made with reference to an example wherein the mail address is used for identifying the user for receiving the content data which is a present.

Note that with the present embodiment using the destination table including the user IDs different one from another, the service provider 2 can identifies the user for receiving the content data which is a present based upon the information with regard to the user ID, and accordingly, an arrangement may be made wherein the service provider 2 identifies the user for receiving the present based upon the information with regard to the user ID. In this case, an arrangement may be made wherein the screen as shown in FIG. 32 includes a field for inputting the user ID corresponding to the user for receiving the present, instead of the mail address.

Furthermore, in a case of the destination table (another table stored in the service provider 2) including the real name, the phone number, the address, or the like, of the user, for identifying the user for receiving the present, an arrangement may be made wherein the service provider 2 identifies the user for receiving the present, based upon any one of the aforementioned information. Furthermore, an arrangement may be made wherein the service provider 2 identifies the user for receiving the present based upon the combination of the aforementioned information.

Upon the user who is going to makes a present of the content data inputting the information while referring the screen as shown in FIG. 32, the service provider 2 receives the information in Step S322. The service provider 2 extracts the information with regard to the mail address from the information received in Step S322. In Step S323, the service provider 2 determines whether or not the extracted mail address is stored in (has been registered with) the destination table (e.g., the destination table shown in FIG. 18).

In the event that the service provider 2 determines that the extracted mail address has been registered with the destination table in Step S323, the flow proceeds to the processing in Step S324. On the other hand, in the event that the service provider 2 determines that the extracted mail address has not been registered with the destination table, the processing for making a present ends based upon the flowchart shown in FIG. 30. That is to say, in the event that the extracted mail address has not been registered with the destination table, the service provider 2 cannot identify the destination device (user) for receiving the content data which is a present data, and accordingly, in the event that determination is made that the mail address has not been registered with the destination table, the processing for making a present ends.

Note that an arrangement may be made wherein in the event that determination is made that the extracted mail address has not been registered with the destination table, the service provider 2 performs processing for prompting the user to input the mail address again. Furthermore, in the event that the processing for making a present ends due to the fact that the service provider cannot identify the destination device for receiving the present, the service provider 2 transmits a message to the device on the user side so as to notify the user who has made a request for purchase that the service provider 2 has failed in performing processing for making a purchase, in Step S314 (FIG. 29).

On the other hand, in the event that the service provider 2 determines that the extracted mail address has been registered with the destination table in Step S323, and the flow proceeds to the processing in Step S324, the service provider 2 transmits an electronic mail to the user corresponding to the extracted mail address. Let us say that the extracted mail address is "mpm@z.co.jp". In this case, the serviced provider 2 refers to the destination table shown in FIG. 18, and identifies the user ID of "d4e5f6" based upon the aforementioned mail address.

As described above, in the event that determination is made that the extracted mail address matches any of the mail addresses stored in the destination table in Step S323, the flow proceeds to the processing in Step S324. In this case, the service provider 2 reads out other information corresponding to the mail address, as necessary. In this case, the service provider 2 reads out at least the information with regard to the names of the terminals, i.e., "PC", "STB", and "CELLULAR PHONE". The service provider 2 transmits the read-out information through the aforementioned electronic mail.

FIG. 33 shows an example of the aforementioned electronic mail. Now, description will be made with reference to an example wherein the PC 22 of the user B receives the electronic mail, and displays the screen on an unshown display of the PC 22 as shown in FIG. 33.

The PC 22 displays a message of "user A makes a present for you." and "Do you accept the present?" on the screen of the unshown display thereof. An actual display would be the user ID of the user A, the name of the user A, or the like, which has been registered beforehand (the service provider 2 manages the aforementioned information as information within the destination table, correlated with other information, for example), instead of the "user A". At the time of transmission of the electronic mail for displaying such a screen, the service provider 2 identifies the user who has performed processing for making a present based upon the information with regard to the user ID (the password, or the combination of the user ID and the password), and generates the body of the electronic mail such that the "user A" in the aforementioned message is replaced by the string indicating the identified user.

The screen shown in FIG. 33 includes radio buttons for selecting an answer to the message of "Do you accept the present?". Here, the screen includes two radio buttons; one is for "YES", and another is for "NO". Upon the user selecting the radio button corresponding to "YES", the radio buttons corresponding to the message of "Select device for download" for selecting the destination device becomes valid.

In the example shown in FIG. 33, the screen includes three radio buttons corresponding to terminal names of "PC", "STB", and "CELLULAR PHONE", respectively. While in the event that the intended recipient of the present has registered only one device (terminal) with the service provider 2, the aforementioned screen displays only one terminal name on the portion where the terminal names are to be displayed. Note that in the event that only one terminal name is displayed on the screen, the user must specify the device corresponding to the displayed terminal name as the destination device for receiving the content data. That is to say, the user cannot select a destination device from multiple devices, and accordingly, there is no need to display and select the destination device, and an arrangement may be made wherein in the event that the intended recipient of the present has registered only one device (terminal) with the service provider 2, the radio button for selecting the destination device is not displayed on the screen.

Upon the intended recipient of the present inputting the information while referring the screen as shown in FIG. 33, the device on the user side transmits the information to the service provider 2. The service provider 2 determines whether or not the service provider 2 has received the information from the intended recipient of the present in Step S235. In the event that determination is made that the service provider 2 has received the information, the flow proceeds to the processing in Step S326.

In Step S326, the service provider 2 extracts the answer of the user to the question of "Do you accept the present?" included in the received information, and determines whether or not the answer is "YES". That is to say, the service provider 2 determines whether or not the intended recipient of the present has accepted the present, in Step S326.

Figure 30:
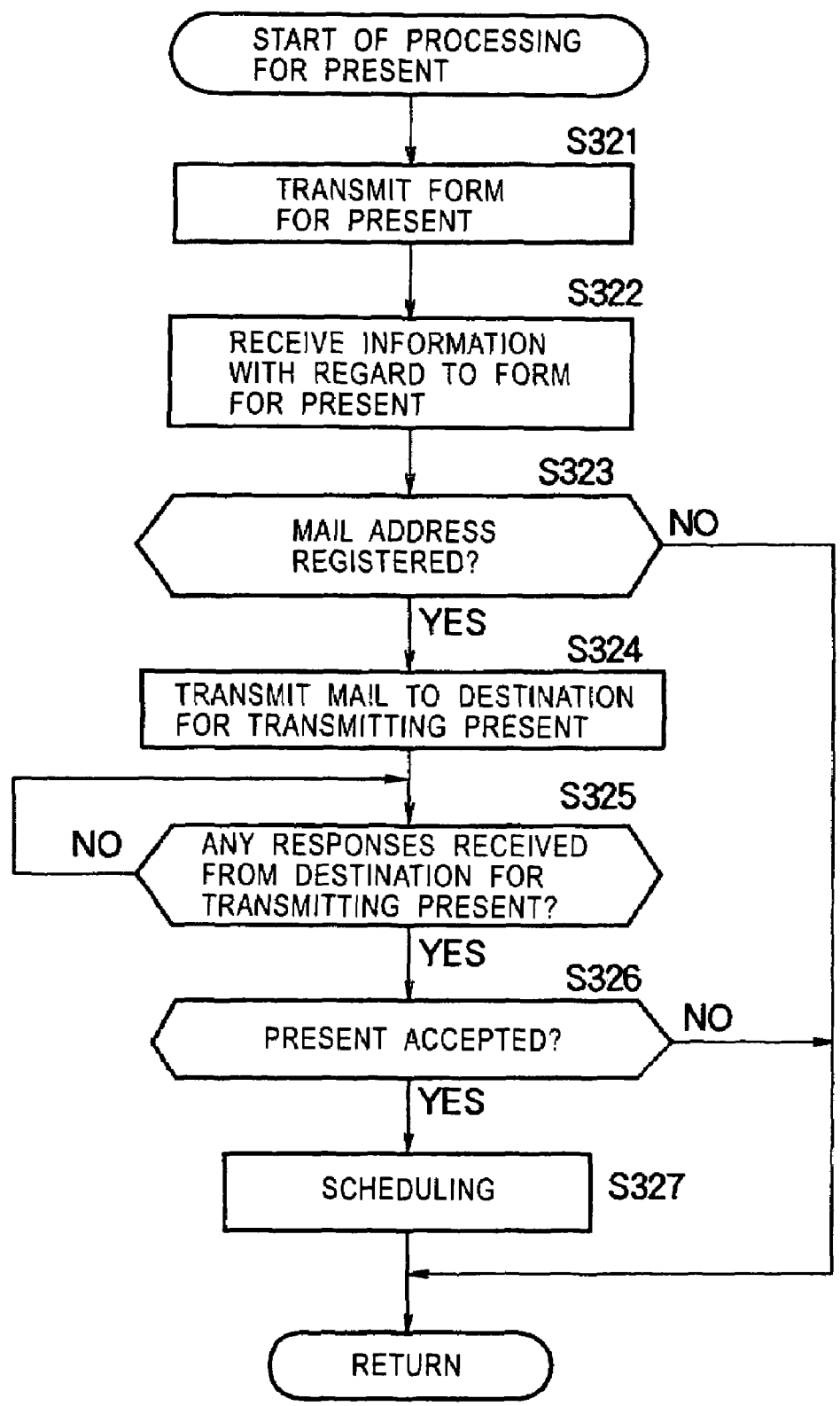
FIG. 30 is a flowchart for describing the processing for making a present.

In the event that determination is made that the intended recipient of the present has decided not to accept the present in Step S326, the service provider 2 needs not perform processing for making a present, and accordingly the processing according to the flowchart shown in FIG. 30 ends. Note that an arrangement may be made wherein in the event that the intended recipient (in this case, the user B) rejects the present as described above, the service provider 2 transmits a message for notifying the user, who has made a present of the contents (in this case, the user A), that the user B has rejected the present through an electronic mail, for example.

On the other hand, in the event that the service provider 2 determines that the intended recipient has accepted the present in Step S326, the flow proceeds to Step S327, and the service provider 2 generates a schedule for transmitting the content data, which has been specified as a present, to the recipient of the present. The schedule generated in the step is formed of information generally the same as with the schedule as shown in FIG. 22.

Now, description will be made regarding the configuration of the schedule generated in Step S327 with reference to FIG. 22. Here, description will be made with reference to an example that the user A makes a present of the content data for the user B. The field of "content ID" is included for inputting the ID corresponding to the contents which has been specified as a present for the user B by the user A. The field of "destination device ID" is included for inputting the device ID corresponding to the device (terminal name) specified by the user B, which has been received by the service provider 2 in Step S325.

The field of "billing user ID" is included for inputting the user ID of the user A who makes a present. The field of "transmission point-in-time" is included for the user A inputting the point-in-time for making a present of the content data for the user B, which has been specified by the user A in a normal case. The reason that the phrase "in a normal case" has been used is that in some cases, the service provider 2 may input (set) the point-in-time other than that specified by the user A in the processing for generating a schedule described later.

Upon the service provider 2 generating such a schedule, the flow proceeds to Step S314 (FIG. 29). In Step S314, the service provider 2 performs for giving a notification of completion of the purchase transaction to the corresponding devices. In the event that the processing for the present has been performed, and the intended recipient has accepted the present, the service provider 2 gives the notification of completion of the purchase transaction to both the user which has made a present (user A) and the intended recipient (user B).

On the other hand, in the event that the processing for the present has been performed, but the intended recipient has decided not to accept the present, the service provider 2 notifies the intended recipient that the present has been canceled, and notifies the user which has made the present that the intended recipient has rejected the present.

On the other hand, in the event that the processing for the present has not been performed, i.e., in the event that the service provider 2 determines that the purchase made by the user A is not for a present in Step S307, the subsequent processing is performed in the same way as the processing performed in Step S212 shown in the flowchart in FIG. 24.

Thus, the service provider 2 performs processing for purchase including processing for making a present. Next, description will be made regarding processing for transmission of the content data performed by the service provider 2. The processing for transmission of the content data performed by the service provider 2 is generally the same as the processing described above with reference to the flowchart shown in FIG. 27, and accordingly, description thereof will be omitted. Note that the processing is performed between the service provider 2 and the device on the user side serving as a recipient of the present, e.g., the STB 21.

In the event that the service provider 2 transmits the content data which is a present, the service provider 2 preferably gives a notification of completion of transmission not only to the user serving as a recipient but to the user who has made the present, in Step S239. With the present embodiment, the service provider 2 gives a notification to the user who has made the present (user A), as well, thereby notifying the user A that the processing for making the present has been completed, and charges for the present have been generated.

Figure 28:
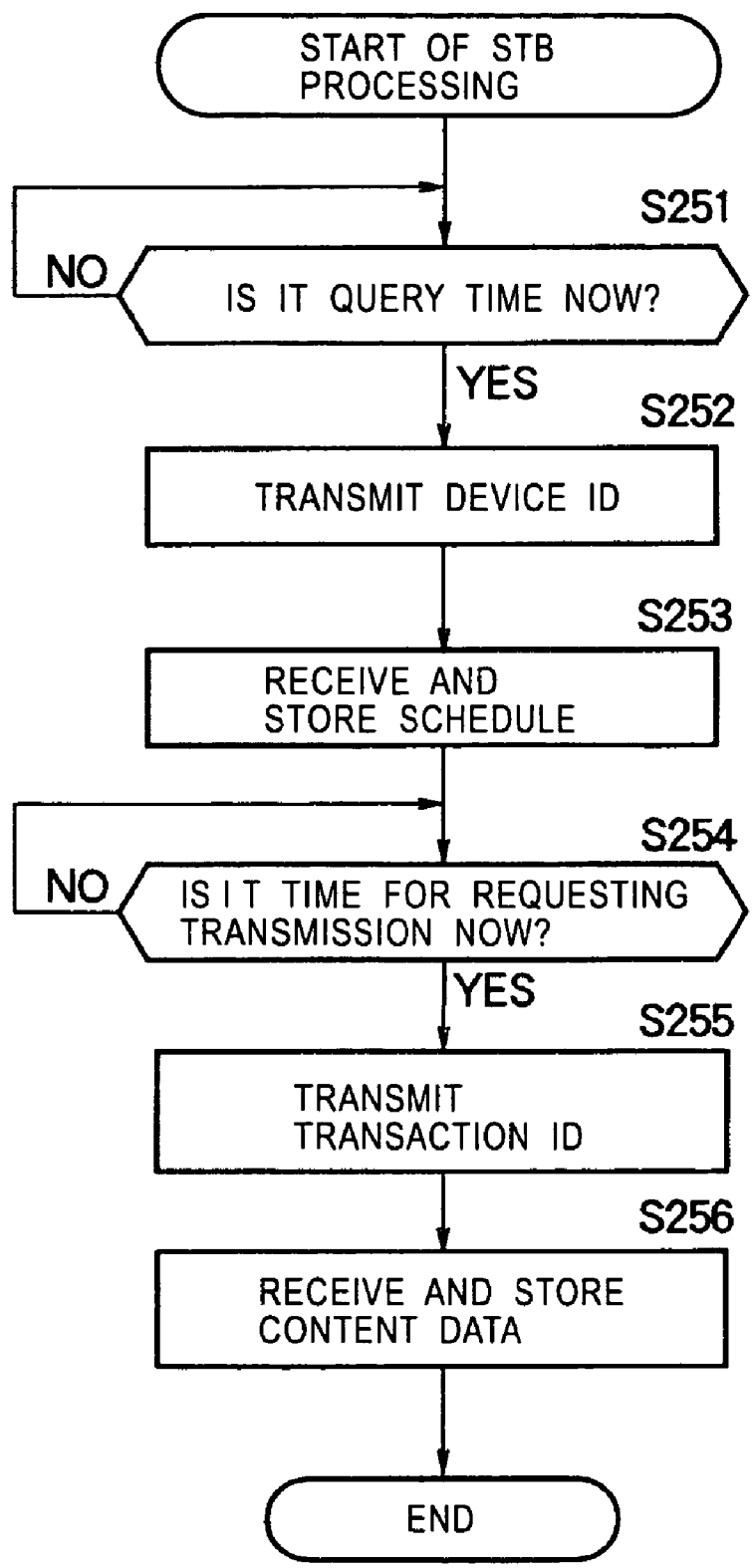
FIG. 28 is a flowchart for describing the processing performed by the STB.

The device serving as a recipient of the present (in this case, the STB 21 of the user B, for example) performs processing in the same way as described above with reference to the flowchart shown in FIG. 28. That is to say, the processing performed in the event that the user B receives the content data which is a present from the user B is generally the same as the processing performed in the event that the user B receives the content data purchased by the user B him/herself.

As described above, with the present embodiment, a user can make a present of content data (license data) to another user.

Next, description will be made regarding processing for generating a schedule performed by the service provider 2. The processing for generating a schedule is performed in Step S313 (FIG. 29), for example, and is performed in the event that any user makes a purchase of content data.

Description will be made regarding situations wherein the service provider 2 performs processing for generating a schedule. In a first situation, the user A performs processing for making a purchase through a device of the user A, and the device, through which the purchase processing has been performed, receives and stores the purchased content data. In a second situation, the user A performs processing for making a purchase through a device of the user A, and another device of the user A receives and stores the purchased content data. In another situation, the user A performs processing for making a purchase through a device of the user A, and another device of the user B receives and stores the purchased content data.

As described above, there are various combinations of devices which perform for purchase processing and devices serving as a recipient of the purchased content data. On the other hand, with regard to the timing for transmission of the content data, in some cases, the service provider 2 performs transmission at the point-in-time specified by the user, and in some cases, at the point-in-time set by the service provider 2.

On the other hand, each set of the content data is not always of the same data size, rather the data size varies widely according to the contents. Accordingly, in some cases, transmission of content data takes a long time, and in some cases, a short time, i.e., transmission time varies widely according to the data size.

Accordingly, there is need to decide the timing for transmission of content data taking such various situations into the consideration. With the present embodiment, the processing for generating a schedule is performed in order to decide the timing of transmission.

Figure 34:
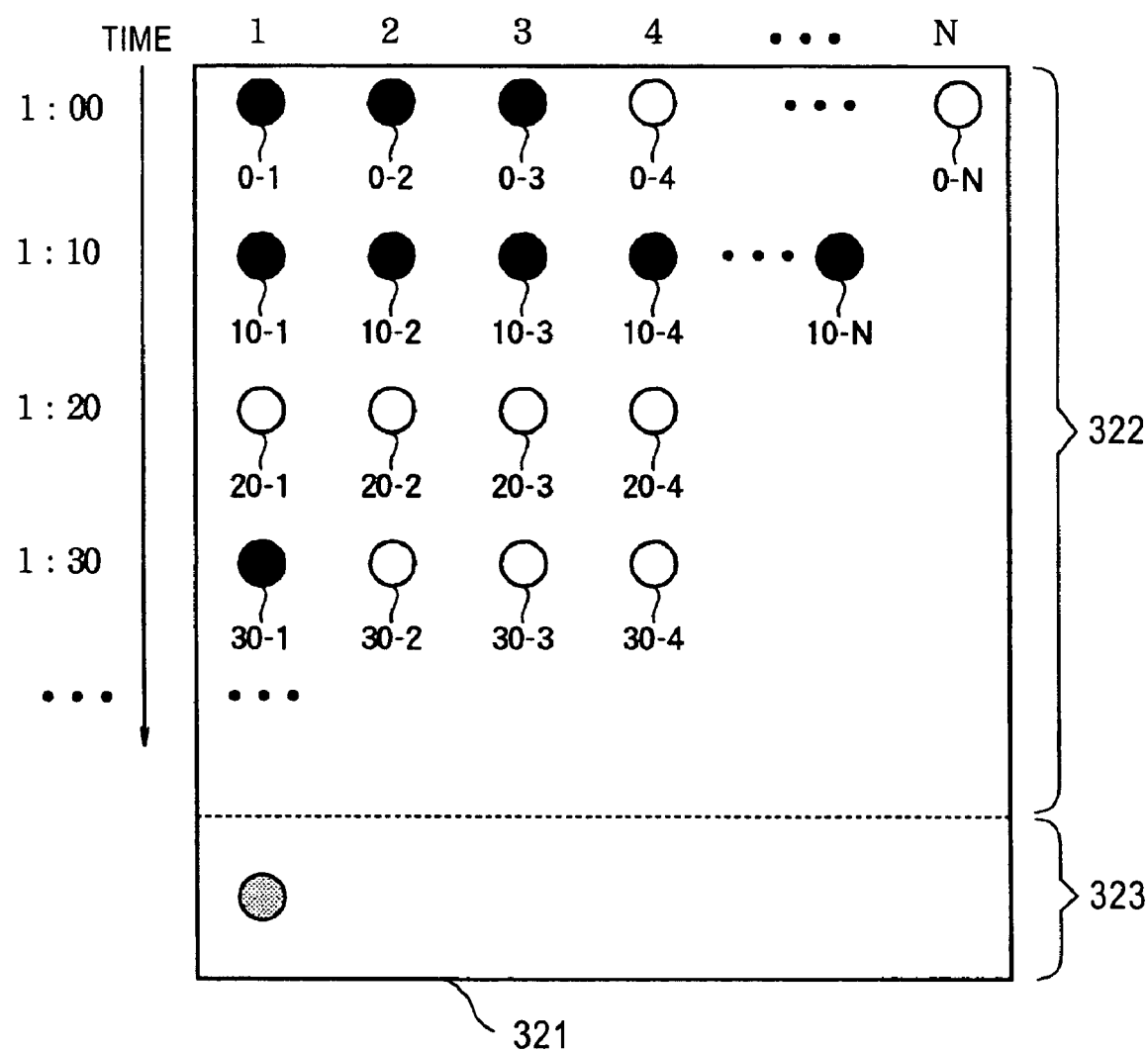
FIG. 34 is a diagram for describing a transmission reservation table used for generating a schedule.

Next, description will be made regarding the processing for generating a schedule performed by the schedule generating unit 204 (FIG. 7) of the service provider 2, with reference to the flowchart shown in FIG. 35. Prior to this description, description will be made regarding a table to which the service provider 2 refers at the time of generating a schedule, with reference to FIG. 34. FIG. 34 is a table to which the schedule generating unit 204 refers at the time of generating a schedule, wherein the schedule generating unit 204 confirms the points-in-time for transmission of reserved contents based thereupon.

FIG. 34 shows an example of a transmission reservation table 321, wherein the user can make a reservation in increments of ten minutes. Note that FIG. 34 is an enlarged view of the transmission reservation table 321, which shows the reservations with transmission point-in-time of at 1:00, 1:10, 1:20, and 1:30. In FIG. 34, solid circles represent "reservation has been made", circles represent "reservation has not been made (the user can make a reservation)".

Also, FIG. 34 shows an example wherein the user can make an N number of reservations for transmission at a point-in-time in increments of ten minutes. The number N is determined based upon the data size of the content data and the data size which the service provider 2 can transmit for ten minutes (transmission capability). Note that the transmission performance (processing capability) is constant according to the system, and accordingly, in general, the number N is determined based upon the data size of the content data.

Accordingly, in the event that the users have made reservations for transmission of content data with large data size, the number N is reduced, and in the event that the users have made reservations for transmission of content data with small data size, the number N is increased, i.e., the number N varies from time to time. That is to say, the number N is adjusted and determined based upon the data size of the content data regarding which reservations for transmission have been made.

The transmission reservation table 321 includes a fixed region 322 and an unfixed region 323. The fixed region 322 stores reservations which have been fixed as schedules. The unfixed region 323 stores reservations wherein while the users have made requests for presents, the intended recipients have not decided to accept the presents, and accordingly, the reservations have not been fixed as schedules.

Figure 35:
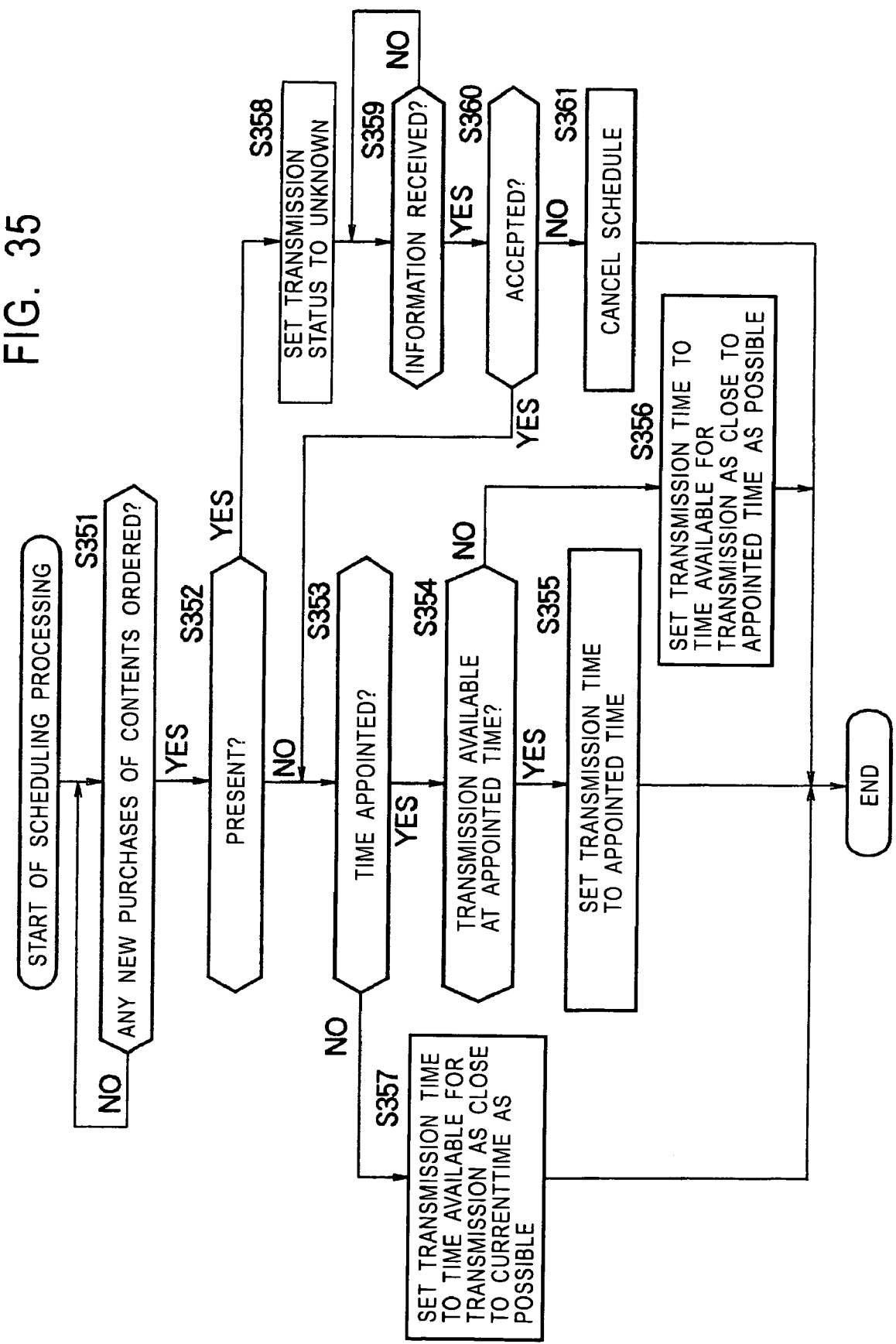
FIG. 35 is a flowchart for describing the processing for generating a schedule.

The schedule generating unit 204 refers to the transmission reservation table 321 as shown in FIG. 34, and performs processing for making a schedule according to the flowchart shown in FIG. 35. Description will be made below regarding processing for determining the transmission point-in-time with reference to the flowchart shown in FIG. 35. Note that other information is acquired and stored in the same way as described above, and accordingly description thereof will be omitted.

In Step S351, the schedule generating unit 204 determines whether or not any new user has made a request for purchase of content data, and there is the need to generate a schedule for transmitting the content data.

As described above, the service provider 2 performs the processing for purchase of the contents in the content distribution reservation unit 201. The content distribution reservation unit 201 instructs the schedule generating unit 204 so as to generate a new schedule, upon determination being made that the service provider 2 has received a reservation for the contents (e.g., the timing for performing the processing in Step S211 shown in FIG. 24). The schedule generating unit 204 determines whether or not such instructions have been made, whereby determination processing shown in Step S351 is performed.

In the event that determination is made that the service provider 2 should make a new schedule in Step S351, the flow proceeds to Step S352, and determination is made whether or not the schedule is to be generated for a present. The reason that the determination is made whether or not the schedule is for a present in Step S352 is that the service provider 2 cannot fix a schedule for the present (in particular, the point-in-time for transmitting the content data) until the intended recipient decides to accept the present.

In the event that determination is made that the schedule which is to be generated is not for a present in Step S352, the service provider 2 determines whether or not the user has specified the point-in-time for transmission of the purchased content data in Step S353. In the event that determination is made that the user has specified the transmission point-in-time in Step S353, the flow proceeds to Step S354, and determination is made whether or not the service provider 2 can transmit the content data at the point-in-time specified by the user.

In order to make the aforementioned determination, the service provider 2 refers to the transmission reservation table 321 shown in FIG. 34. Let us say that the service provider 2 refers to the portion at the transmission point-in-time of 1:00 of the transmission reservation table 321, for example. In the initial stage wherein no user has made a reservation, the user can make an N number of reservations with the transmission point-in-time of 1:00. In the stage shown in FIG. 34, while the reservations 0-1 through 0-3 have been made, the reservations 0-4 through 0-N are in the state wherein the user can make a reservation. Accordingly, in the event that the user makes a reservation for the content data with the transmission point-in-time of 1:00, the service provider 2 determines that the user can make the reservation of 0-4, and accordingly, the service provider 2 determines that the content data can be transmitted at the point-in-time specified by the user.

Next, let us say that the service provider 2 refers to the portion at the transmission point-in-time of 1:10 of the transmission reservation table 321, for example. In the initial stage wherein no user has made a reservation, the user can make an N number of reservations with the transmission point-in-time of 1:10 (note that the number N is different from that at the point-in-time of 1:00 described above). In the stage shown in FIG. 34, the reservations 10-1 through 10-N have been made. That is to say, the user cannot make any further reservations. As described above, in the event that the user makes a reservation for the content data transmitted at the point-in-time of 1:10 specified by the user in this situation, the service provider 2 determines that the reservations transmitted at this point-in-time have been already made, and accordingly, determination is made that the service provider 2 cannot transmit the content data at the point-in-time specified by the user.

In the event that determination is made that the service provider 2 can transmit the content data at the point-in-time specified by the user in Step S354 as described above, the flow proceeds to Step S355, and the service provider 2 sets the transmission point-in-time for the content data to the point-in-time specified by the user. That is to say, the service provider 2 writes the point-in-time specified by the user to the field of "transmission point-in-time" in the table as shown in FIG. 22. Furthermore, at the same time, the service provider 2 writes the information which indicates "the content has not been transmitted" to the field of "transmission status" in the aforementioned table.

Thus, in the event that the user has specified the transmission point-in-time for the content data, and determination is made that the service provider 2 can transmit the content at the point-in-time specified by the user, the service provider 2 generates a schedule wherein the specified point-in-time has been written to the corresponding field.

On the other hand, in the event that determination is made that the service provider 2 cannot transmit the content data at the point-in-time specified by the user in Step S354, the flow proceeds to Step S356, wherein the service provider 2 refers to the transmission reservation table 321 so as to detect a point-in-time which is the closest to the point-in-time specified by the user, and at which the service provider 2 can transmit the content data.

Now, description will be made with reference to FIG. 34, again. Let us say that the user has made a reservation with the transmission point-in-time of 1:10, for example. As shown in FIG. 34, all the reservations at this point-in-time have already been made, and accordingly, determination is made that the service provider 2 cannot transmit the content data at the point-in-time of 1:10 specified by the user. In such a case, the service provider 2 refers to the reservation state at a point-in-time around the point-in-time specified by the user. Note that the service provider 2 may start a search of the fields for reservations which have not been made from a field corresponding to a point-in-time, either prior to or following the point-in-time specified by the user.

Note that in the event that the service provider 2 has a configuration wherein the service provider 2 starts a search from a field corresponding to a point-in-time prior to the point-in-time specified by the user, the service provider 2 compares the point-in-time regarding which is to be searched (which will be referred to as "the point-in-time A" hereafter)

with the point-in-time at which the search is being made (which will be referred to as "the current point-in-time" hereafter), and the point-in-time A is required to be after the current point-in-time, for the field corresponding to the point-in-time A serving as an object field where the service provider 2 should search. More specifically, for example, in the event that the user has made a reservation with the transmission point-in-time of 1:10, the closest point-in-time prior to the specified point-in-time is 1:00 (i.e., the point-in-time A). However, in the event that the search is being made at point-in-time of 1:05 (i.e., the current point-in-time), the service provider 2 cannot transmit the content data at the point-in-time A (i.e., the user cannot make a reservation with the transmission point-in-time A).

Thus, in Step S356, the service provider 2 refers to the transmission reservation table 321 so as to set the transmission point-in-time to the point-in-time which is the closest to the point-in-time specified by the user, and at which the service provider 2 can transmit the content data. The determined point-in-time is written to the field of "transmission point-in-time" in the schedule (see FIG. 22).

As described above, with the present embodiment, while the user specifies the transmission point-in-time for the content data, in the event that determination is made that the service provider 2 cannot transmit the content data at the point-in-time specified by the user, the service provider 2 generates a schedule with the transmission point-in-time which is the closest to the point-in-time specified by the user, and at which the service provider 2 can transmit the content data.

While description has been made regarding processing performed in the event that the user has specified the point-in-time at which transmission is to be performed, in the event that determination is made that the user has not specified the transmission point-in-time for the content data in Step S353, the flow proceeds to the processing in Step S357. In Step S357, the service provider 2 performs processing for setting the transmission point-in-time to the point-in-time close to (in general, after) the point-in-time at which the schedule is being generated (the current point-in-time), and at which the service provider 2 can transmits content data.

As described above, in the event that the user has not specified the transmission point-in-time for the content data, the service provider 2 generates a schedule with the transmission point-in-time determined by the schedule generating unit 204 thereof, at which transmission of the content data can be performed.

On the other hand, in Step S352, in the event that determination is made that the service provider 2 generates a schedule for a present, the flow proceeds to the processing shown in Step S358. Now, description will be made with reference to FIG. 22, again. In Step S358, the schedule generating unit 204 generates a schedule wherein the field of "transmission status" stores information indicating that determination whether or not transmission is to be performed has not been made, e.g., "unfixed".

At the same time, the service provider 2 writes the date (point-in-time) specified as the date for making a present into the "transmission point-in-time" portion of the schedule shown in FIG. 22. Such a schedule serves as a reservation stored in the unfixed region 323 of the transmission reservation table 321.

The reason that the service provider 2 cannot fix the schedule for a present even in the event that the user has specified the transmission point-in-time is that the service provider 2 has not received the information with regard to a decision whether or not the intended recipient will accept the present.

Accordingly, in Step S359, determination is made whether or not the service provider 2 has received the information with regard to a decision whether or not the intended recipient accepts the present. The processing is performed in the same way as with the processing in Step S325 shown in the flowchart in FIG. 30.

The schedule generating unit 204 makes a determination whether or not the service provider 2 has received the information with regard to the response from the intended recipient of the present, whereby the processing in Step S359 is performed. In Step S359, in the event that determination is made that the service provider 2 has received the information, the flow proceeds to the processing shown in Step S360.

In Step S360, determination is made whether or not the received information indicates that the intended recipient decides to receive the present (i.e., accepts the present). In the event that determination is made that the intended recipient has decided to accept the present, the flow proceeds to Step S353, and subsequent processing is performed. Description has been already made regarding the processing from Step S353, and accordingly, description thereof will be omitted. However, in the event that the processing is performed for making a present, the aforementioned processing includes different processing, and accordingly, description thereof will be made below.

In Step S353, the service provider 2 refers to the schedule which has been already written as an unfixed schedule so as to determine whether or not the user has specified the transmission point-in-time. That is to say, the unfixed schedule has a configuration including the information as shown in FIG. 22, as well. The service provider 2 refers to the information in the field of "transmission point-in-time" so as to perform the processing in Step S353.

In the event that the field of "transmission point-in-time" stores the point-in-time specified by the user, the flow proceeds to the processing in Step S354. In Step S354, the service provider 2 compares the point-in-time stored in the field of "transmission point-in-time" with the current point-in-time, and in the event that the point-in-time stored in the field of "transmission point-in-time" is after the current point-in-time, and the service provider 2 can transmit the content data at the stored point-in-time, the flow proceeds to the processing in Step S355.

On the other hand, in Step S354, as a result of comparison between the stored point-in-time and the current point-in-time, in the event that determination is made that the stored point-in-time is earlier than the current point-in-time, this means that the stored point-in-time has already passed. That is to say, determination is made that point-in-time for making a present, specified by the user, has passed.

In such a case, the flow proceeds to the processing in Step S356, the service provider 2 preferably sets the transmission point-in-time to a point-in-time as early as possible, at which the service provider 2 can perform transmission, rather than the point-in-time which is the closest to the specified point-in-time, and at which the service provider 2 can perform transmission.

At the time of the service provider 2 deciding the transmission point-in-time within the schedule, and inputting the decided point-in-time to the field of "transmission point-in-time" as described above, the service provider 2 overwrites the field of "transmission status", where "unfixed" has been input, with the information which indicates that the transmission has not been performed. Furthermore, the service provider 2 reduces the reservation number stored in the unfixed region 323 of the destination table 321 by 1, and increases the reservation number stored in the field corresponding to the decided point-in-time in the fixed region 322 by 1. Thus, the service provider 2 generates a schedule for making a present.

On the other hand, in Step S360, in the event that the service provider 2 determines that the intended recipient has rejected the present, the flow proceeds to Step S361. In Step S361, the schedule stored in the unfixed region 323, corresponding to the present of the content data which has been rejected by the intended recipient, is canceled. The cancel processing includes processing for reducing the reservation number stored in the unfixed region 323 of the destination reservation table 321 by 1.

The device on the user side, e.g., the STB 11 makes a query at predetermined intervals whether or not the service provider 2 has generated any new schedule wherein the device which has made the query (STB 11) is specified as a destination device. In the event that the service provider 2 has such a schedule for the STB 11 at the time of the STB 11 making a query, the service provider 2 provides the schedule to the STB 11. The STB 11 make a request for transmission of the content data according to the received schedule. Note that the STB 11 makes the request at the point-in-time following the STB 11 receiving the schedule.

With the present embodiment, there is the need to give consideration to problems occurring in the STB 11 due to the above-described time lag between the point-in-time at which the STB 11 has received the schedule and the point-in-time at which the STB 11 makes a request for transmission of the content data.

Specific description will be made below. The STB 11 includes the storage unit 85 (FIG. 3) having a finite capacity, and stores the received content data in the storage unit 85. Even in the event that the storage unit 85 has remaining capacity at the time of receiving a schedule for storing the content data which is to be transmitted according to the schedule, the storage unit 85 may have an insufficient remaining capacity for storing the content data at the time of receiving the content data due to the STB 11 receiving and storing other content data in the aforementioned time lag between the point-in-time at which the STB 11 has received the schedule and the point-in-time at which the STB 11 makes a request for transmission of the content data.

As described above, even in the event that the STB 11 makes a request for transmission of the content data according to the schedule so as to receive the content data, the storage unit 85 may have insufficient remaining capacity for the content data, leading to a problem that the STB 11 cannot store the content data. Furthermore, the situation wherein the STB 11 cannot store the content data leads to a problem that the service provider 2 needs to perform transmission processing again, for example.

Description will be made below regarding processing for transmission of the content data performed by the service provider 2 in order to solve the above-described problems with reference to the flowchart shown in FIG. 36.

Figure 27:
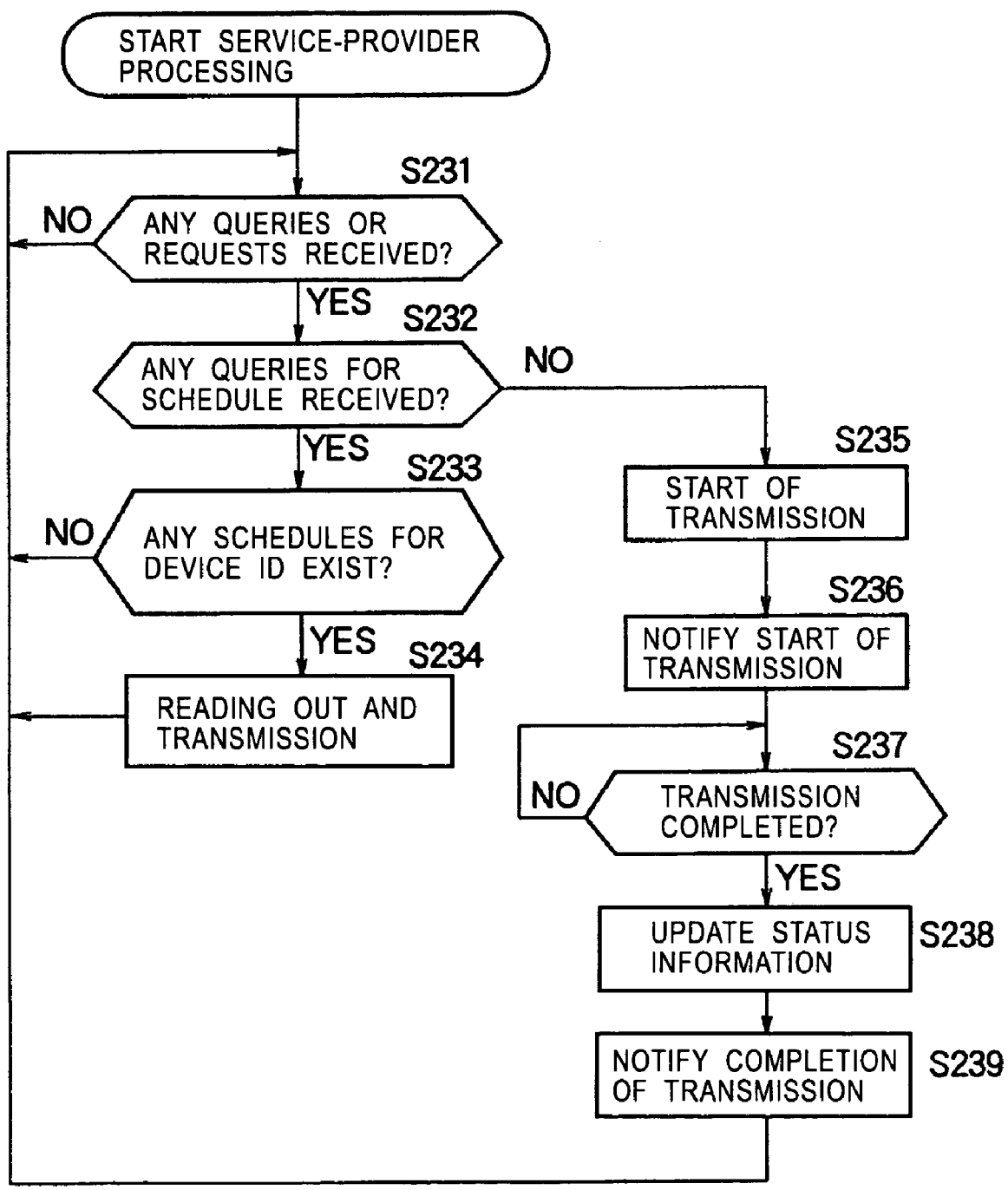
FIG. 27 is a flowchart for describing the processing performed by the service provider.
Figure 36:
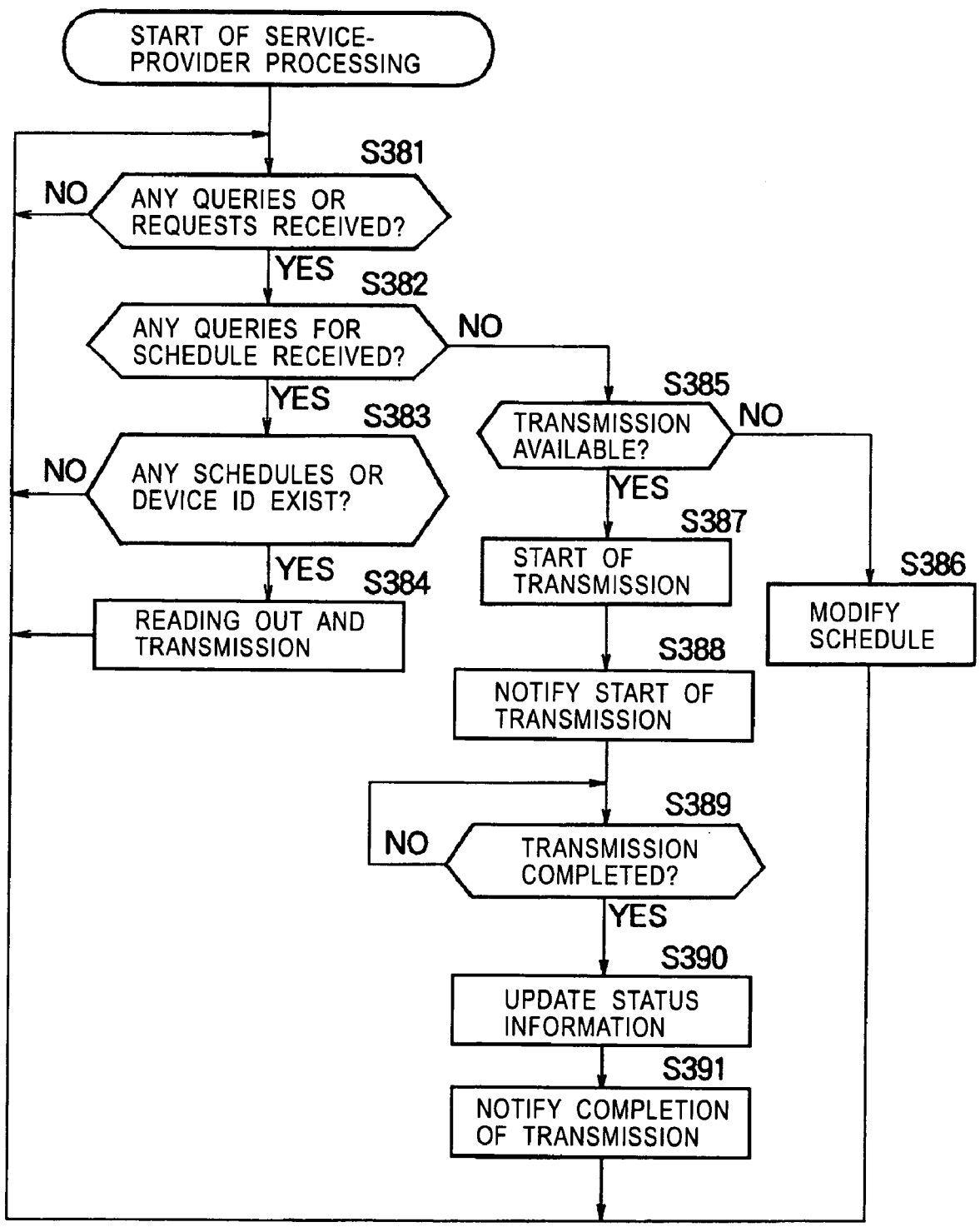
FIG. 36 is a flowchart for describing the processing performed by the service provider.

The processing shown in the flowchart shown in FIG. 36 has a configuration wherein the processing shown in Steps S385 and S386 is added to the processing shown in the flowchart in FIG. 27. That is to say, the processing in Step S381 through Step S384 shown in the flowchart in FIG. 36 is the same as the processing in Step S231 through Step S234 shown in the flowchart in FIG. 27, and the processing in Step S387 through Step S391 shown in the flowchart in FIG. 36 is the same as the processing in Step S235 through Step S239 in FIG. 27. Description has been made regarding the same processing as in FIG. 27, and accordingly, description thereof will be omitted.

In the event that determination is made that the device on the user side (in this case, description will be made with the STB 11 as an example) has made a request for transmission of the content data, the flow proceeds to the processing in Step S385. In Step S385, the service provider 2 determines whether or not the recipient (the STB 11) can store the content data regarding which has been made a request for transmission. Note that the STB 11 needs to transmit the information for the service provider 2 making the aforementioned determination.

With an arrangement according to the present embodiment, the STB 11 transmits the information with regard to the remaining capacity of the storage unit 85 thereof to the service provider 2 at the time of making a request for transmission of the content data. The service provider 2 compares the received remaining capacity of the storage unit 85 with the data size of the content data regarding which a request for transmission has been made, and only in the event that determination is made that the received remaining capacity is greater than the data size of the content data regarding which a request for transmission has been made, the flow proceeds to Step S387, and the service provider 2 performs the subsequent processing, i.e., the processing for transmission of the content data.

With another arrangement according to the present embodiment, the STB 11 compares the remaining capacity of the storage unit 85 thereof with the data size of the content data regarding which is to be made a request for transmission (the STB 11 can acquire this information from the schedule received in the processing performed in Step S253 shown in FIG. 28), and transmits the information which indicates whether or not the storage unit 85 has sufficient remaining capacity for storing the content data to the service provider 2.

In this case, the service provider 2 receives the information whether or not the STB 11 can receive the content data. An arrangement may be made wherein the service provider 2 performs the processing in Step S385 based upon such information.

In either case, only in the event that the determination is made that the STB 11 can store the received content data, the service provider 2 performs the processing from Step S387, thereby preventing such a problem that the STB 11 fails to store the received content data.

On the other hand, in Step S385, in the event that determination is made that the STB 11 cannot receive and store the content data regarding which have been made a request for transmission, the flow proceeds to the processing in Step S386. In Step S386, the schedule is changed. That is to say, in the event that the service provider 2 cannot transmit the content data which is to be transmitted, the flow proceeds to the processing in Step S386, and accordingly, the service provider 2 needs to perform transmission of the content data at another point-in-time.

Accordingly, the service provider 2 needs to overwrite (change) the field of "transmission point-in-time" of the schedule. An arrangement may be made wherein the service provider 2 overwrites the field of "transmission point-in-time" with a point-in-time wherein a predetermined time, e.g., one hour after the point-in-time which has been specified therein. In this case, the service provider 2 performs transmission of the content data again at the point-in-time with which the field of "transmission point-in-time" of the schedule has been overwritten. At the same time, the service provider 2 changes a part of the transmission reservation table 321, and increments by "1" the reservation number stored in the field corresponding to the point-in-time, with which the field of "transmission point-in-time" of the schedule has been overwritten, in the fixed region 322.

Furthermore, an arrangement may be made wherein the service provider 2 instructs the user through an electronic mail or the like so as to change the transmission point-in-time. In this case, the user makes a response corresponding to the instructions from the service provider 2, and the service provider 2 changes the transmission point-in-time according to the response from the user. Note that the corresponding field of "transmission status" of the schedule holds the information which indicates "unfixed" until the service provider 2 receives the response from the user. At the same time, the service provider 2 increases the reservation number stored in the unfixed region 323 in the transmission reservation table 321 by 1. Upon the service provider 2 receiving the response from the user, the service provider 2 overwrites the field of "transmission point-in-time" in the schedule with the point-in-time specified in the response, and increments by "1" the reservation number stored in the field corresponding to the point-in-time, with which the field of "transmission point-in-time" of the schedule has been overwritten, in the fixed region 322 in the transmission reservation table 321.

With the present embodiment, in the event that the schedule is overwritten as described above, the service provider 2 provides the schedule thus overwritten to the STB 11, again, and the STB 11 performs processing according to the received schedule, whereby transmission/reception of the content data is performed.

Furthermore, an arrangement may be made wherein, upon the STB 11 having sufficient remaining capacity for storing the content data, the STB 11 makes a request for transmission of the content data again. Note that the service provider 2 should maintain the field of "transmission status" in the schedule holding the information which indicates that transmission of the content data has not been performed, and should not delete the corresponding schedule.

As described above, with the present embodiment, the STB 11 transmits the information required for the service provider 2 making a determination whether or not transmission of the content data can be performed in a sure manner, and the service provider 2 performs processing based upon the information from the STB 11, thereby preventing the problem that the STB 11 cannot store the received content data, and thereby preventing the service provider 2 from performing useless processing for transmission of the content data.

While description has been made regarding an example wherein the user makes a purchase of a single content data set, the user can makes a purchase of multiple content data sets at the same time, and the recipient can receive multiple content data sets at the same time.

A series of the processing may be performed by software having the above-described functions, as well as by hardware. With an arrangement for performing a series of the processing by software, the software program code is installed into a computer included in a dedicated hardware device, or a general-purpose personal computer which can realize various kinds of functions by the user installing various kinds of program code, from a storage medium, for example.

As shown in FIG. 2, the program code are distributed not only through packaged storage media which is detachable from the personal computer of the service provider 2, such as magnetic disks 61 (including flexible disks), optical disks 62 (including CD-ROMs (Compact Disc-Read Only Memory) and DVDs (Digital Versatile Disc)), magneto-optical disks 63 (including Mini-Discs (a Registered Trademark)), or semiconductor memory 64, in which the software program code for realizing the functions of the above-described embodiments has been stored, but also through a storage device built into the computer, such as ROM 42 or a hard disk forming the storage unit 48, in which the software program code for realizing the functions of the above-described embodiments has been stored.

Note that with the present invention, while it is needless to say that a series of the processing may be sequentially performed according to the program code supplied from the storage medium, the processing according to the present invention is not restricted to the above-described time-sequence for processing, and encompasses the processing being performed in parallel or individually.

It should be further noted that the system used here indicates overall equipment made up of multiple devices.

What is claimed is:

1. An information processing device, comprising:
   first managing means for managing first IDs, each first ID identifying another device other than said information processing device itself;
   second managing means for managing second IDs for identifying contents;
   supplying means for supplying at least one of said second IDs managed by said first managing means to said other device making a request for distribution of said contents;
   user ID managing means for managing a user ID corresponding to at least one of said first IDs;
   receiving means for receiving at least one of said first IDs and said at least one of said second IDs from said other device;
   identifying means for identifying said at least one of said first IDs corresponding to said user ID received by said receiving means;
   generating means for generating a schedule for distributing said contents identified by said at least one of said second IDs to said other device corresponding to said received at least one of said first IDs by said receiving means;
   transmitting means for transmitting said schedule generated by said generating means to said other device; and
   distributing means for distributing said contents to said other device according to a request according to said schedule transmitted by said transmitting means,
   wherein said user ID managing means for managing manages said user ID corresponding to at least two of said first IDs,
   wherein said identifying means for identifying identifies said at least two first IDs corresponding to said user ID received by said receiving means, making a query to a communication device by transmitting said at least two first IDs and receiving said at least one of said first IDs chosen from said at least two first IDs,
   wherein said generating means for generating generates said schedule for distributing said contents identified by said at least one of said second IDs to said other device corresponding to said at least chosen one of said at least two first IDs received by said identifying means, and
   wherein said distributing means for distributing distributes said contents to said other device corresponding to said at least chosen one of said at least two first IDs received by said identifying means according to said schedule generated by said generating means.

2. An information processing device according to claim 1, further comprising:
   determining means for determining whether or not said other device corresponding to said at least one of said first IDs can receive and store said content data transmitted according to said schedule; and updating means for updating said schedule in the event that said determining means has determined that said other device corresponding to said at least one of said first IDs cannot receive and store said content data.

3. An information processing device according to claim 1, wherein in the event that the user having said other device has specified a point-in-time for distributing said contents through said other device, said generating means determines whether transmission of said contents can be performed at the specified point-in-time, and in the event that a determination has been made that the transmission can be performed, said generating means generates a schedule for transmission of said contents with the specified transmission point-in-time.

4. An information processing device, comprising:
first managing means for managing first IDs, each first ID identifying another device other than said information processing device itself;
second managing means for managing second IDs for identifying contents;
user ID managing means for managing a user ID corresponding to at least one of said first IDs;
supplying means for supplying at least one of said second IDs managed by said second managing means to a communication device making a request for distribution of said contents;
receiving means for receiving said user ID and said at least one of said second IDs from said communication device;
identifying means for identifying said at least one of said first IDs corresponding to said user ID received by said receiving means;
generating means for generating a schedule for distributing said contents identified by said at least one of said second IDs to said other device corresponding to said identified at least one of said first IDs in the event that said at least one of said first IDs has been identified by said identifying means; and
distributing means for distributing said contents to said other device according to said schedule generated by generating means,
wherein said user ID managing means for managing manages said user ID corresponding to at least two of said first IDs,
wherein said identifying means for identifying identifies said at least two first IDs corresponding to said user ID received by said receiving means, making a query to said communication device by transmitting said at least two first IDs and receiving said at least one of said first IDs chosen from said at least two first IDs,
wherein said generating means for generating generates said schedule for distributing said contents identified by said at least one of said second IDs to said other device corresponding to said at least chosen one of said at least two first IDs received by said identifying means, and
wherein said distributing means for distributing distributes said contents to said other device corresponding to said at least chosen one of said at least two first IDs received by said identifying means according to said schedule generated by said generating means.

5. An information processing device according to claim 4, wherein in the event that a user having said other device has specified a point-in-time for distributing said contents through said other device, said generating means determines whether or not transmission of said contents can be performed at the specified point-in-time, and in the event that a determination has been made that the transmission can be performed, said generating means generates a schedule for transmission of said contents with the specified transmission point-in-time.

6. An information processing system having an information processing device, another device and a communication device, comprising:
the information processing device including:
first managing means for managing first IDs, each first ID identifying another device other than said information processing device itself;
second managing means for managing second IDs for identifying contents;
user ID managing means for managing a user ID corresponding to at least one of said first IDs;
supplying means for supplying at least one of said second IDs managed by said second managing means to said communication device making a request for distribution of said contents;
receiving means for receiving said user ID and said at least one of said second IDs from said communication device;
identifying means for identifying at least one of said first IDs corresponding to said user ID received by said receiving means;
generating means for generating a schedule for distributing said contents identified by said at least one of said second IDs to said other device corresponding to said identified at least one of said first IDs in the event that said at least one of said first IDs has been identified by said identifying means;
transmitting means for transmitting said schedule for starting to write said contents identified by said at least one of said second IDs to said other device corresponding to said identified first ID, and
the another device comprising:
a storage means for storing received said contents according to said schedule generated by a generating means,
wherein said user ID managing means for managing manages said user ID corresponding to at least two of said first IDs,
wherein said identifying means for identifying identifies said at least two first IDs corresponding to said user ID received by said receiving means, making a query to said communication device by transmitting said at least two first IDs and receiving said at least one of said first IDs chosen from said at least two first IDs,
wherein said generating means for generating generates said schedule for distributing said contents identified by said at least one of said second IDs to said other device corresponding to said at least chosen one of said at least two first IDs received by said identifying means, and
wherein said distributing means for distributing distributes said contents to said other device corresponding to said at least chosen one of said at least two first IDs received by said identifying means according to said schedule generated by said generating means.

7. An information processing device, comprising:
a first managing unit configured to manage first IDs, each first ID identifying another device other than said information processing device itself;
a second managing unit configured to manage second IDs for identifying contents;
a supplying unit configured to supply at least one of said second IDs managed by said first managing unit to said other device making a request for distribution of said contents;
a user ID managing unit configured to manage a user ID corresponding to at least one of said first IDs;
a receiving unit configured to receive said at least one of said first IDs and said at least one of said second IDs from said other device;
an identifying unit configured to identify said at least one of said first IDs corresponding to said user ID received by said receiving unit;

a generating unit configured to generate a schedule for distributing said contents identified by said at least one of said second IDs to said other device corresponding to said received at least one of said first IDs by said receiving unit;

a transmitting unit configured to transmit said schedule generated by said generating unit to said other device; and a distributing unit configured to distribute said contents to said other device according to a request according to said schedule transmitted by said transmitting unit, wherein said user ID managing unit manages said user IDs corresponding to at least two of said first IDs, wherein said user ID managing unit manages said user IDs corresponding to said user ID received by said receiving unit, making a query to a communication device by transmitting said at least two IDs and receiving said at least one of said first IDs chosen from said at least two first IDs, wherein said generating unit generates said schedule for distributing said contents identified by said at least one of said second IDs to said other device corresponding to said at least chosen one of said at least two first IDs received by said identifying unit, and wherein said distributing unit distributes said contents to said other device corresponding to said at least chosen one of said at least two first IDs received by said identifying unit according to said schedule generated by said generating unit.

8. An information processing device, comprising:

first managing means for managing first IDs, each first ID identifying another device other than said information processing device itself;

second managing means for managing second IDs for identifying contents;

supplying means for supplying at least one of said second IDs managed by said second managing means to said other device upon said other device making a request for distribution of said contents;

identifying means for identifying at least one of said first IDs managed by said first managing means based upon information for identifying said at least one of said first IDs and said at least one of said second IDs received from said other device;

generating means for generating a schedule for distributing said contents identified by said at least one of said second IDs to said other device corresponding to said identified at least one of said first IDs in the event that said at least one of said first IDs has been identified by a specifying means; and distributing means for distributing said contents according to said schedule generated by said generating means, wherein in a event that the user having said other device has specified a point-in-time for distributing said contents through said other device, said generating means determines whether or not transmission of said contents can be performed at the specified point-in-time, and in the event that determination has been made that the transmission can be performed, said generating means generates said schedule for transmission of said contents with the specified transmission point-in-time, wherein in a event that said identifying means identify two first IDs of said first IDs based upon the information received from said other device, said identifying means identify one first ID of said two first IDs as a billing user ID for identifying the user which is to be billed for said contents, and the other first ID of said two first IDs as a destination ID for identifying the destination device for receiving said contents, and wherein said generating means generates a schedule for billing the user identified by said billing user ID, and distributes said contents to said other device identified by said destination ID.

9. An information processing method implemented at least in part at an information processing device, comprising:

managing, first IDs, each first ID identifying an other device other than said information processing device itself;

managing second IDs for identifying contents;

managing a user ID corresponding to at least one of said first IDs;

supplying at least one of said second IDs to said other device making a request for distribution of said contents;

receiving said user ID, at least one of said first IDs and said at least one of said second IDs from said other device;

generating a schedule for distributing said contents identified by said at least one of said second IDs to said other device corresponding to said received at least one of said first IDs;

transmitting said schedule generated by said generating means to said other device; and distributing said contents to said other device according to a request according to said schedule transmitted;

identifying at least two of said first IDs corresponding to said user ID received, making a query to said other device by transmitting said at least two first IDs and receiving said at least one of said first IDs chosen from said at least two first IDs; and distributing said contents to said other device corresponding to said at least chosen one of said at least two first IDs received by said identifying according to said schedule generated by said generating.

10. A computer readable storage medium encoded with instructions which when executed by a computer cause a processor to execute a method comprising:

managing, first IDs, each first ID identifying an other device other than said information processing device itself;

managing second IDs for identifying contents;

managing a user ID corresponding to at least one of said first IDs;

supplying at least one of said second IDs to said other device making a request for distribution of said contents;

receiving said user ID, at least one of said first IDs and said at least one of said second IDs from said other device;

generating a schedule for distributing said contents identified by said at least one of said second IDs to said other device corresponding to said received at least one of said first IDs;

transmitting said schedule generated by said generating means to said other device; and distributing said contents to said other device according to a request according to said schedule transmitted;

identifying at least two of said first IDs corresponding to said user ID received, making a query to a communication device by transmitting said at least two first IDs and receiving said at least one of said first IDs chosen from said at least two first IDs;

generating said schedule for distributing said contents identified by said at least one second ID of said second IDs to said other device corresponding to at least chosen one of said at least two first IDs received by said identifying; and distributing said contents to said other device corresponding to said at least chosen one of said at least two first IDs received by said identifying according to said schedule generated by said generating.

* * * * *